(12) United States Patent
Park et al.

(10) Patent No.: US 10,512,380 B2
(45) Date of Patent: Dec. 24, 2019

(54) VACUUM CLEANER WITH MOTOR ASSEMBLY

(71) Applicant: SAMSUNG ELECTRONICS CO., LTD., Suwon-si, Gyeonggi-do (KR)

(72) Inventors: Jong Jin Park, Suwon-si (KR); Myung Bae Bang, Yongin-si (KR); Byung Ryel In, Suwon-si (KR); Deok Jin Kim, Hwaseong-si (KR)

(73) Assignee: SAMSUNG ELECTRONICS CO., LTD, Suwon-si (KR)

( * ) Notice: Subject to any disclaimer, the term of this patent is extended or adjusted under 35 U.S.C. 154(b) by 497 days.

(21) Appl. No.: 14/730,901

(22) Filed: Jun. 4, 2015

(65) Prior Publication Data
US 2015/0351599 A1 Dec. 10, 2015

(30) Foreign Application Priority Data

Jun. 5, 2014 (KR) .................. 10-2014-0068325
Dec. 19, 2014 (KR) .................. 10-2014-0184623

(51) Int. Cl.
*A47L 9/22* (2006.01)
*F04D 25/06* (2006.01)
(Continued)

(52) U.S. Cl.
CPC .............. *A47L 9/22* (2013.01); *F04D 17/165* (2013.01); *F04D 17/168* (2013.01); *F04D 25/06* (2013.01);
(Continued)

(58) Field of Classification Search
CPC ...... F04D 17/168; F04D 17/165; F04D 17/16; F04D 25/0606; F04D 25/08; F04D 25/082; F04D 25/0666; F04D 29/403; F04D 29/42; F04D 29/4206; F04D 29/44; F04D 29/441; F04D 29/444; F04D 29/5806; F04D 25/06; F04D 29/541; F04D 29/522; H02K 1/148; H02K 5/00; H02K 5/15; H02K 5/16;
(Continued)

(56) References Cited

U.S. PATENT DOCUMENTS 4,428,719 A * 1/1984 Hayashibara ....... F04D 25/0606
  417/354
6,126,417 A * 10/2000 Roth .................. F04D 13/0606
  417/423.11
(Continued)

FOREIGN PATENT DOCUMENTS

JP   11-125197 A   5/1999
JP   2007-113477 A  5/2007

OTHER PUBLICATIONS

European Office Action dated Feb. 8, 2019 in European Patent Application No. 15169988.1.
(Continued)

*Primary Examiner* — Bryan M Lettman
(74) *Attorney, Agent, or Firm* — Staas & Halsey LLP

(57) ABSTRACT

A motor assembly includes an impeller inside a motor assembly housing, a motor including a rotor including a rotor shaft rotatable with the impeller and a pair of stators disposed facing each other across the rotor while electromagnetically interacting with the rotor to rotate the rotor shaft, and a motor housing inside the motor assembly housing that fixes the pair of stators relative to the rotor.

24 Claims, 45 Drawing Sheets

(51) Int. Cl.

| | |
|---|---|
| *F04D 17/16* | (2006.01) |
| *H02K 5/16* | (2006.01) |
| *F04D 29/42* | (2006.01) |
| *F04D 25/08* | (2006.01) |
| *F04D 29/44* | (2006.01) |
| *H02K 5/15* | (2006.01) |
| *H02K 1/14* | (2006.01) |
| *F04D 29/52* | (2006.01) |
| *F04D 29/54* | (2006.01) |
| *H02K 11/33* | (2016.01) |
| *H02K 3/52* | (2006.01) |

(52) U.S. Cl.
CPC ....... *F04D 25/0606* (2013.01); *F04D 25/082* (2013.01); *F04D 29/4206* (2013.01); *F04D 29/444* (2013.01); *F04D 29/522* (2013.01); *F04D 29/541* (2013.01); *H02K 1/14* (2013.01); *H02K 1/148* (2013.01); *H02K 5/161* (2013.01); *H02K 11/33* (2016.01); *H02K 3/522* (2013.01); *H02K 5/15* (2013.01)

(58) Field of Classification Search
CPC ........ H02K 5/161; H02K 5/163; H02K 5/165; H02K 5/22; H02K 9/06; A47L 9/22
See application file for complete search history.

(56) References Cited

U.S. PATENT DOCUMENTS

| | | | |
|---|---|---|---|
| 2006/0267430 A1* | 11/2006 | Archer | H02K 5/15 |
| | | | 310/89 |
| 2012/0199129 A1* | 8/2012 | Kenyon | A61M 16/0066 |
| | | | 128/205.25 |
| 2014/0328684 A1* | 11/2014 | King | F04D 29/056 |
| | | | 416/95 |

OTHER PUBLICATIONS

European Search Report dated Nov. 26, 2015 issued in corresponding European Patent Application 15169988.1.

* cited by examiner

VACUUM CLEANER WITH MOTOR ASSEMBLY

CROSS-REFERENCE TO RELATED APPLICATIONS

This application claims the benefit of Korean Patent Application Nos. P10-2014-0068325 and P10-2014-0184623, filed on Jun. 5, 2014 and Dec. 19, 2014, respectively, in the Korean Intellectual Property Office, the disclosures of which are incorporated herein by reference.

BACKGROUND OF THE INVENTION

1. Field of the Invention

One or more embodiments relate to a vacuum cleaner with a motor assembly having an improved structure.

2. Description of the Related Art

In general, vacuum cleaners may be household appliances that suck up air in which foreign materials such as dirt are contained using a vacuum pressure generated by a motor mounted in a main body thereof and then filter the foreign materials in the main body.

The motor generates suction by discharging the air inside the vacuum cleaner to the outside to reduce an internal pressure, with the generated suction enabling foreign materials such as dirt to be sucked from a surface to be cleaned along with external air and to be removed by a dust collector.

Such a motor is a machine that generates a rotating force from electric energy and is equipped with a stator and a rotor. The rotor is configured to electromagnetically interact with the stator, and is rotated by a force acting between a magnetic field and a current flowing through a coil.

When the rotor of the motor is rotated, suction may be generated by a suction fan rotated together with the rotor. These components may be disposed as a module. However, within the vacuum cleaner, space typically needed for each of the separate motor, components fixing the motor, the suction fan, etc., interfere or compete with each other. As a result, the overall size of the vacuum cleaner is typically large to accommodate each of the separate components.

SUMMARY

Therefore, in one or more embodiments, it is an aspect of the present invention to provide a motor assembly in which a structure is improved such that components are concentrically disposed, and a vacuum cleaner having the same.

It is another aspect of the present invention to provide a motor assembly having a reduced size and an enhanced radiation efficiency, and a vacuum cleaner having the same.

One or more embodiments set forth a motor assembly including an impeller provided inside a housing so as to generate a suction force at an air inlet port of the housing, a motor including a rotor, provided to be rotated together with the impeller, and a pair of stators disposed so as to face each other across the rotor while electromagnetically interacting with the rotor to rotate the rotor, and a motor housing provided inside the housing that fixes the pair of stators relative to the rotor.

The motor housing may have a through-hole through which a rotor shaft of the rotor passes to drive with the impeller.

The housing may have an air outlet port arranged to outlet air flow, generated by the impeller, after transiting past the motor in the motor housing.

The motor assembly may further include a motor module that includes the motor housing and the motor, with the motor module being provided on a rear surface of the impeller.

The pair of stators may be arranged to face each other so that each stator includes a core that covers different circumferential portions of the rotor.

The motor may further include a pair of ancillary stators that are arranged to face each other, along a direction different from a direction the pair of stators face each other, so that each ancillary stator includes a core that covers different circumferential portions of the rotor, wherein the respective cores of the pair of stators and pair of ancillary stators cover different circumferential portions of the rotor.

When arranged to face each other, the pair of stators may have a collective oblong rectangular configuration that provides component and/or air flow space in the motor housing, in a same plane as a direction of at least one of the cores of the pair of stators toward the rotor, at least partially within a greatest radii between the pair of stators and the rotor.

The motor housing may include a front motor housing disposed on a front surface of the motor such that the motor is seated thereon, and a rear motor housing provided on a rear surface of the front motor housing and coupled to the front motor housing such that the motor is fixed between the front motor housing and the rear motor housing.

A complete length of the rear motor housing in a first direction may be longer than a complete length of the rear motor housing in a second direction perpendicular to the first direction.

The front motor housing may include a front motor housing body, an impeller seat provided on a front surface of the front motor housing body so as to seat the impeller thereon, and a front seat provided on a rear surface of the front motor housing body so as to seat the pair of stators thereon such that a center of the rotor provided between the pair of stators is aligned with a rotation center of the impeller The front motor housing may further include a plurality of front seating protrusions protruding from a rear surface of the front seat along a circumference of the front seat such that lateral surfaces of the pair of stators are supported.

The plurality of front seating protrusions may include front guide faces that are formed with an inclination at respective inner sides of the plurality of front seating protrusions to respectively guide the pair of stators toward the front seat upon seating.

The motor assembly may further include a diffuser disposed in a radial direction with respect to the impeller such that air suctioned by the impeller is guided into the housing through the air inlet of the housing along one or more defined air paths, wherein a center of the diffuser is provided to be aligned with a center of the impeller.

Centers of the impeller, the diffuser, and the rotor may be provided to be aligned with one another.

The motor assembly may further include the housing, wherein the housing may include a first housing portion that is provided with the air inlet port, and a second housing portion that is provided with a diffuser disposed in a radial direction with respect to the impeller to guide air suctioned by the impeller into the housing along one or more defined air paths, is provided with an air outlet port to outlet air from the housing, and is coupled to a rear surface of the first housing portion, wherein a front motor housing, disposed on a front surface of the motor such that the motor is seated thereon, is coupled to the second housing portion such that the front motor housing is centrally disposed relative to the diffuser at a rear surface of the impeller.

The motor assembly may be configured to generate an air flow path through which air is directed to flow from the air inlet port to an air outlet port of the housing by the impeller, wherein the motor housing is disposed in the air flow path.

The motor assembly may further include an insulator that is configured to cover at least a portion of an outer surface of the motor for electrical insulation, and include a flow path guide surface provided at an end of the motor such that at least a portion of air flowing along the air flow path is guided to an interior of the motor.

The motor assembly may be configured to generate the air flow path to include a module flow path along which air introduced into the housing passes the interior of the motor housing, and a module external flow path along which air introduced into the housing passes between an inner surface of the housing and an exterior of the motor housing, wherein the flow path guide surface separates the air flow path into at least the module flow path and the module external flow path.

The motor assembly may further include a circuit board provided on a rear surface of the motor so as to transmit electric signals to the motor, wherein the air inlet port, the impeller, the motor, and the circuit board are sequentially disposed inside the housing.

The motor assembly may further include the housing, provided in a cylindrical shape, and a motor module including the motor and motor housing and further include arrangement regions that are provided along lateral sides of the pair of stators disposed in a lengthwise direction, and are provided on a same plane as the pair of stators, and a circuit board that has a capacitor disposed in one of the arrangement regions, configured to transmit electric signals to the motor, and is disposed perpendicular to an axial direction of the rotor inside the housing.

The motor module may further include a magnet sensor disposed on the motor housing to detect a rotation position of the rotor.

One or more embodiments set forth a motor assembly including a housing provided with an air inlet port arranged along a front portion of the housing and an air outlet port arranged along a rear portion of the housing, an impeller configured to apply a suction force to the air inlet port, and a motor module provided on a rear surface of the impeller to transmit power to rotate the impeller, wherein the motor module includes a motor including a rotor provided to be rotated together with the impeller, and a pair of stators disposed in a lengthwise direction so as to face each other across the rotor, and a motor housing that fixes the pair of stators disposed in the lengthwise direction, includes a through-hole passing in an axial direction of the rotor such that the rotor has a center aligned with centers of the pair of stators, and is coupled to an inside of the housing.

The housing may be cylindrically shaped and the motor module may further include arrangement regions that are provided along lateral sides of the pair of stators disposed in the lengthwise direction and are provided in a same plane as the pair of stators, with the arrangement regions being disposed in a direction perpendicular to the lengthwise direction, and a circuit board that has a capacitor disposed on the arrangement region, configured to transmit electric signals to the motor, and is disposed perpendicular to the axial direction inside the housing.

The motor assembly may be configured to generate an air flow path through which air is directed to flow from the air inlet port to the air outlet port by the impeller, wherein the motor module is disposed in the air flow path.

The motor assembly may further include an insulator that is configured to cover at least a portion of an outer surface of the pair of stators for electrical insulation, and include a flow path guide surface provided at a side of an end of the motor such that at least a portion of the air flow path is guided toward an interior of the motor by the flow path guide surface.

The motor assembly may be configured to generate the air flow path to include a module flow path along which air introduced into the housing passes the interior of the motor module, and a module external flow path along which air introduced into the housing passes between an inner surface of the housing and an exterior of the motor module, wherein the flow path guide surface separates the air flow path into at least the module flow path and the module external flow path.

Additional aspects and/or advantages will be set forth in part in the description which follows and, in part, will be apparent from the description, or may be learned by practice of one or more embodiments of the present invention.

BRIEF DESCRIPTION OF THE DRAWINGS

These and/or other aspects of the invention will become apparent and more readily appreciated from the following description of embodiments, taken in conjunction with the accompanying drawings of which.

DETAILED DESCRIPTION

Figure 1:
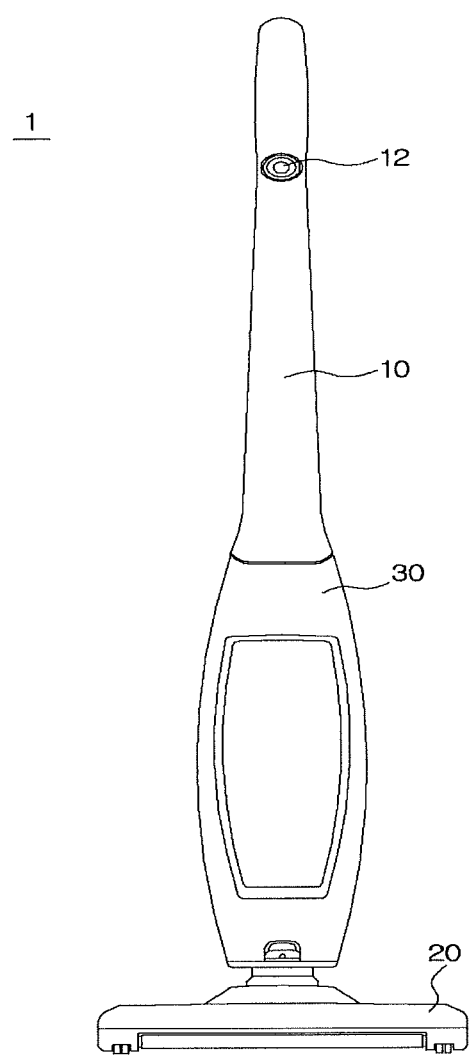
FIG. 1 is a view illustrating a vacuum cleaner, according to one or more embodiments.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 2:
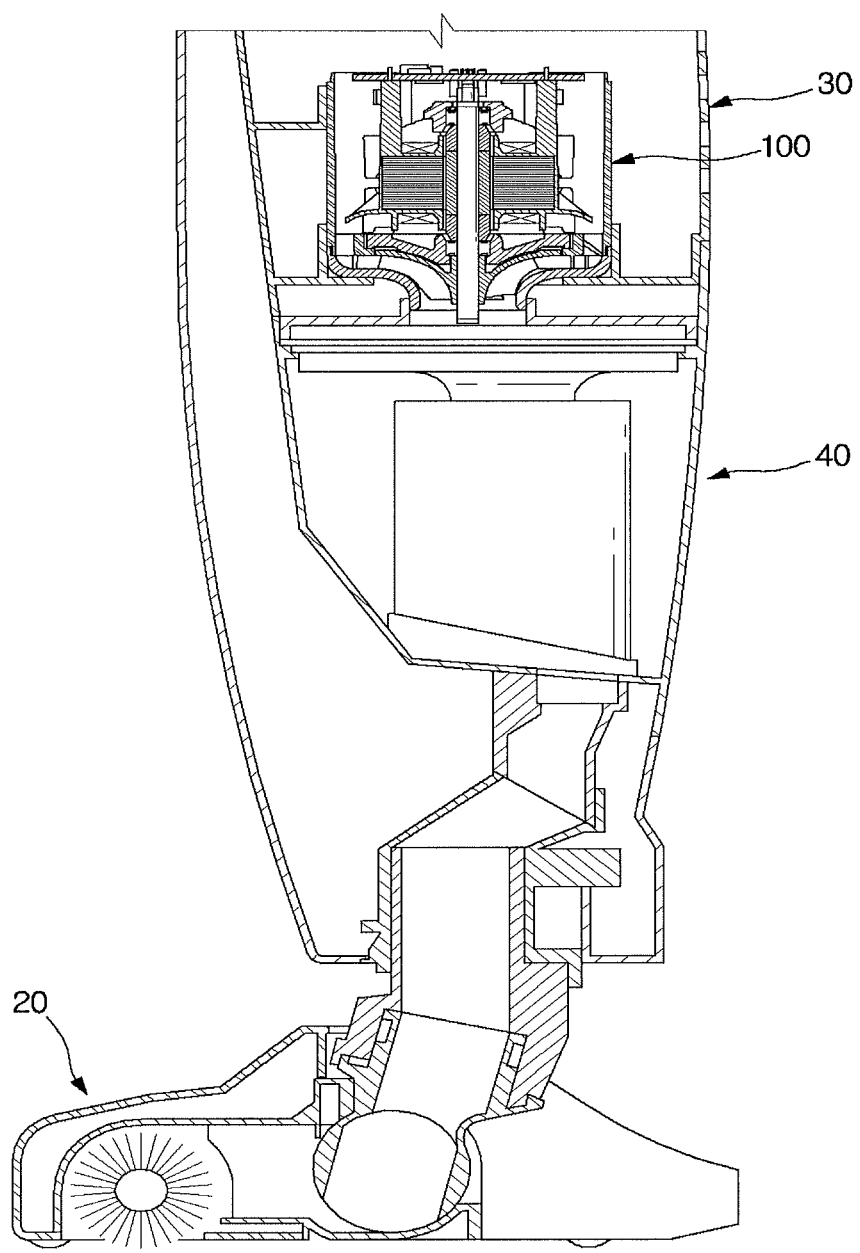
FIG. 2 is a cross-sectional view of some components of the vacuum cleaner, according to one or more embodiments.

FIG. 1 is a view illustrating a vacuum cleaner, according to one or more embodiments. FIG. 2 is a cross-sectional view of some components of the vacuum cleaner, according to one or more embodiments.

The vacuum cleaner 1 may be applied to a stick vacuum cleaner, for example.

The vacuum cleaner 1 may include a stick body 10, a suction section 20, and a cleaner body 30, for example.

The stick body 10 may be a portion coupled to an upper end of the cleaner body 30. A user can grasp the stick body 10 to operate the vacuum cleaner 1. The stick body 10 is provided with a controller 12 so as to enable the user to control the vacuum cleaner 1.

The suction section 20 may be provided at a lower portion of the cleaner body 30 such that it can come into contact with a surface, e.g., a floor to be cleaned. The suction section 20 is provided to come into contact with the floor so as to allow dirt or filth on the surface to be introduced into the cleaner body 30 by suction generated from a motor assembly 100.

The cleaner body 30 includes the motor assembly 100 installed therein, and a dust container 40. The motor assembly 100 is driven to generate suction in the cleaner body 30, and the dust container 40 is provided to be disposed upstream of an air flow relative to the motor assembly 100 such that dirt or filth can be filtered and collected from the air introduced from the suction section 20.

Figure 3:
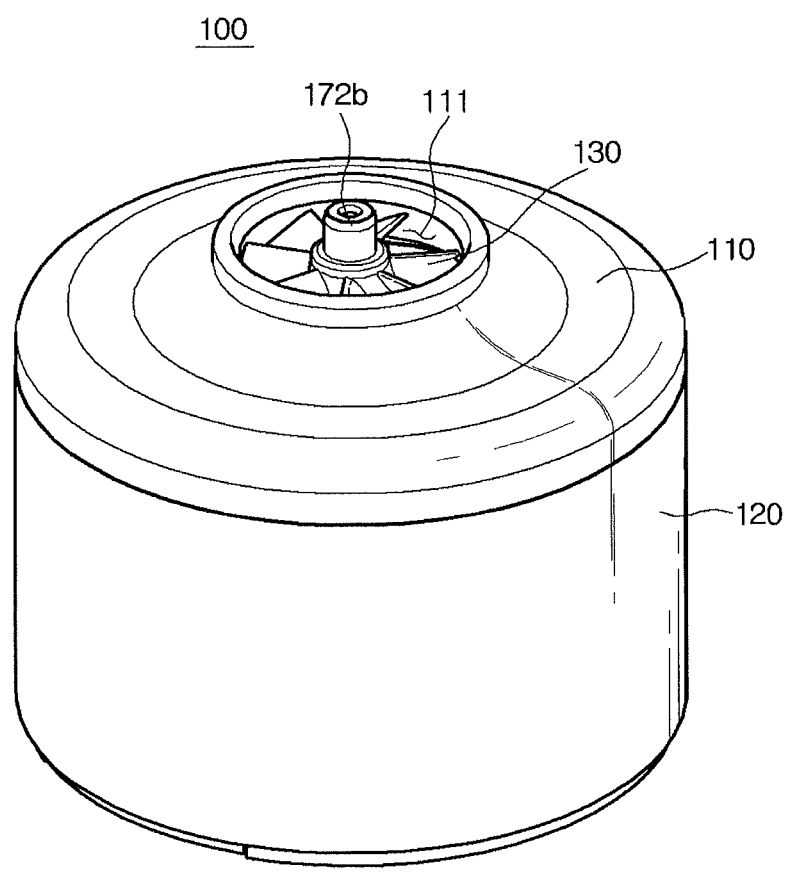
FIG. 3 is a perspective view of a motor assembly, according to one or more embodiments.
Figure 4:
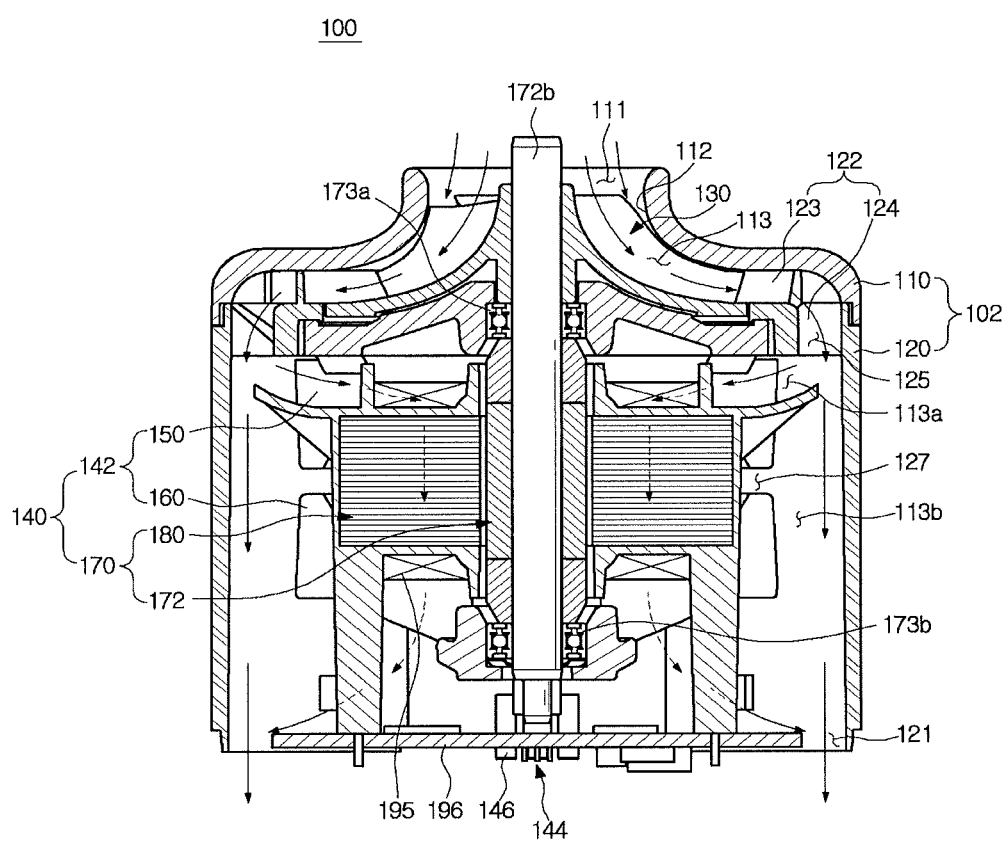
FIG. 4 is a cross-sectional view of the motor assembly, according to one or more embodiments.
Figure 5:
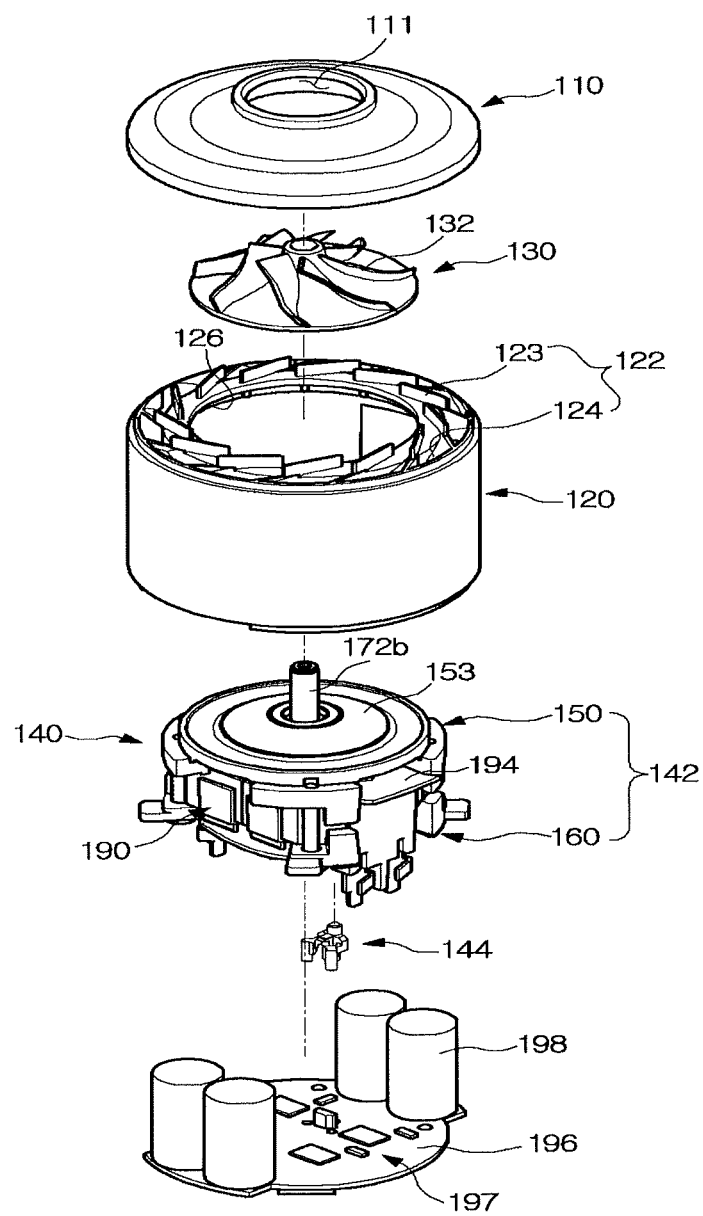
FIG. 5 is an exploded perspective view of the motor assembly, according to one or more embodiments.

FIG. 3 is a perspective view of a motor assembly, according to one or more embodiments. FIG. 4 is a cross-sectional view of the motor assembly, according to one or more embodiments. FIG. 5 is an exploded perspective view of the motor assembly, according to one or more embodiments.

The motor assembly 100 is provided inside the cleaner body 30 so as to generate suction.

The motor assembly 100 may include a housing 102, a motor 170 that is installed in the housing 102 and generates suction, a motor housing 142 that is provided in the housing 102 to fix the motor 170, and an impeller 130 that is rotatably installed on a rotor shaft 172b of the motor 170.

The housing 102 includes a first housing 110, and a second housing 120 provided to be coupled with the first housing 110. The housing 102 may be provided to have an approximately cylindrical shape. However, the shape of the housing 102 is not limited to such a shape, and may be variously provided. The first housing 110 and the second housing 120 may be provided to be separable in an axial direction of a rotor shaft 172b. The first housing 110 is provided with an air suction port 111 through which the air is introduced into the housing 102 by the motor 170, and the second housing 120 is provided with an air discharge port 121 through which the air introduced into the housing 102 is discharged. The second housing 120 is coupled with the first housing 110 at the back of the first housing 110. Thus, the air suction port 111 may be provided in the front of the housing 102, and the air discharge port 121 may be provided in the rear of the housing 102. However, the air suction port 111 and the air discharge port 121 are not limited to such arrangement.

The first housing 110 and the second housing 120 are coupled to define an air flow path 113 that runs from the air suction port 111 to the air discharge port 121 as well as an internal space 127 in which the motor 170 or the impeller 130 is disposed.

The air flow path 113 may include a module flow path 113a and a module external flow path 113b. The air is sucked by the impeller 130 of the motor assembly 100, and the sucked air flows along the air flow path 113. The air introduced into the housing 102 may flow along the module flow path 113a into a motor module 140 due to a flow path guide 194 of an insulator 190, and along the module external flow path 113b between an exterior of the motor module 140 and an interior of the housing 102. The sucked air passing the module flow path 113a can cool heat generated from an interior of the motor module 140. The sucked air passing the module flow path 113a and the sucked air passing the module external flow path 113b can cool heat generated from a circuit board 196 while passing the circuit board 196.

The first housing 110 may include a shroud 112.

The shroud 112 is provided to correspond to the impeller 130 or a diffuser 122 that will be described below, and guides the air introduced into the housing 102 by the motor 170. The shroud 112 may be provided such that the flow path becomes wider in a flowing direction of the air sucked from the air suction port 111 by the motor 170 and such that a space formed by the shroud 112 becomes wider with respect to the axial direction of the rotor shaft 172b. The shroud 112 causes the air introduced through the air suction port 111 to be guided into the housing 102, and may be provided in a shape corresponding to an upper portion of the impeller 130.

The impeller 130 may be provided inside the air suction port 111 of the first housing 110. The impeller 130 is provided to be rotated together with the rotor shaft 172b. The impeller 130 may be provided with a plurality of blades 132 generating a flow of air. The impeller 130 is provided such that the radius of gyration of each blade 132 is reduced in a direction in which the plurality of blades 132 get away from the rotor 172. The plurality of blades 132 are provided to discharge the air, which is introduced toward the rotor shaft 172b by the rotation of the impeller 130, in a radial direction of the rotor shaft 172b. The example of the impeller 130 has been described. The shape and arrangement of the impeller 130 are not limited. Depending on embodiment, differing structures may be used as long as it causes the air to flow.

As an example, a material of the impeller 130 may include a plastic. In detail, the impeller 130 may be formed of a carbon fiber reinforced plastic containing a carbon fiber, as only an example.

The second housing 120 may include a diffuser 122. The diffuser 122 is provided to increase a flow rate of the air flowing by way of the impeller 130. The diffuser 122 is provided to be disposed outside in a radial direction of the impeller 130.

The diffuser 122 may be provided in a radial direction with respect to the impeller 130. In detail, the diffuser 122 may be formed in a direction in which it extends with respect to the plurality of blades 132 of the impeller 130. The diffuser 122 may be made up of a plurality of ribs 123 and 124. The plurality of ribs 123 and 124 of the diffuser 122 may be formed in a direction in which they extend with respect to the plurality of blades 132 of the impeller 130 such that an interval between the neighboring ribs becomes gradually increased. The plurality of ribs 123 and 124 are formed to increase the flow rate of the air while guiding the air flowing by way of the impeller 130. To be specific, the diffuser 122 and the shroud 112 formed at the first housing 110 form a diffuser flow path 125 so as to increase the flow rate of the air while guiding the air flowing by way of the impeller 130.

The plurality of ribs 123 and 124 may include first ribs 123 and second ribs 124. The first ribs 123 are provided on the same plane as a downstream end of the air flow caused by the impeller 130, and the second ribs 124 are formed to have a predetermined inclination in a direction of a rotor axis 172a such that the air guided by the first ribs 123 flows into the housing 102 in an illustrated upward/downward direction that is the direction of the rotor axis 172a.

The motor module 140 may be provided in the housing 102. The motor module 140 is provided such that the motor 170 is fixed in the housing 102 as one module.

The motor module 140 may include the motor 170 and the motor housing 142.

The motor housing 142 may include a front motor housing 150 and a rear motor housing 160 that is provided to be coupled with the front motor housing 150 across the motor 170.

The front motor housing 150 is provided to be able to be fixed to the housing 102. In detail, a seating hole 126 is formed in the center of the second housing 120 such that the front motor housing 150 is coupled, and thus the front motor housing 150 can be coupled to the seating hole 126. For example, the front motor housing 150 may be fitted into the seating hole 126. The coupling method is not restricted.

The front motor housing 150 may include a front motor housing body 151, an impeller seat 153, and a front seat 154. The front motor housing body 151 may be formed in an approximate disc shape, and include a body coupler 152 corresponding to a shape of the seating hole 126 so as to be coupled to the seating hole 126 of the second housing 120 as described above.

The impeller seat 153 is provided on a front surface of the front motor housing body 151 such that the impeller 130 is seated thereon. A front surface of the impeller seat 153 is provided to correspond to a shape of a rear surface of the impeller 130 in order to avoid interfering with rotation of the impeller 130 coupled to the rotor shaft 172b.

The front seat 154 is provided on a rear surface of the front motor housing body 151 such that the motor 170 is seated thereon. The front seat 154 is provided to seat and fix a stator 180 such that the center of a rotor 172 provided rotatably is disposed to be aligned with or identical to the rotational center of the impeller 130.

The shape of the front seat 154 is not restricted. In an embodiment, the front seat 154 is formed to protrude from the front motor housing body 151 such that the motor 170 can be seated at a predetermined distance from the front motor housing body 151.

The arrangement of the front seat 154 is not restricted. In an embodiment, four front seats 154 may be disposed to correspond to respective ends of the stator 180 because the stator 180 is formed long in a first direction w1.

The rear motor housing 160 is provided to be able to be coupled with the front motor housing 150. The motor 170 may be disposed between the front motor housing 150 and the rear motor housing 160.

The rear motor housing 160 may include a rear motor housing body 161 and a rear seat 164. The rear motor housing body 161 may be formed long in a lengthwise direction of the stator 180 so as to correspond to a shape of the stator 180.

The arrangement of the rear seat 164 is not restricted. In an embodiment, four rear seats 164 may be disposed to correspond to respective ends of the stator 180 because the stator 180 is formed long in the lengthwise direction.

The front and rear motor housings 150 and 160 may be respectively provided with screw holes 151b and 161b such that they can be coupled to each other by screws 148.

A structure in which the motor 170 is fixed in the front and rear motor housings 150 and 160 will be described below in greater detail.

Figure 6A:
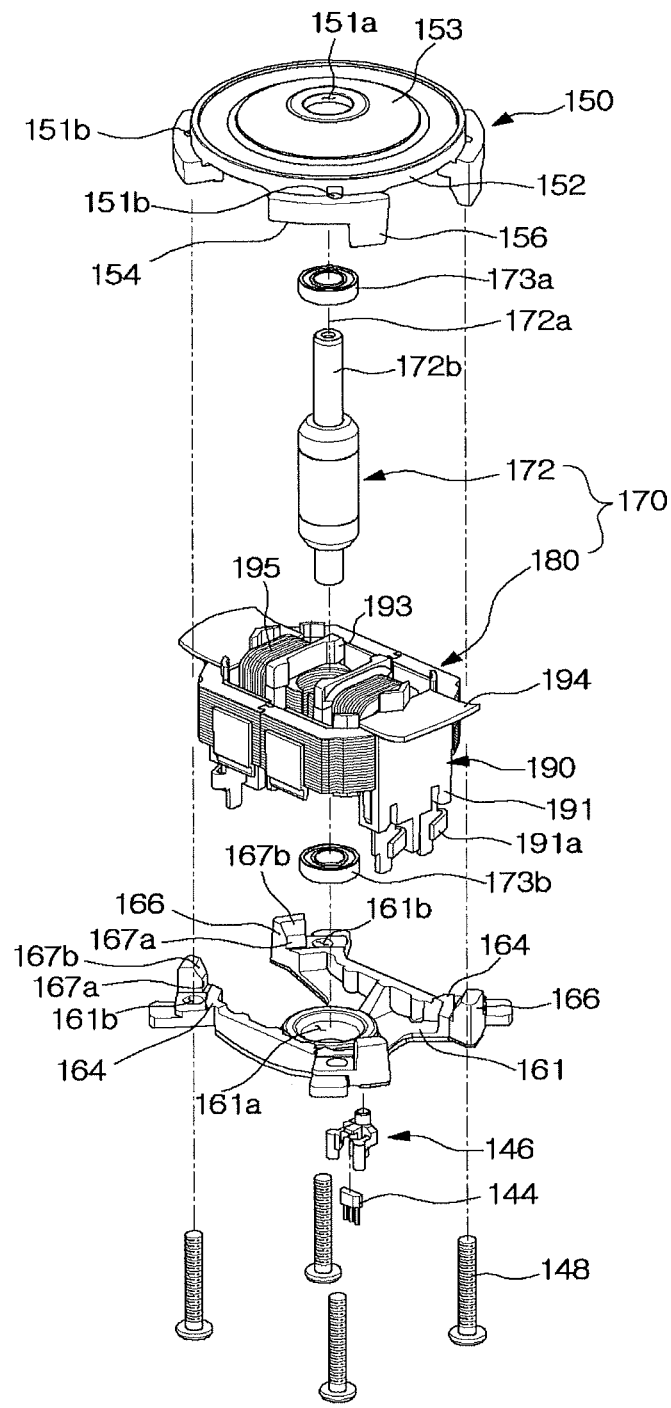
FIGS. 6A and 6B are exploded perspective views of a motor module, according to one or more embodiments.
Figure 6B:
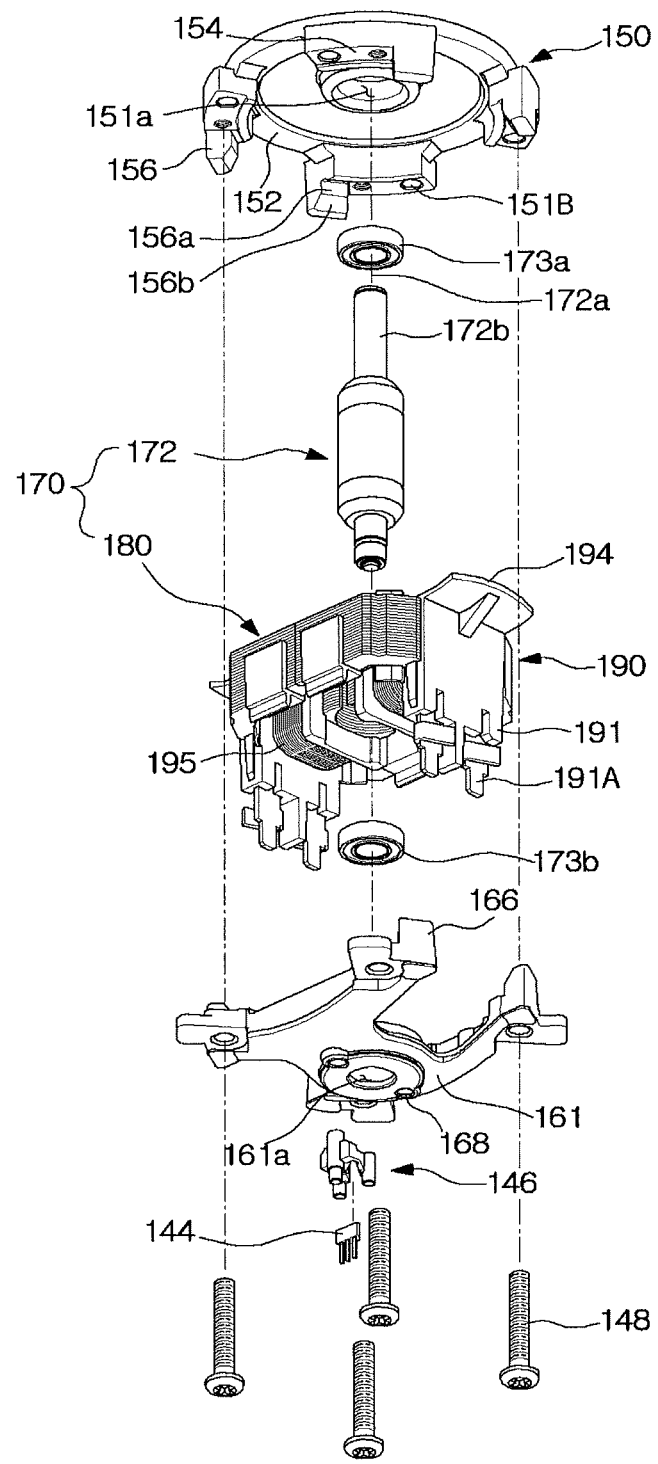

FIGS. 6A and 6B are exploded perspective views of a motor module, according to one or more embodiments.

The centers of the front and rear motor housings 150 and 160 are respectively provided with front and rear through-holes 151a and 161a through which the rotor shaft 172b can pass. Front and rear bearings 173a and 173b may be disposed in the respective front and rear through-holes 151a and 161a for the rotation of the rotor shaft 172b.

The front motor housing 150 may include front seating protrusions 156 in addition to the front seats 154.

The front seats 154 are provided inside the front motor housing 150 such that one side of the motor 170 is seated thereon. The front through-hole 151a may be formed in the center of the plurality of front seats 154 such that the centers of the rotor 172, the impeller 130, and the diffuser 122 are aligned with or identical to each other in a state in which the stator 180 is seated on or fixed to the front seats 154.

The front seating protrusions 156 are formed to protrude from the front motor housing body 151 of the front motor housing 150 along circumferences of the front seats 154 such that the motor 170 is enclosed with inner surfaces thereof. The front seating protrusions 156 prevent the motor 170 from being deflected in a direction perpendicular to the rotor axis 172a when the motor assembly 100 is operated. In detail, the front surface of the motor 170 is seated on the front seats 154, and lateral surfaces of the motor 170 are seated on front protrusion seating faces 156a of the front seating protrusions 156. The front seating protrusions 156 may be formed with front guide faces 156b that guide the motor 170 to be easily seated on the front seats 154. The front guide faces 156b are provided on ends of the front seating protrusions 156 such that they can be formed inward so as to have a predetermined angle of inclination. The front guide faces 156b may be provided to be connected to the front protrusion seating faces 156a.

The front motor housing body 151 of the front motor housing 150 is formed in an approximately circular shape, and four front seating protrusions 156 are disposed to protrude from the front motor housing body 151 of the front motor housing 150.

The rear motor housing 160 may include rear seating protrusions 166 in addition to the rear seats 164.

The rear seats 164 are provided inside the rear motor housing 160 such that the other side of the motor 170 is seated thereon. The rear through-hole 161a may be formed in the center of the plurality of rear seats 164 such that the centers of the rotor 172, the impeller 130, and the diffuser 122 are aligned with or identical to each other in a state in which the stator 180 is seated on or fixed to the rear seats 164.

The rear seating protrusions 166 are formed to protrude from the rear motor housing body 161 of the rear motor housing 160 along circumferences of the rear seats 164 such that the motor 170 is enclosed with inner surfaces thereof. The rear seating protrusions 166 prevent the motor 170 from being deflected in a direction perpendicular to the rotor axis 172a when the motor assembly 100 is operated in cooperation with the front seating protrusions 156.

The rear seating protrusions 166 may be provided with rear guide faces 167b such that the motor 170 is easily seated on the rear seats 164 when the motor 170 and the rear seating protrusions 166 are coupled. The rear guide faces 167b are formed inward so as to have a predetermined angle of inclination. In detail, the rear surface of the motor 170 is seated on the rear seats 164, and the lateral surfaces of the motor 170 are seated on rear protrusion seating faces 167a of the rear seating protrusions 166. The rear seating protrusions 166 may be formed with the rear guide faces 167b that guide the motor 170 to be easily seated on the rear seats 164. The rear guide faces 167b are provided with ends of the rear seating protrusions 166 such that they can be formed to have a predetermined angle of inclination. The rear guide faces 167b may be provided to be connected to the rear protrusion seating faces 167a.

The rear motor housing body 161 of the rear motor housing 160 may be formed long in the lengthwise direction, i.e., the first direction w1, of the stator 180 so as to correspond to the shape of the stator 180 to be described below. Four rear seating protrusions 166 may be provided to be disposed at positions that correspond to the front seating protrusions 156 of the front motor housing 150.

The rear motor housing 160 may be provided with a magnet sensor 144.

The magnet sensor 144 may be provided on the same axis as a magnet of the rotor 172, and can detect a position according to the rotation of the rotor 172. This information is transmitted to the circuit board 196, e.g., a position sensor of the circuit board 196. Thereby, it is possible to perform position control of the rotor 172.

The magnet sensor 144 may be disposed to be seated on a sensor bracket 146, and to transmit the information to the position sensor of the circuit board 196. The sensor bracket 146 may be provided such that one end thereof is coupled to a sensor seat 168 provided on the rear surface of the rear motor housing 160 and the other end thereof is coupled to the circuit board 196. In this example, the position sensor is not directly located at the rotor 172, but the magnet sensor 144 is disposed near the rotor 172. Thereby, the position control of the rotor 172 can be realized by adding a simple structure.

The front and rear motor housings 150 and 160 may be provided with the respective screw holes 151b and 161b such that they can be coupled to each other by the screws 148. To be specific, in the present embodiment, the screw holes 151b may be respectively formed in the four front seats 154, and the screw holes 161b may be respectively formed in the four rear seats 164. The screws 148 may be provided to pass through the screw holes 161b of the rear seats 164 and to be coupled to the corresponding screw holes 151b of the front seats 154. That is, for example, the front and rear motor housings 150 and 160 can be fixedly coupled by the four screws 148.

Figure 7:
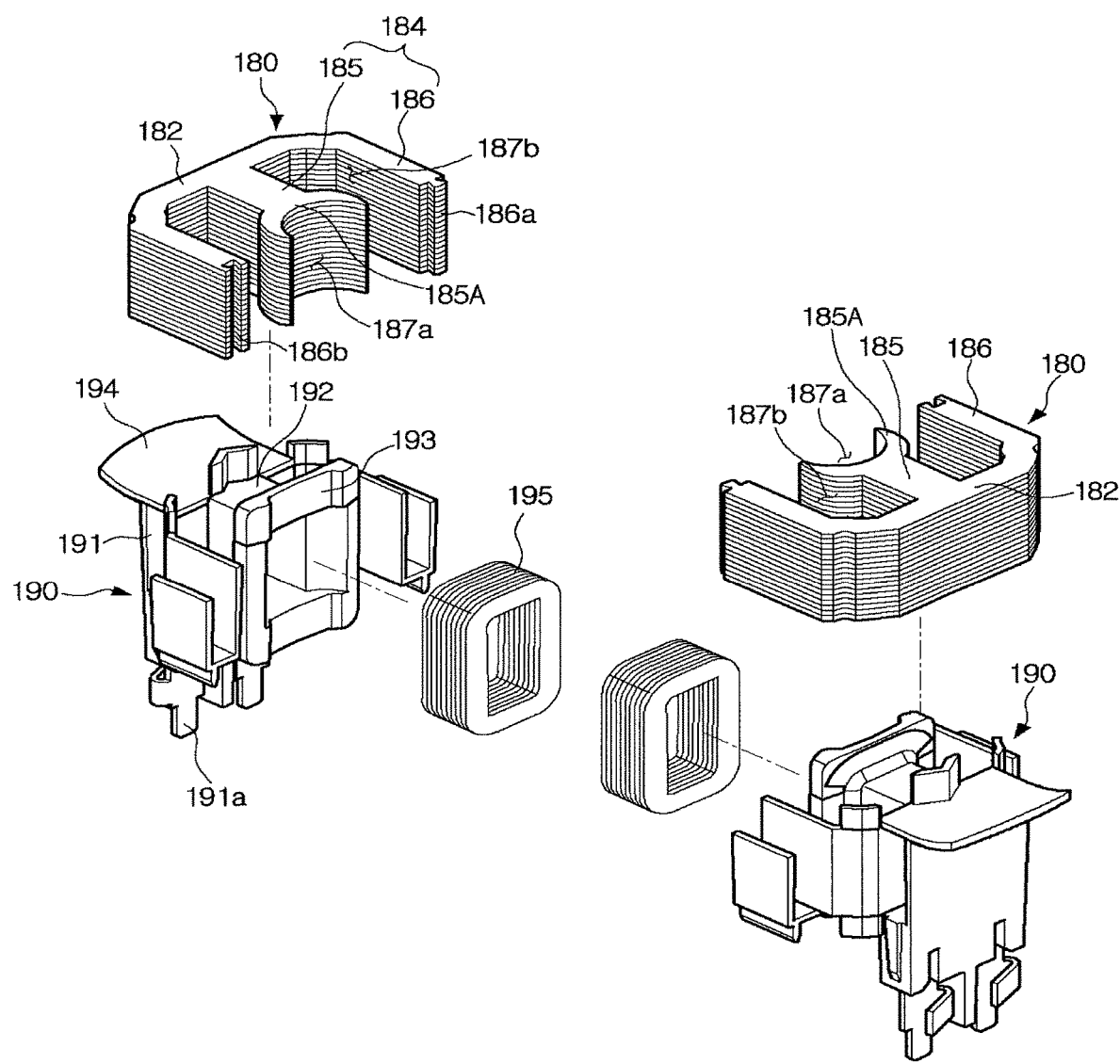
FIG. 7 is an exploded perspective view of a motor, according to one or more embodiments.

FIG. 7 is an exploded perspective view of a motor, according to one or more embodiments.

The motor 170 may include a rotor 172 and a stator 180.

The rotor 172 is rotatably provided in the center of the stator 180.

The stator 180 is provided to electromagnetically interact with the rotor 172.

The stator 180 may be configured to include a stator body 182, an insulator 190, and a coil 195.

The stator body 182 may include at least a pair of stator bodies 182 that are disposed across the rotor 172, e.g., along a same plane in the first direction w1, with respective ends that face each other. As illustrated, the pair of stator bodies 182 may be provided to be coupled to each other in the illustrated first direction w1. That is, the stator 180 is not provided completely around the rotor 172 in a singular circular shape in a circumferential direction of the rotor 172, but the stator 180 is provided to enclose the rotor 172 using the example pair of stator bodies 182. Here, a length L1 of the stator 180 determined in the first direction w1 may be longer than a length L2 of the stator 180 determined in a second direction w2, e.g., perpendicular to the first direction w1, such that the stator 180 may be formed to meet a condition that L1 is greater than L2.

As the stator 180 is formed to be longer in one direction corresponding to direction w1 than in the other direction corresponding to direction w2, available space outward of the stator 180 in the other direction is formed to be relatively wider or greater than available space outward of the stator 180 in the one direction. Therefore, an air flow path can be secured using the additional available space outward of the stator 180 in the other direction. As a result, it is possible to smoothly cool the motor and to improve performance of the motor assembly using such a secured air flow path based on the differing, for example, dimensions of the stator 180.

As the stator 180 is formed long in the first direction w1, arrangement regions 188 may be provided around the rotor 172 in a circumferential direction of the stator 180. That is, the arrangement regions 188 may be provided at lateral portions of the stator 180 which are portions perpendicular to the lengthwise direction of the stator 180.

The arrangement regions 188 may be regions provided on the same plane as the stator 180, and can be provided to improve practical use of the internal space 127 of the motor assembly 100. As an example, each arrangement region 188 may be formed in an approximately semi-circular shape, and components of the motor assembly 100 may be disposed in the arrangement regions 188. In an embodiment, at least one capacitor 198 may be disposed in such an arrangement region 188.

The arrangement regions 188 may be provided as a pair at the opposite sides of the stator 180, and the capacitors 198 may also be provided as a pair. In an embodiment, a total of four capacitors 198 may be disposed in the arrangement regions 188 two by two. Each capacitor 198 may serve to smooth a electric current or to remove a ripple.

A rotor receptacle 187a for holding the rotor 172 is defined in the middle between the pair of stator bodies 182. Each stator body 182 may be formed by laminating pressed steel sheets.

Each stator body 182 may include at least one stator core 184. A plurality of stator cores 184 may be provided in parallel to each other. The pair of stator bodies 182 have at least two stator cores 184 formed in parallel, and may be symmetrically provided across the rotor 172.

Each stator core 184 includes a center core 185 and side cores 186 arranged along differing sides of the center core 185.

The center cores 185 are provided to face each other across the rotor 172. The rotor receptacle 187a is defined between the center cores 185 such that the rotor 172 is rotatable. A pair of side cores 186 are provided at both the sides of the center core 185 in parallel to the center core 185.

The stator core 184 of one of the pair of stator bodies 182 and the stator core 184 of the other stator body 182 may be formed to be disposed along a same line. That is, the stator cores 184 may be disposed to face each other. In other words, the stator core 184 of one of the pair of stator bodies 182 may be provided such that the stator core 184 of the other stator body 182 is disposed along a line along that extends in a lengthwise direction.

The side cores 186 may be provided at both the sides of the center core 185 such that the pair of side cores 186 of one of the stator bodies 182 of the stator 180 can be coupled with the pair of side cores 186 of the other stator body 182. To this end, the side cores 186 of one of the opposite stator bodies 182 of the stator 180 may be provided with coupling tails 186a, and the side cores 186 of the other stator body 182 may be provided with coupling sockets 186b into which the coupling tails 186a can be interlocked.

As the center core 185 and the side cores 186 are disposed in parallel in the same direction, the coil 195 can be easily wound when wound around the stator 180.

A stator slot 187b is formed between the center core 185 and the side core 186 of the stator core 184. As the coil 195 is wound around the stator core 184, the coil 195 is housed in the stator slots 187b. An inner end of the stator core 184 which is adjacent to the rotor 172 is provided with an expanded core 185a in which a width of the stator core 184 is partly increased. In detail, the expanded core 185a is formed in such a way that an inner end of the center core 185 which is directed to the rotor 172 becomes increased in width to surround a circumference of the rotor 172. A gap 185b is formed for the rotation of the rotor 172 between an inner surface of the expanded core 185a and an outer surface of the rotor 172.

The insulator 190 is formed of a material having an electrical insulating property. The insulator 190 is formed to surround a part of the stator 180, particularly the stator core 184. The insulator 190 includes an insulator body 191 that is provided to correspond to one surface of the stator body 182, a center core support 192 that extends from the insulator body 191 so as to correspond to the center core 185, and a coil guide 193 that protrudes from the center core support 192 in a radially outward direction.

The coil 195 is wound around the center core 185 and the center core support 192 in a state in which the insulator 190 is coupled with the stator body 182. The coil 195 may be wound around the side cores 186 and the insulator 190 surrounding the side cores 186. However, as only an example, it is described here that the coil 195 is wound around the center core 185 and the center core support 192. That is, in an embodiment, an example in which the coil 195 is wound around the center core 185 is described. However, for the purpose of output density and easy control, the coil 95 may be wound around the center core 185 as well as the pair of side cores 186 so as to have a three-phase polarity, for example.

The insulator 190 may include a flow path guide 194. The flow path guide 194 may be provided to be inclined from a lengthwise end of the stator 180 toward the air flow path 113. With this configuration, part of the air sucked into the housing 102 by the impeller 130 is caused to flow into the motor module 140, thereby forming the module flow path 113a. That is, the air flow path 113 is divided into the module flow path 113a and the module external flow path 113b by the flow path guide 194.

The insulator 190 may include a body coupler 191a. The body coupler 191a is provided at one side of the insulator body 191 so as to guide the coil 195 wound onto the motor 170 to the circuit board 196. Further, the body coupler 191a is provided to be inserted into and fixed to the circuit board 196 such that the motor 170 and the circuit board 196 are coupled.

Figure 8:
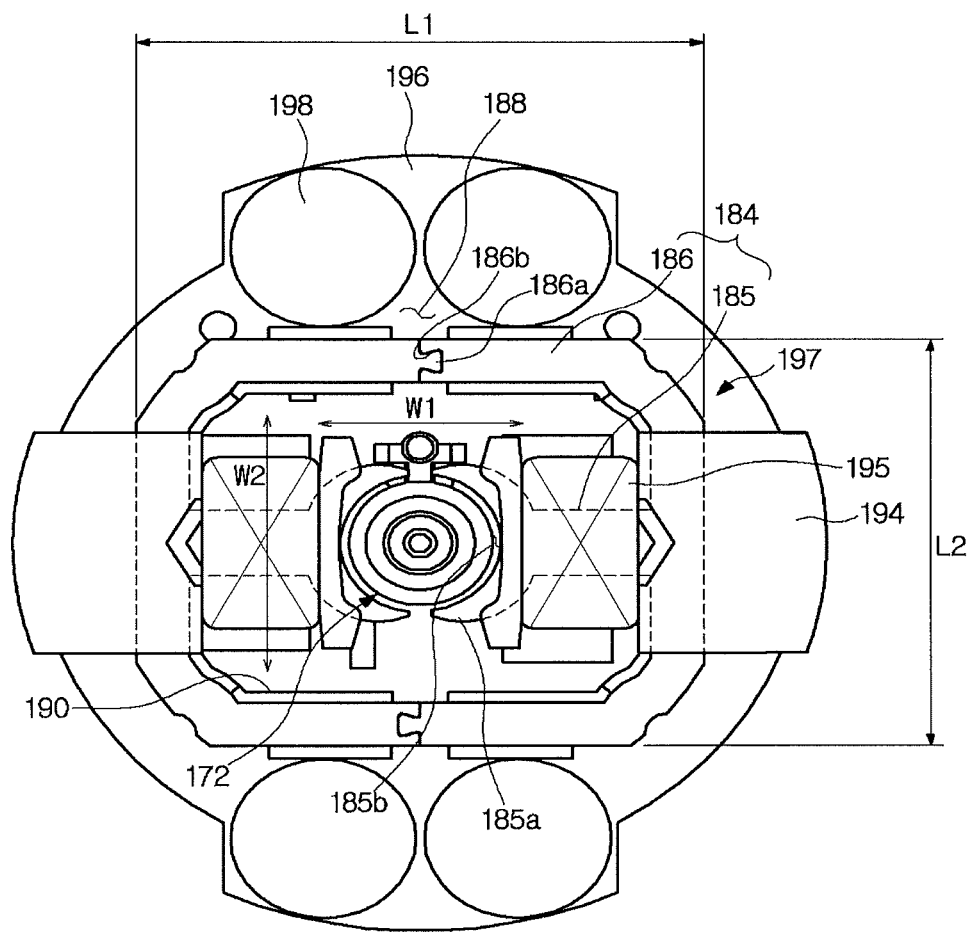
FIG. 8 is a view illustrating an arrangement relation between the motor and a circuit board, according to one or more embodiments.

FIG. 8 is a view illustrating an arrangement relation between the circuit board and the motor, according to one or more embodiments.

The circuit board 196 may be provided below the motor 170 so as to transmit electric signals to the motor 170. A mounting region 197 in which circuit elements are disposed may be provided on one surface of the circuit board 196. The circuit elements including heat dissipating elements, capacitors 198, etc. may be disposed in the mounting region 197.

The electric signals should be transmitted from the circuit board 196 to the motor 170, and heat generated from the circuit board 196 can be removed through the airflow generated by the operation of the motor 170. Thus, the circuit board 196 can be disposed in the vicinity of the motor 170. However, typically a space to avoid interference of the motor 170 with the circuit elements may be unnecessarily increased in actuality, and the motor assembly 100 may be increased in size. Rather, in one or more embodiments, the motor 170 may be provided to be formed longer in one direction, and the arrangement regions 188 may be provided on the same plane. That is, the arrangement regions 188 are extra spaces provided such that other components of the motor assembly 100 can be disposed, and may be provided at the opposite sides of the stator 180 which are formed in a lengthwise direction or in the one direction. In an embodiment, the housing 102 has an approximately cylindrical shape, and the impeller 130 is provided in a circular shape. Thus, each arrangement region 188 may be provided in a circular segment shape having a predetermined length of arc, for example.

Electrical elements may be disposed in the arrangement regions 188 of the motor 170 so as to avoid interfering with the motor 170 in the mounting region 197 of the circuit board 196. In the present embodiment, the example in which the capacitors 198 are disposed is given. However, other electrical elements may be disposed in the arrangement regions 188.

With this configuration, the motor 170 and the circuit board 196 can be disposed to be closer to each other, and thus the practical use of the internal space of the housing 102 can be improved.

Figure 9:
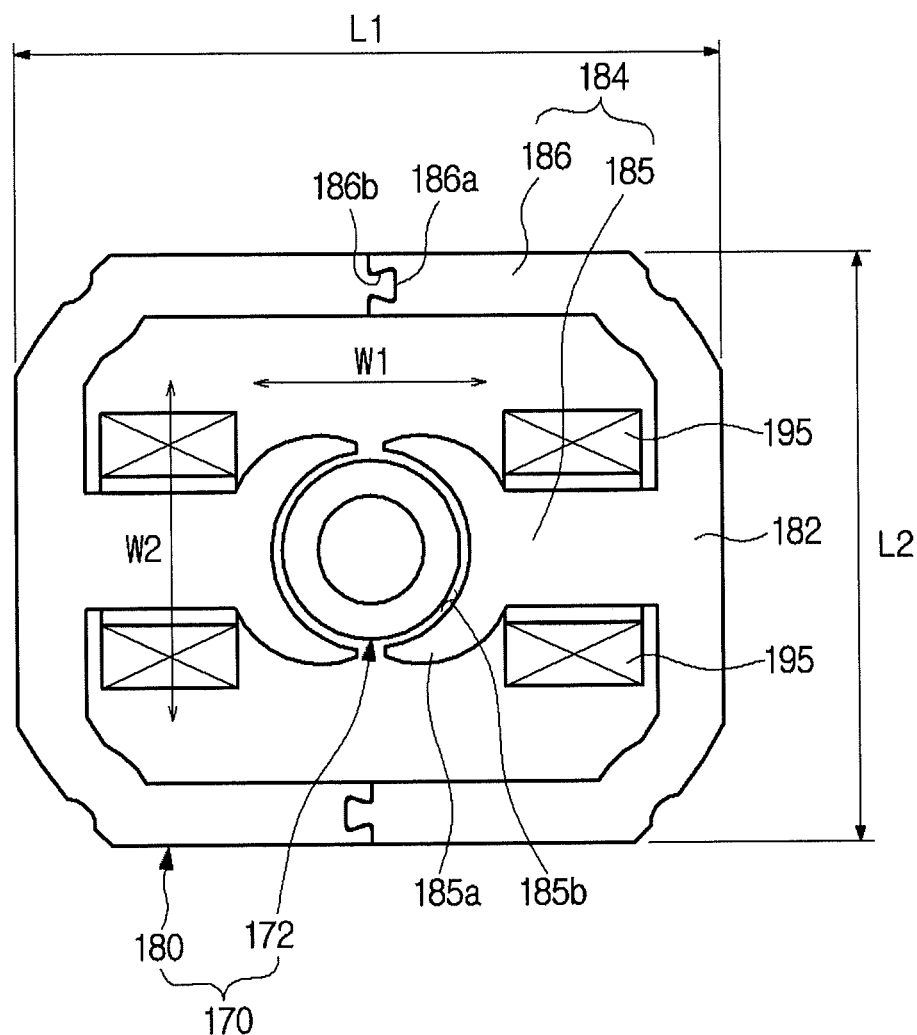
FIG. 9 is a front view of the motor, according to one or more embodiments.
Figure 10:
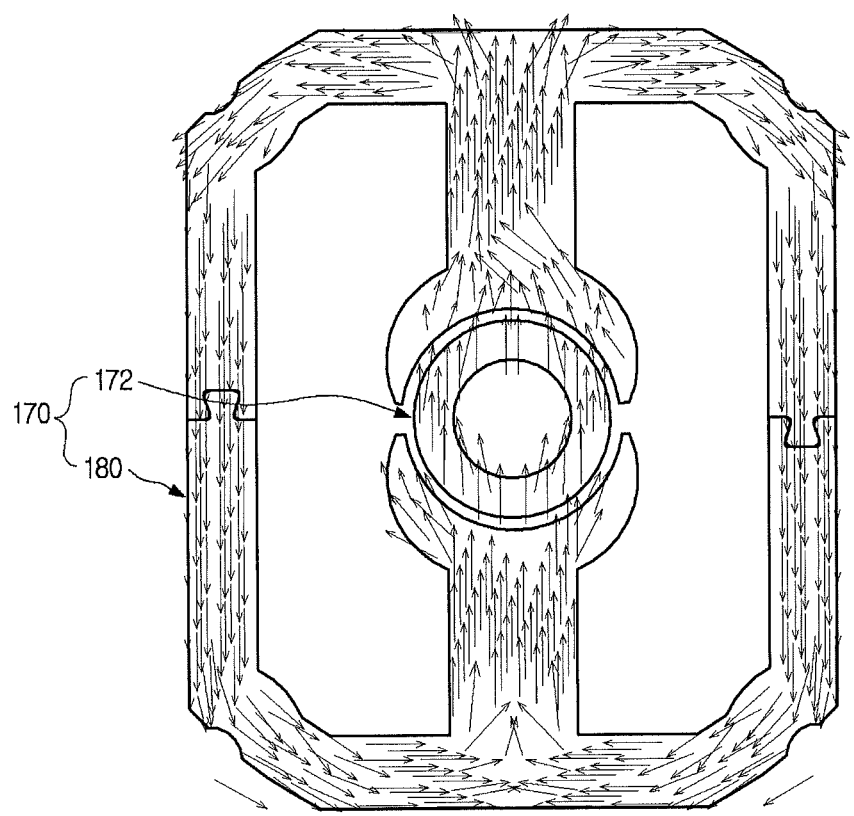
FIG. 10 is a view illustrating a flow of a magnetic field of the motor, according to one or more embodiments.

FIG. 9 is a front view of the motor, according to one or more embodiments. FIG. 10 is a view illustrating a flow of a magnetic field of the motor, according to one or more embodiments.

The stator 180 may be provided such that the pair of stator bodies 182 symmetrically face each other.

The pair of expanded cores 185*a* provided at the ends of the pair of center cores 185 and around the rotor 172 may be provided such that the centers of curved inner surfaces thereof deviate from each other. In detail, the pair of expanded cores 185*a* are provided to enclose the outer surface of the rotor 172 such thin the center of the inner surface of one of the expanded cores 185*a* deviates from the center of the inner surface of the other of the expanded cores 185*a*. With this configuration, the pair of expanded cores 185*a* enclosing the rotor 172 are provided to have electromagnetic influences different in intensity and direction from each other such that the rotor 172 can be rotated in any one direction, for example.

FIG. 10 is a view illustrating an electromagnetic flow passing through the stator 180 and the rotor 172.

The electromagnetic flow passing through the stator 180 and the rotor 172 is formed between the center core 185 and any one of the pair of side cores 186 by a change in polarity resulting from the rotation of the rotor 172.

Hereinafter, a process of assembling the motor assembly 100 according to one or more embodiments will be described.

Referring to FIG. 7, the pair of stator bodies 182 are coupled to one stator 180 by interlocking between the opposite side cores 186. At least part of the stator 180 is covered for electrical insulation by the insulators 190.

Referring FIGS. 6A and 6B, the gap 185*b* is formed in the rotor receptacle 187*a* defined between the expanded cores 185*a* by the pair of stator bodies 182 of the stator 180 coupled to the insulators 190, and the rotor 172 is inserted into the rotor receptacle 187*a*. In this state, the rotor 172 and the stator 180 are fixed as one module by the motor housing 142.

To be specific, one surface of the motor 170 and the other surface of the motor 170 are seated on the front seats 154 of the front motor housing 150 and the rear seats 164 of the rear motor housing 160, respectively. The lateral surfaces of the motor 170 are seated on the seating protrusions.

Further, the rotor shaft 172*b* passes through the through-holes of the motor housing 142 such that the rotor 172 and the stator 180 are concentrically disposed when the motor 170 is seated on and coupled to the motor housing 142.

The front motor housing 150 and the rear motor housing 160 may be coupled by the screws 148, and the coupling method is not limited thereto.

In this process, the motor 170 and the motor housing 142 may be formed as one module.

Referring to FIG. 5, the motor module 140 may be coupled into the seating hole 126 of the second housing 120. In detail, the body coupler 152 of the front motor housing 150 may be coupled into the seating hole 126 of the second housing 120.

The impeller 130 may be coupled to the rotor shaft 172*b* in front of the motor module 140. In detail, the impeller 130 may be disposed on the impeller seat 153 of the front motor housing 150.

The first housing 110 may be coupled in the front of the second housing 120. The shroud 112 is provided on the inner surface of the first housing 110, and forms a flow path toward the interior of the housing 102 along with the impeller 130 and the diffuser.

The capacitors 198 may be disposed in the arrangement regions 188 of the motor 170 in the rear of the motor module 140, and the circuit board 196 may be coupled to prevent electrical elements from interfering with the motor 170. In detail, the motor module 140 is provided such that it is physically coupled with the circuit board 196 by the circuit couplers coupled to the insulators 190 and that the coils 195 provided for the motor 170 can be electrically coupled with the circuit board 196.

As the motor module 140 is coupled with the housing 102 and the circuit board 196, the motor assembly 100 can be assembled.

Figure 11:
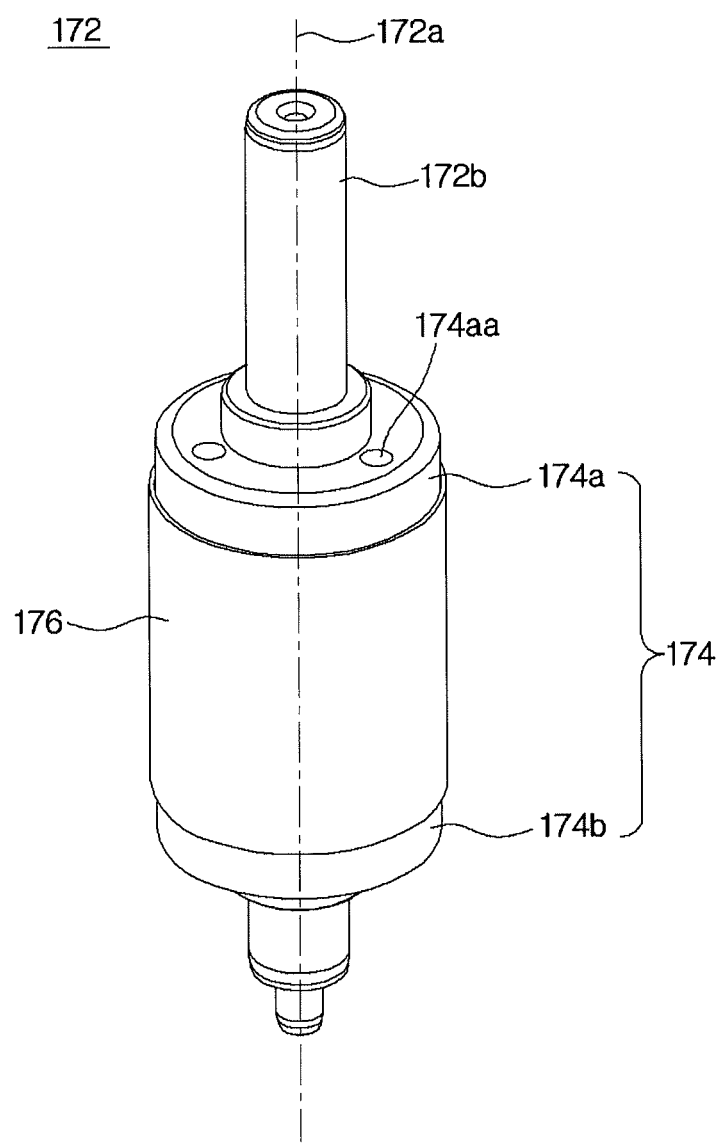
FIG. 11 is a perspective view of a rotor, according to one or more embodiments.
Figure 12:
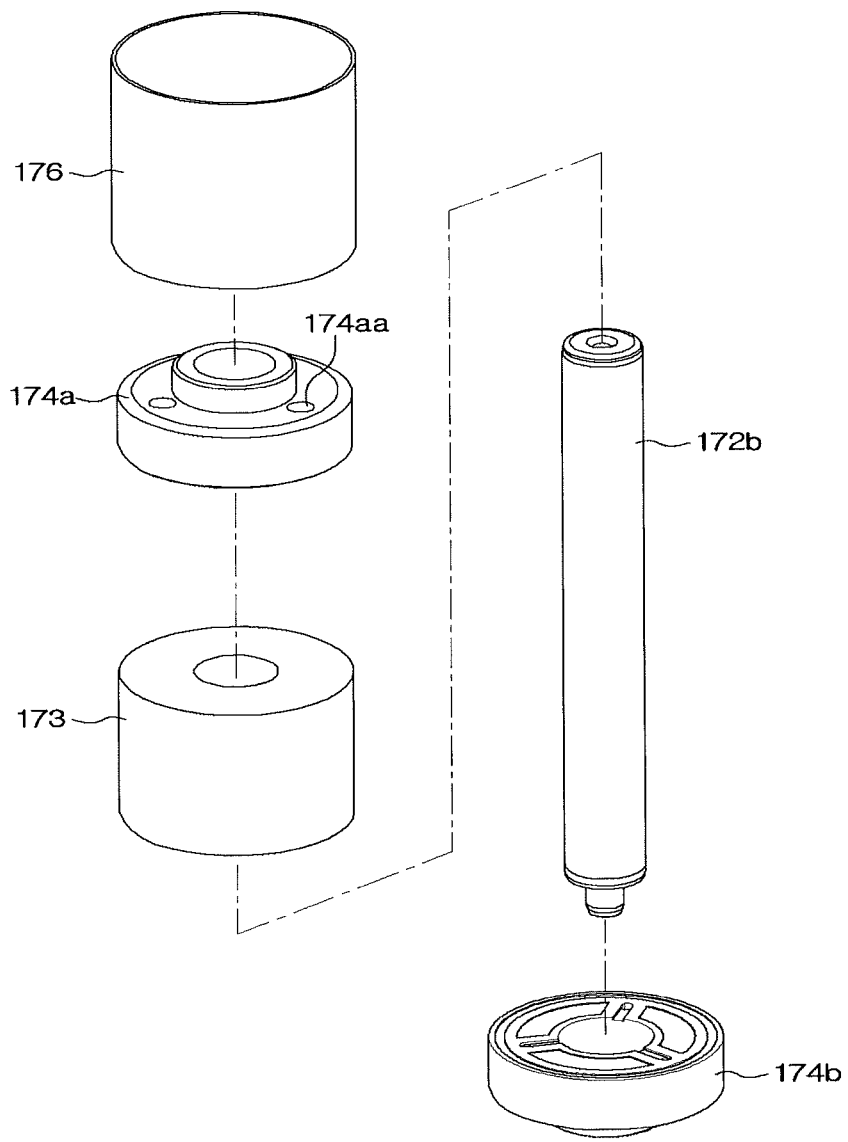
FIG. 12 is an exploded perspective view of the rotor, according to one or more embodiments.

FIG. 11 is a perspective view of the rotor, according to one or more embodiments. FIG. 12 is an exploded perspective view of the rotor, according to one or more embodiments.

The rotor 172 may be disposed in the rotor receptacle 187*a* of the stator 180. The rotor 172 may be provided to electromagnetically interact with the stator 180 in the rotor receptacle 187*a*.

The rotor 172 may include at least one magnet 173 in addition to the rotor shaft 172*b*.

The rotor shaft 172*b* is provided to be rotatable on its rotor axis 172*a*. The impeller 130 is coupled to one end of the rotor shaft 172*b* such that it can be rotated together with the rotor 172. The rotor shaft 172*b* may be provided in a rod shape, for example. The rotor shaft 172*b* can be rotated with the gap 185*b* that is formed between each expanded core 185*a* of the stator 180 and the rotor shaft 172*b*.

The magnet 173 is provided such that the rotor shaft 172*b* passes therethrough. That is, the magnet 173 is provided such that it can be disposed along a circumference of the rotor shaft 172*b*. A shape and layout of the magnet 173 are not restricted. However, in an embodiment, the magnet 173 is provided in an annular shape such that the rotor shaft 172*b* passes through the center of the annulus.

The rotor 172 may include a support member 174.

The support member 174 is provided to be close to the magnet 173. In detail, the support member 174 may be disposed close to the magnet 173 in a direction of the rotor axis 172*a*. A pair of support members 174 may be provided, and be disposed at opposite sides (one side and the other side) of the magnet 173 in the direction of the rotor axis 172*a*. The support members 174 may be balancers. That is, a pair of balancers may be provided on the opposite sides of the magnet 173 so as to compensate for eccentricity caused by the rotation of the rotor 172.

The support members 174 are provided such that the rotor shaft 172b passes therethrough. That is, each support member 174 may be provided such that it can be disposed along the circumference of the rotor shaft 172b. A shape and layout of each support member 174 are not restricted. For example, in an embodiment, each support member 174 is provided in an annular shape such that the rotor shaft 172b passes through the center of the annulus.

The support members 174 may include a first support member 174a disposed on one side of the magnet 173 in the direction of the rotor axis 172a, and a second support member 174b disposed on the other side of the magnet 173 in the direction of the rotor axis 172a. Since the support members 174 are the balancers, the first support member 174a serves as a first balancer, and the second support member 174b serves as a second balancer.

The rotor 172 may further include a magnet cover 176.

The magnet cover 176 is formed to enclose an outer circumferential surface of the magnet 173. When the rotor 172 is rotated at a high speed, such a magnet could become separated, and thus durability of the magnet may be reduced. For this reason, the magnet cover 176 formed to enclose the outer circumferential surface of the magnet 173, thereby improving the durability of the magnet 173.

The magnet cover 176 is not limited to any material as long as the material is provided to improve the durability of the magnet 173. For example, in an embodiment, a carbon fiber may be applied. The magnet cover 176 formed of the carbon fiber is provided to enclose the outer circumferential surface of the magnet 173 by a winding process, and is hardened to withstand high-speed rotation. Thereby, the durability of the magnet 173 is improved.

The magnet cover 176 may be directly wound around the magnet 173. Alternatively, the magnet cover 176 may be wound around a cylindrical jig, and be hardened to be fitted onto the outer circumferential surface of the magnet 173. The magnet cover 176 may be more firmly fixed to the magnet 173 by an adhesive between the magnet cover 176 and the magnet 173.

Figure 13A:
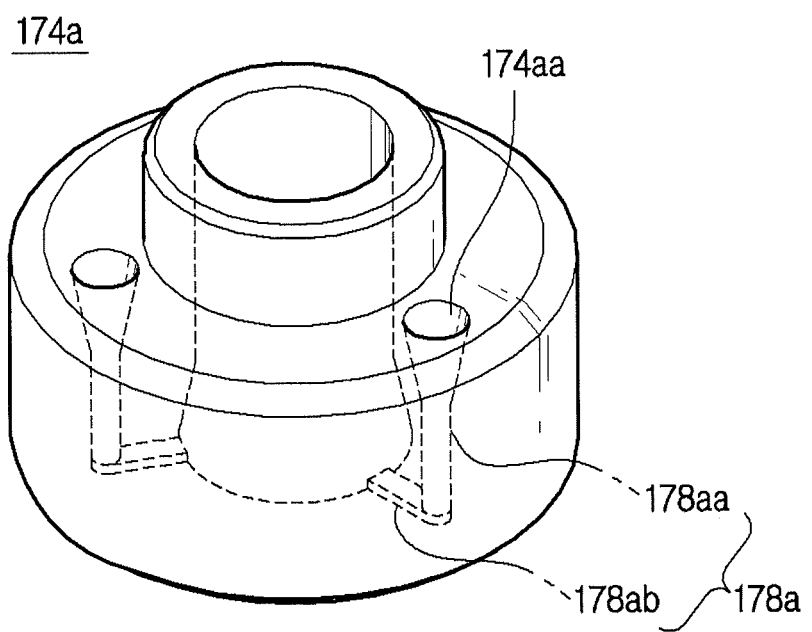
FIGS. 13A and 13B are perspective views of an auxiliary member of the rotor, according to one or more embodiments.
Figure 13B:
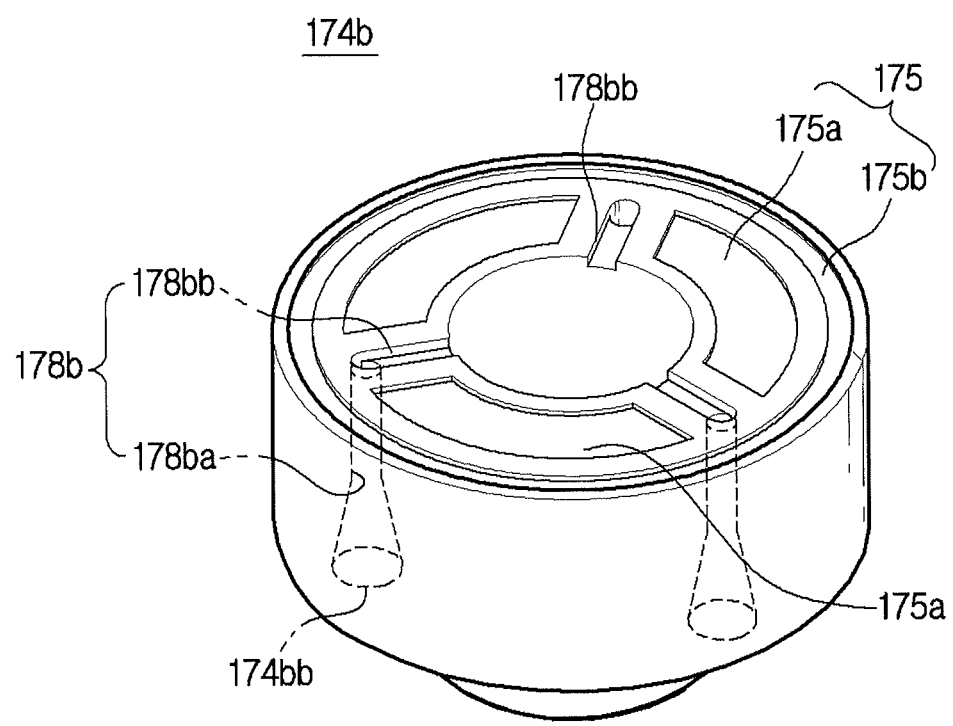
Figure 14:
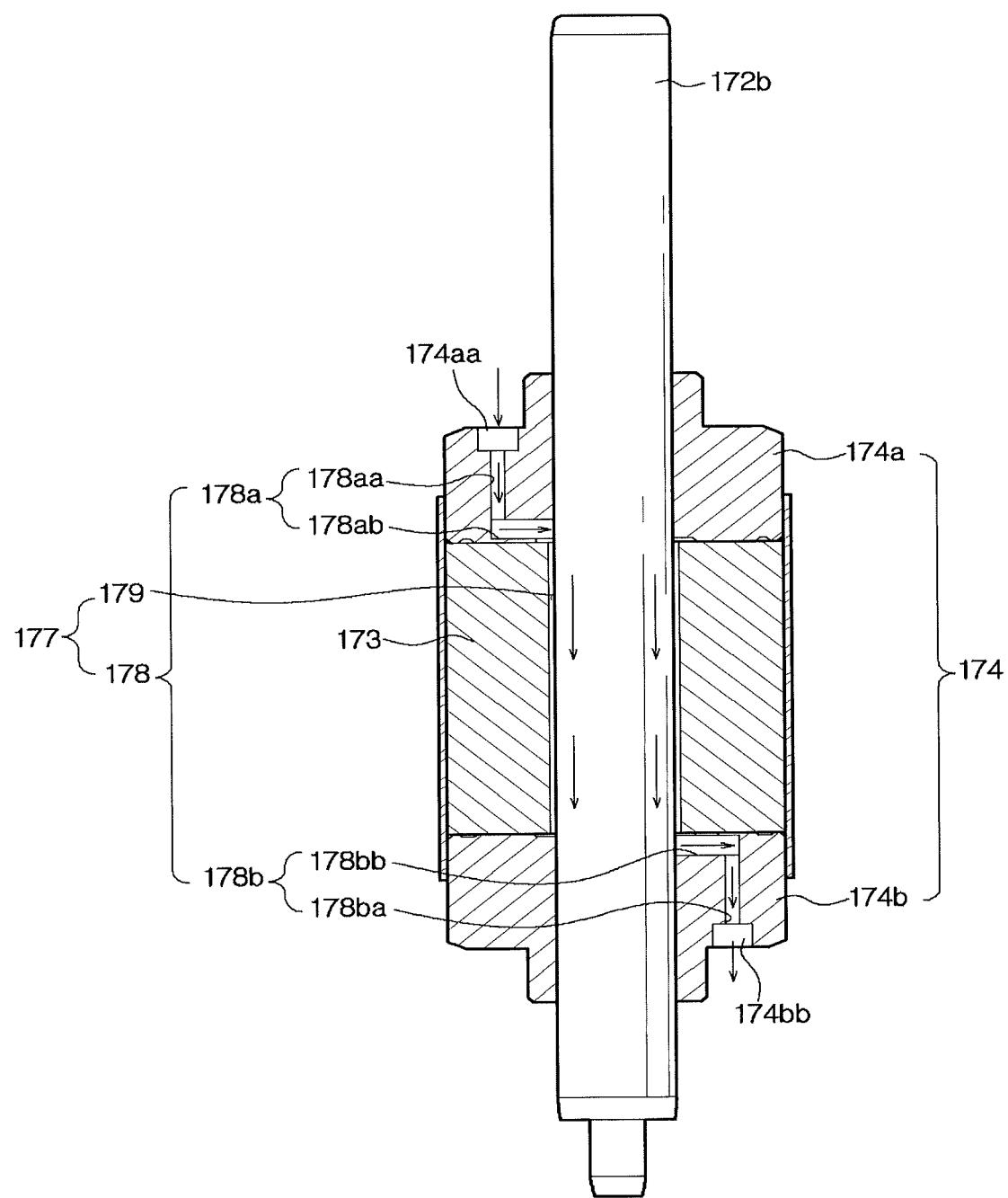
FIG. 14 is a cross-sectional view of the rotor, according to one or more embodiments.

FIGS. 13A and 13B are perspective views of the auxiliary member of the rotor, according to one or more embodiments. FIG. 14 is a cross-sectional view of the rotor, according to one or more embodiments.

The rotor 172 may include an internal channel 177 provided to cause an adhesive to flow for adhesion of the magnet 173, in addition to the rotor shaft 172b and the support members 174.

The internal channel 177 may include at least one adhesive channel 178 and at least one magnet bonding channel 179. The adhesive channel 178 may be included in each support member 174, and the magnet bonding channel 179 may be included in the magnet 173.

The adhesive channel 178 and the magnet bonding channel 179 are provided to communicate with each other. The adhesive is injected into the adhesive channel 178, and is caused to flow along the magnet bonding channel 179. Thereby, each component can be adhered. The adhesive channel 178 and the magnet bonding channel 179 may be formed in a bent shape for the purpose of adhering the multiple components of the rotor 172. For example, as described below, the adhesive channel 178 may be formed in the bent shape so as to communicate with the magnet bonding channel 179 such that the adhesive can flow and adhere the support members 174, the magnet 173, and the rotor shaft 172b.

The magnet bonding channel 179 is provided to allow the adhesive to flow for the adhesion of the rotor shaft 172b and the magnet 173. The magnet bonding channel 179 is defined by the outer circumferential surface of the rotor shaft 172b and an inner circumferential surface of the magnet 173. The magnet bonding channel 179 may be provided to have the shape of an annular flow path such that the adhesive can flow. After the magnet bonding channel 179 is filled with the adhesive, the magnet 173 and the rotor shaft 172b can be adhered while the adhesive is solidified.

The magnet bonding channel 179 may be formed between the rotor shaft 172b and the magnet 173, and particularly in a range between the opposite sides of the magnet 173 at the rotor shaft 172b. That is, the adhesive is applied only to a necessary portion in order to adhere the magnet 173 and the rotor shaft 172b. As a result, it is possible to increase production efficiency and to improve the quality of a product.

The adhesive channel 178 is provided to form a flow path along which the adhesive can flow for the adhesion of the support member 174 and the magnet 173. The adhesive channel 178 is formed in the support member 174.

The support members 174 may be provided with at least one inlet 174aa and at least one outlet 174bb such that the adhesive can flow into and out of the channels. The inlet 174aa may be formed in an outer surface of the first support member 174a, and the outlet 174bb may be formed in an outer surface of the second support member 174b. The number and arrangement of the inlets 174aa are not restricted. This is equally applied to the outlets 174bb. For example, in an embodiment, the inlets 174aa and the outlets 174bb are provided to correspond to the number of first adhesive channels 178a to be described below and the number of second adhesive channels 178b to be described below.

The adhesive channel 178 may include a first adhesive channel 178a formed in the first support member 174a, and a second adhesive channel 178b formed in the second support member 174b.

The first adhesive channel 178a is formed in the first support member 174a such that the adhesive can flow between the first support member 174a and one end face of the magnet 173. In detail, the first adhesive channel 178a is provided such that the adhesive can flow between the first support member 174a and the one end face of the magnet 173 facing the first support member 174a. One end of the first adhesive channel 178a may be provided to communicate with the inlet 174aa of the first support member 174a. The other end of the first adhesive channel 178a may be provided to communicate with the magnet bonding channel 179.

At least one first adhesive channel 178a may be provided. When a plurality of first adhesive channels 178a are provided, arrangement thereof is not restricted. In an embodiment, the first adhesive channels 178a are disposed parallel to the rotor axis 172a at regular intervals in a circumferential direction of the first support member 174a such that the adhesive uniformly flows into the channels. For example, three first adhesive channels 178a are disposed around the rotor axis 172a at intervals of 120 degrees.

Each first adhesive channel 178a may include an inflow channel 178aa and a first flow channel 178ab.

The inflow channel 178aa is provided to communicate with the inlet 174aa. The inflow channel 178aa may be disposed to pass through the first support member 174a, and be provided to communicate with the first flow channel 178ab.

The first flow channel 178*ab* is provided to guide the adhesive introduced into the inflow channel 178*aa* to the magnet bonding channel 179. One end of the first flow channel 178*ab* may be provided to communicate with an end of the inflow channel 178*aa*, and the other end of the first flow channel 178*ab* may be provided to communicate with the magnet bonding channel 179.

The first flow channel 178*ab* may be formed in an inner surface of the first support member 174*a* which faces the one end face of the magnet 173. The first flow channel 178*ab* may be provided to form a flow path from the end of the inflow channel 178*aa* to the magnet bonding channel 179 in the direction perpendicular to the rotor axis 172*a*.

A shape or arrangement of the first flow channel 178*ab* is not restricted. For example, in an embodiment, the first flow channel 178*ab* is formed in the inner surface of the first support member 174*a*. However, the first flow channel 178*ab* may be formed in the magnet 173 so as to have the same shape, for example.

The inlet 174*aa* may be disposed apart from the rotor shaft 172*b*, and the inflow channel 178*aa* communicating with the inlet 174*aa* may be provided to be separated in parallel from the rotor shaft 172*b*. To reduce flow resistance of an adhesive, a length of such a flow path along which the adhesive moves should be short. In contrast, to stably couple such a magnet and a first support member, such as the first support member 174*a*, the length of such a flow path should be long. Therefore, in one or more embodiments, the inlet 174*aa* is disposed apart from the rotor shaft 172*b*, and the inflow channel 178*aa* formed between the inlet 174*aa* and the first flow channel 178*ab* is formed to pass through the first support member 174*a* in parallel to the rotor axis 172*a* so as to reduce a flow path thereof. Thus, in this example, a length of the first flow channel 178*ab* may be relatively increased to the utmost.

The second adhesive channel 178*b* is formed in the second support member 174*b* such that the adhesive can flow between the second support member 174*b* and the other end face of the magnet 173. In detail, the second adhesive channel 178*b* is provided such that the adhesive can flow between the second support member 174*b* and the other end face of the magnet 173 facing the second support member 174*b*. One end of the second adhesive channel 178*b* may be provided to communicate with the outlet 174*bb* of the second support member 174*b*. The other end of the second adhesive channel 178*b* may be provided to communicate with the magnet bonding channel 179.

At least one second adhesive channel 178*b* may be provided. When a plurality of second adhesive channels 178*b* are provided, arrangement thereof is not restricted. For example, in an embodiment, the second adhesive channels 178*b* are disposed parallel to the rotor axis 172*a* at regular intervals in a circumferential direction of the second support member 174*b* such that the adhesive uniformly flows into the channels. In detail, three second adhesive channels 178*b* are disposed around the rotor axis 172*a* at intervals of 120 degrees. The arrangement of the second adhesive channels 178*b* may not correspond to that of the first adhesive channels 178*a*.

Each second adhesive channel 178*b* may include an outflow channel 178*ba* and a second flow channel 178*bb*.

The outflow channel 178*ba* is provided to communicate with the outlet 174*bb*. The outflow channel 178*ba* may be disposed to pass through the second support member 174*b*, and be provided to communicate with the second flow channel 178*bb*.

The second flow channel 178*bb* is provided to guide the adhesive flowing through the first adhesive channel 178*a* and the magnet bonding channel 179 to the outflow channel 178*ba*. One end of the second flow channel 178*bb* may be provided to communicate with an end of the outflow channel 178*ba*, and the other end of the second flow channel 178*bb* may be provided to communicate with the magnet bonding channel 179.

The second flow channel 178*bb* may be formed in an inner surface of the second support member 174*b* which faces the other end face of the magnet 173. The second flow channel 178*bb* may be provided to form a flow path from the magnet bonding channel 179 to the end of the outflow channel 178*ba* in the direction perpendicular to the rotor axis 172*a*.

A shape or arrangement of the second flow channel 178*bb* is not restricted. For example, in the present embodiment, the second flow channel 178*bb* is formed in the inner surface of the second support member 174*b* is given. However, in another embodiment, the second flow channel 178*bb* may be formed in the magnet 173 so as to have the same shape.

The outlet 174*bb* may be disposed apart from the rotor shaft 172*b*, and the outflow channel 178*ba* communicating with the outlet 174*bb* may be provided to be separated in parallel from the rotor shaft 172*b*. To reduce flow resistance of an adhesive, a length of such a flow path along which the adhesive moves should be short. In contrast, to stably couple a magnet and a second support member, such as the magnet 173 and the second support member 174*b*, a length of such a flow path should be long. Therefore, in one or more embodiments, the outlet 174*bb* is disposed apart from the rotor shaft 172*b*, and the outflow channel 178*ba* formed between the outlet 174*bb* and the second flow channel 178*bb* is formed to pass through the second support member 174*b* in parallel to the rotor axis 172*a* so as to reduce a flow path thereof. Thus, a length of the second flow channel 178*bb* may be relatively increased to the utmost.

The support member 174 may include an anti-leakage groove 175.

The anti-leakage groove 175 is provided to prevent the adhesive flowing along the channel from leaking out of the rotor 172. Further, the anti-leakage groove 175 is provided to enable collection of the adhesive, so that the support member 174 and the magnet 173 can be more firmly adhered. The anti-leakage groove 175 is disposed to be close to the channel. When the adhesive flowing along the channel leaks from the channel, the adhesive can be collected into the anti-leakage groove 175.

The anti-leakage groove 175 may be formed in an adhesion portion of the support member 174 which comes into contact with the magnet 173. Here, the adhesion portion may be provided in a plane shape so as to come into surface contact with the magnet 173. The anti-leakage groove 175 is recessed lower than the adhesion portion such that the adhesive can be collected in a recessed space. Thereby, it is possible to adhesion efficiency of the support member 174 and the magnet 173 and to prevent the adhesive from leaking into the outside.

The anti-leakage groove 175 may include at least one inner anti-leakage groove 175*a* and an outer anti-leakage groove 175*b*.

A plurality of inner anti-leakage grooves 175*a* may be provided to be disposed between the plurality of first adhesive channels 178*a* and between the plurality of second adhesive channels 178*b*. That is, the inner anti-leakage grooves 175*a* may be disposed between the plurality of first flow channels 178*ab* in the first support member 174*a*.

Further, the inner anti-leakage grooves 175a may be disposed between the plurality of second flow channel 178bb in the second support member 174b.

The inner anti-leakage grooves 175a may be formed around the rotor axis 172a in a circumferential direction of the support member 174 so as to have an approximately arcuate shape. The inner anti-leakage grooves 175a are formed in the circumferential direction of the support member 174, and the magnet 173 and the support member 174 come into contact with each other. Thus, even when the rotor 172 is rotated at a rapid speed, the magnet 173 and the support member 174 may not become decoupled.

The outer anti-leakage groove 175b may be disposed in the adhesion portion outside the adhesive channel 178. That is, the first flow channels 178ab or the second flow channels 178bb are formed in the adhesion portion, and the outer anti-leakage groove 175b is disposed outside the flow channels around the rotor axis 172a. Thereby, it may be is possible to prevent the adhesive from leaking from the channels to the outside.

A shape of the outer anti-leakage groove 175a is not restricted. For example, in the present embodiment, the outer anti-leakage groove 175a may be formed in the adhesion portion in an annular shape so as to efficiently prevent the leakage of the adhesive.

Further, in an embodiment, an annular ring may be provided in the outer anti-leakage groove 175a. The annular ring may be disposed in the outer anti-leakage groove 175a, so that the adhesive can be prevented from leaking between the support member 174 and the magnet 173.

Hereinafter, a method for producing the rotor 172 will be described.

The magnet 173 is coupled to the rotor shaft 172b, and the pair of support members 174 are respectively coupled at one side and the other side of the magnet 173.

The pair of support members 174 are respectively provided with the inlet 174aa and the outlet 174bb, both of which are connected by the internal channel 177 such that the adhesive flows.

When the adhesive is introduced into the inlet 174aa, the adhesive passes the inflow channel 178aa, and flows along the first flow channel 178ab formed between the first support member 174a and the magnet 173.

The adhesive passing the first flow channel 178ab flows along the magnet bonding channel 179 formed between the magnet 173 and the rotor shaft 172b, and is guided to the second flow channel 178bb formed between the magnet 173 and the second support member 174b.

The adhesive passing the second flow channel 178bb flows along the outflow channel 178ba, and is discharged outside from the outlet 174bb.

In this process, the internal channel 177 is filled with the adhesive, and the adhesive is cured after a predetermined time has elapsed. As a result, each component may be coupled.

Further, when the adhesive passing the internal channel 177 leaks from the internal channel 177, the adhesive is configured to be collected in the anti-leakage groove 175, so that the magnet 173 and the support members 174 can be more firmly coupled.

Figure 15:
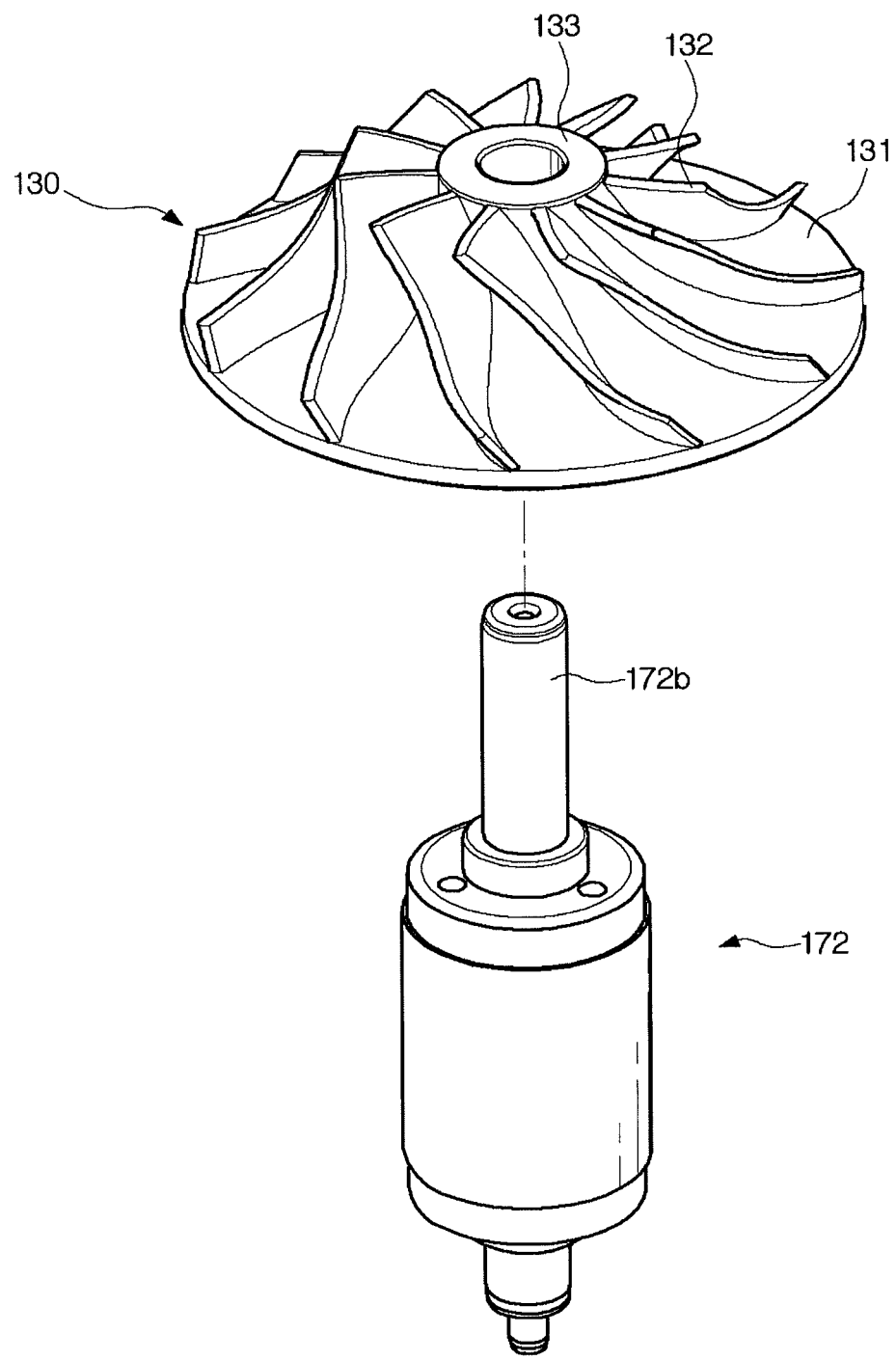
FIG. 15 is a disassembled perspective view of the rotor and an impeller, according to one or more embodiments.
Figure 16:
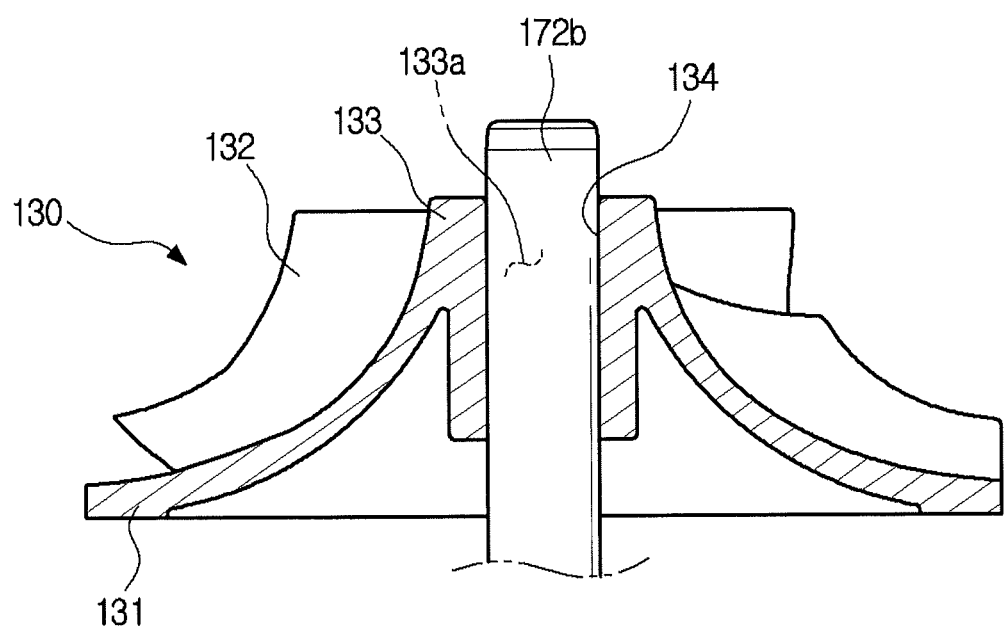
FIG. 16 is a cross-sectional view illustrating coupling of a rotor shaft and the impeller, according to one or more embodiments.

FIG. 15 is a disassembled perspective view of the rotor and the impeller, according to one or more embodiments. FIG. 16 is a cross-sectional view illustrating coupling of the rotor shaft and the impeller, according to one or more embodiments.

The impeller 130 is provided to rotate together with the rotor shaft 172b.

The impeller 130 may include an impeller body 131, a shaft coupler 133, and a plurality of blades 132.

The impeller body 131 is provided such that a cross section thereof is reduced in the direction of the rotor axis 172a. The impeller body 131 is provided such that air introduced in the direction of the rotor axis 172a by the rotation of the impeller 130 is discharged in a radial direction perpendicular to the rotor axis 172a.

The plurality of blades 132 are provided for the impeller body 131 so as to be rotated together with the impeller body 131 to form an airflow. The plurality of blades 132 may be provided on an outer surface of the impeller body 131. In detail, the rotor 172 is disposed at the back of the impeller body 131, and the plurality of blades 132 are disposed on a front surface of the impeller body 131. Thereby, the airflow can be formed.

The shaft coupler 133 is provided for the impeller body 131 such that the rotor shaft 172b can be coupled to the impeller body 131. The shaft coupler 133 is formed with a shaft inserting hole 133a into which the rotor shaft 172b can be inserted.

The shaft coupler 133 may include a shaft coupling face 134 corresponding to the outer circumferential surface of the rotor shaft 172b. An inner diameter of the shaft coupler 133 having the shaft coupling face 134 is provided to correspond to an outer diameter of the rotor shaft 172b, so that the rotor shaft 172b can be press-fitted into the shaft coupler 133.

The ways in which the rotor shaft 172b is coupled to the shaft coupler 133 is not restricted. In an embodiment, the rotor shaft 172b press-fitted into the shaft coupler 133, and thereby the impeller 130 and the rotor shaft 172b can be operated in one body.

Hereinafter, according to one or more embodiments, a motor assembly 200 and a vacuum cleaner 51 having the same will be described.

A description of components overlapping the description of those in the aforementioned one or more embodiments will be omitted.

Figure 17:
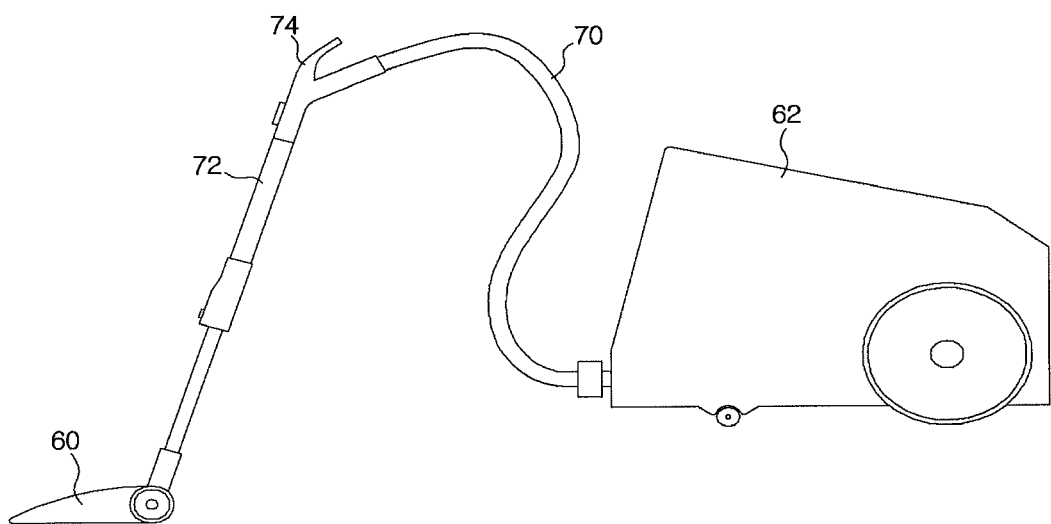
FIG. 17 is a view illustrating a vacuum cleaner, according to one or more embodiments.
Figure 18:
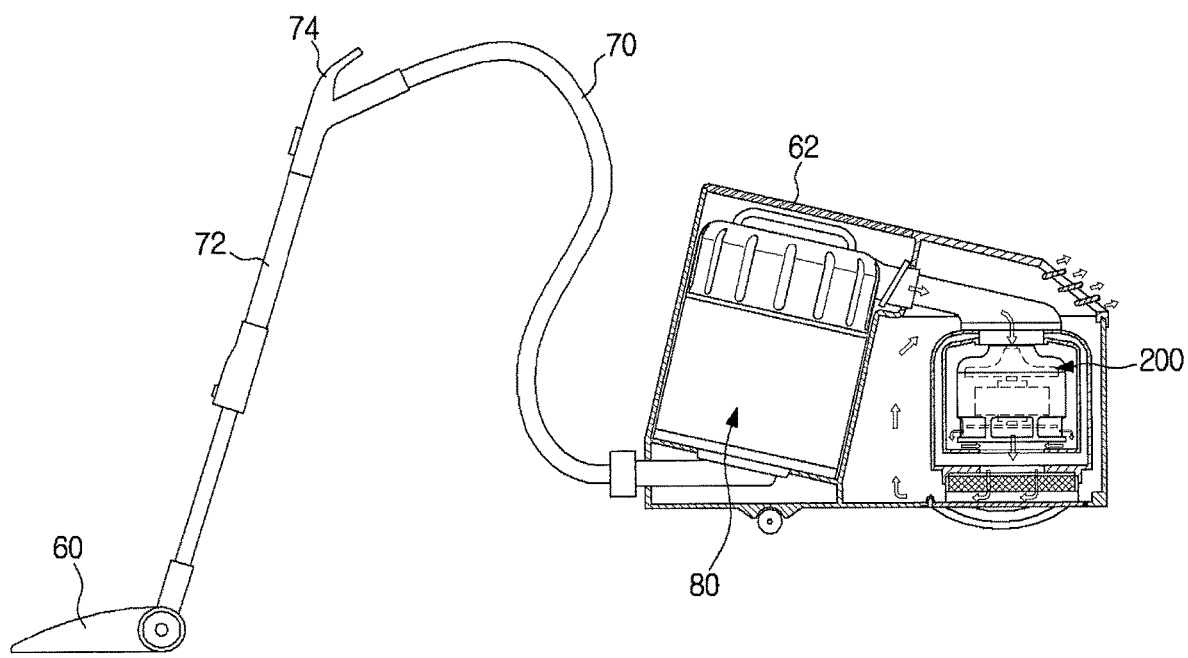
FIG. 18 is a cross-sectional view illustrating some components of the vacuum cleaner, according to one or more embodiments.

FIG. 17 is a view illustrating a vacuum cleaner, according to one or more embodiments. FIG. 18 is a cross-sectional view illustrating some components of the vacuum cleaner, according to one or more embodiments.

The vacuum cleaner 51 may be applied to a canister vacuum cleaner unlike the vacuum cleaner of FIG. 1. Here, though the type of the vacuum cleaner 1 of FIG. 1 and the type of the vacuum cleaner 51 of FIG. 17 are different from each other, they are distinguished herein merely for the convenience of description. For example, a motor assembly 200 of FIG. 18 may be applied to the stick vacuum cleaner 1 of FIG. 1, and the motor assembly 100 of FIG. 2 may be applied to the canister vacuum cleaner 51 of FIG. 17.

Referring to FIG. 17, the vacuum cleaner 51 includes a suction section 60 and a cleaner body 62.

The cleaner body 62 and the suction section 60 are interconnected through a connecting hose 70 and a connecting pipe 72 such that suction generated from the cleaner body 62 can be transmitted to the suction section 60. A handle 74 may be provided between the connecting hose 70 and the connecting pipe 72 so as to enable a user to grasp it.

The connecting hose 70 may be formed of a corrugated pipe having flexibility. One end of the connecting hose 70 is connected to the cleaner body 62, and the other end of the connecting hose 70 is connected to the handle 74. Thus, in this example, the suction section 60 can be free to move within a predetermined radius around the cleaner body 62. The connecting pipe 72 may be formed to have a predetermined length, and may be connected to the suction section 60 at one end thereof and to the handle 74 at the other end thereof. The user grasps the handle 74 to move the suction section 60. Thereby, the user can clean a surface, e.g., a floor to be cleaned.

The connecting hose 70 is connected in the front of the cleaner body 62 such that sucked air can be sent to the cleaner body 62.

The cleaner body 62 includes a motor assembly 200 and a dust container 80 provided therein. The motor assembly 200 is driven to generate the suction in the cleaner body 62, and the dust container 80 is provided to be disposed upstream of an air flow relative to the motor assembly 200 such that dirt or filth can be filtered and collected from the air introduced from the suction section 60.

Figure 19:
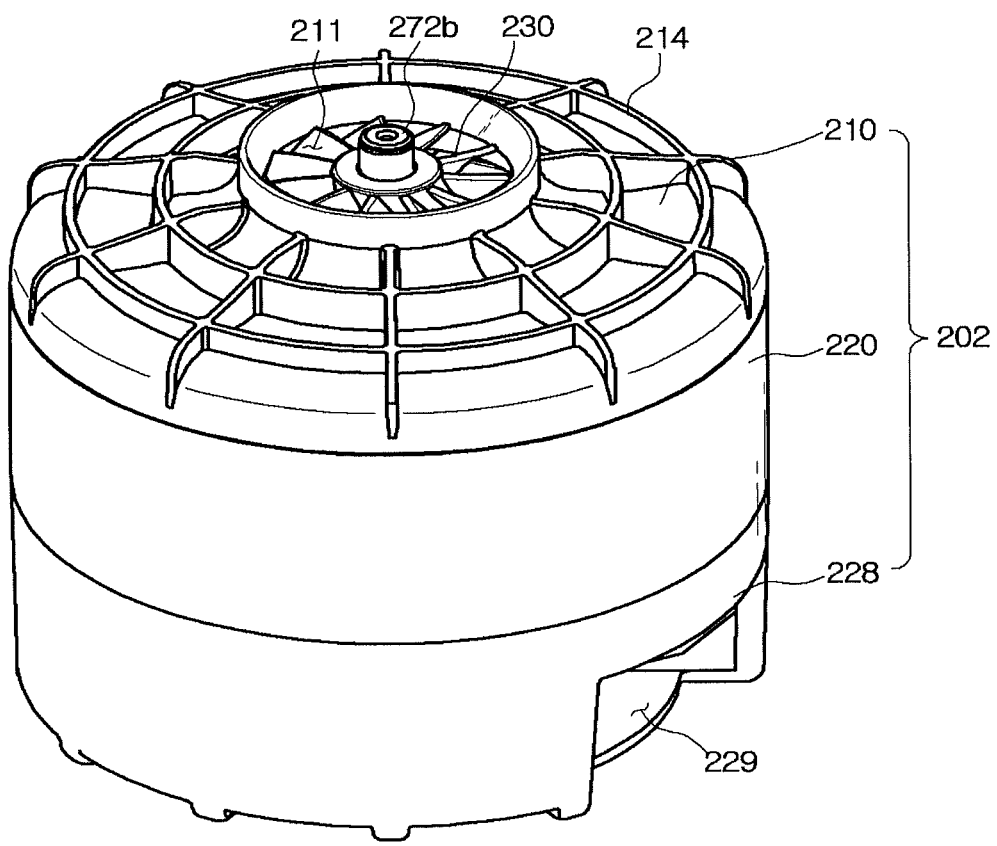
FIG. 19 is a perspective view of a motor assembly, according to one or more embodiments.
Figure 20:
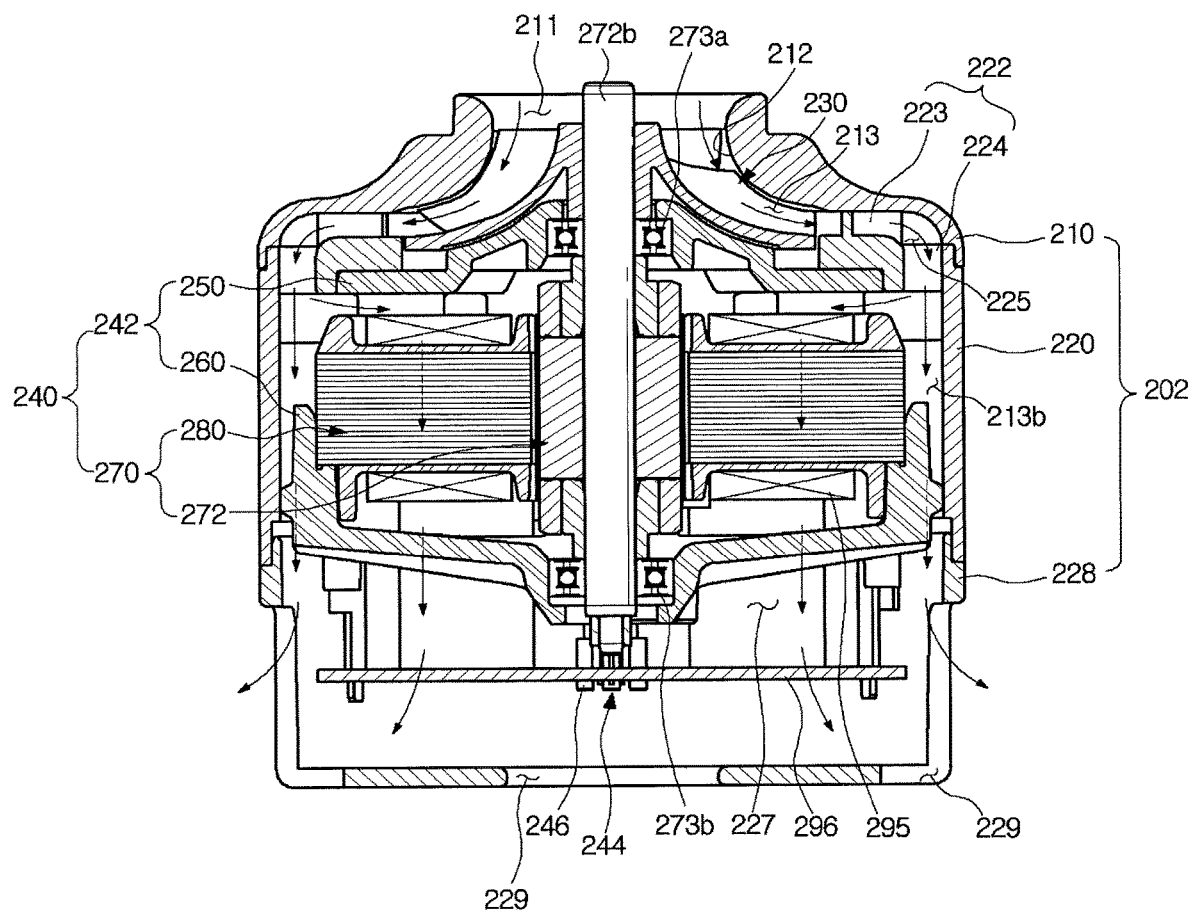
FIG. 20 is a cross-sectional view of the motor assembly, according to one or more embodiments.
Figure 21:
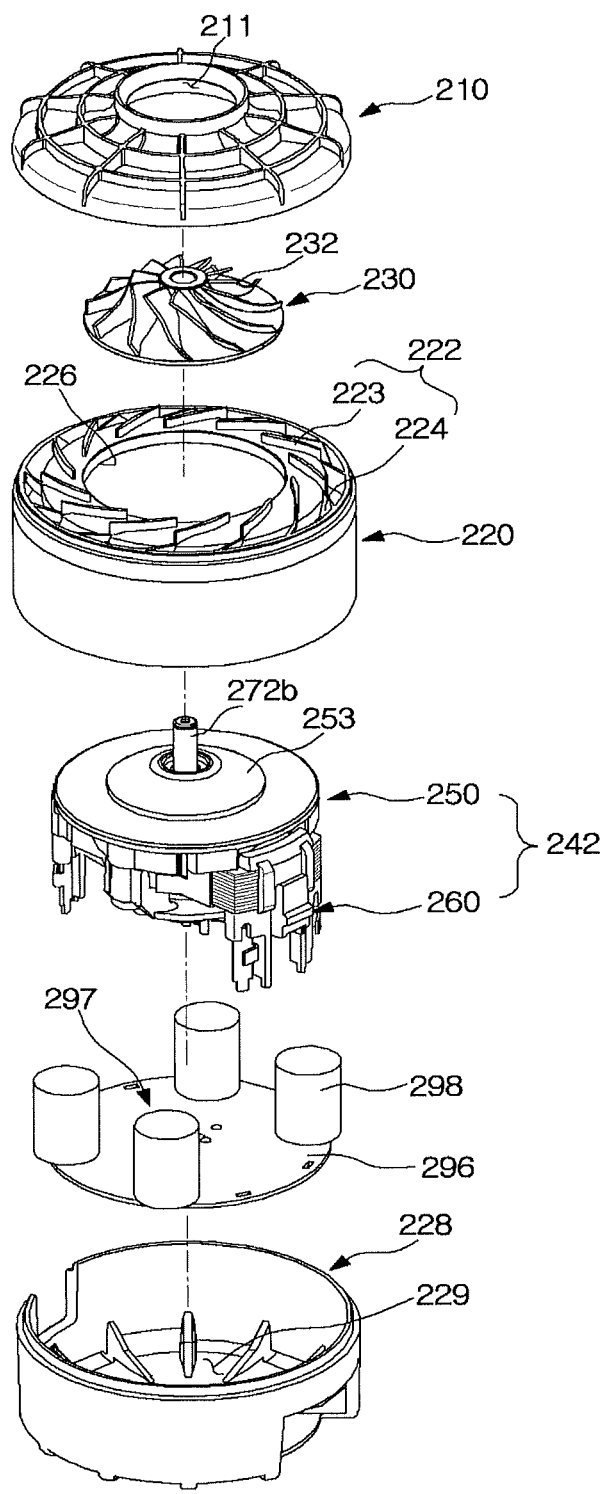
FIG. 21 is an exploded perspective view of the motor assembly, according to one or more embodiments.

FIG. 19 is a perspective view of a motor assembly, according to one or more embodiments. FIG. 20 is a cross-sectional view of the motor assembly, according to one or more embodiments. FIG. 21 is an exploded perspective view of the motor assembly, according to one or more embodiments.

The motor assembly 200 is provided inside the cleaner body 62 so as to generate suction.

The motor assembly 200 many include a housing 202, a motor 270 that is installed in the housing 202 and generates suction, a motor housing 242 that is provided in the housing 202 to fix the motor 270, and an impeller 230 that is rotatably installed on a shaft of the motor 270.

The housing 202 includes a first housing 210, a second housing 220 provided to be coupled with the first housing 210, and a third housing 228 coupled to a rear surface of the second housing 220. The housing 202 may be provided to have an approximately cylindrical shape. However, the shape of the housing 202 is not limited to such a shape, and may be variously provided. The first housing 210 and the second housing 220 may be provided to be separable in an axial direction of the rotor shaft 272b. The first housing 210 is provided with an air suction port 211 such that the air is introduced into the housing 202 by the motor 270, and the third housing 228 is provided with an air discharge port 229 such that the air introduced into the housing 202 is discharged.

The first housing 210 is provided with at least one flow path interception rib 214 on an upper surface thereof such that the air sucked by the motor 270 is prevented from leaking without being sucked into the air suction port 211. The flow path interception ribs 214 may be provided outside the air suction port 211 on the upper surface of the first housing 210. The flow path interception ribs 214 may be formed on the upper surface of the first housing 210 around the air suction port 211 in a concentric shape.

The third housing 228 is coupled with the second housing 220 at the back of the second housing 220 coupled to the rear surface of the first housing 210. Thus, the air suction port 211 may be provided in the front of the housing 202, and the air discharge port 229 may be provided in the rear of the housing 202. However, the air suction port 211 and the air discharge port 229 are not limited to such arrangement.

The first housing 210, the second housing 220, and the third housing 228 are coupled to define both an air flow path 213 that runs from the air suction port 211 to the air discharge port 229 and an internal space 227 in which the motor 270 or the impeller 230 is disposed.

The air flow path 213 may include a module flow path 213a and a module external flow path 213b. The air is sucked by the impeller 230 of the motor assembly 200, and the sucked air flows along the air flow path 213. The air introduced into the housing 202 may flow along the module flow path 213a into a motor module 240, and along the module external flow path 213b between an exterior of the motor module 240 and an interior of the housing 202. The sucked air passing the module flow path 213a can cool heat generated from an interior of the motor module 240. The sucked air passing the module flow path 213a and the sucked air passing the module external flow path 213b can cool heat generated from a circuit board 298 while passing the circuit board 298.

The first housing 210 may include a shroud 212.

The shroud 212 is provided to correspond to the impeller 230 or a diffuser 122 that will be described below, and guides the air introduced into the housing 202 by the motor 270. The shroud 212 may be provided such that the flow path becomes wider in a flowing direction of the air sucked from the air suction port 211 by the motor 270 and such that a space formed by the shroud 212 becomes wider with respect to the axial direction of the rotor shaft 272b. The shroud 212 causes the air introduced through the air suction port 211 to be guided into the housing 202, and may be provided in a shape corresponding to an upper portion of the impeller 230.

The impeller 230 may be provided inside the air suction port 211 of the first housing 210. The impeller 230 is provided to be rotated together with the rotor shaft 272b. The impeller 230 may be provided with a plurality of blades 132 generating a flow of air. The impeller 230 is provided such that the radius of gyration of each blade 132 becomes reduced along a radial direction away from the rotor 272. The plurality of blades 132 are provided to discharge the air, which is introduced toward the rotor shaft 272b by the rotation of the impeller 230, in a radial direction of the rotor shaft 272b. An example of the impeller 230 has been described. The shape and arrangement of the impeller 230 are not limited. Depending on embodiment, differing structures may be used as long as it causes the air to flow.

The second housing 220 may include a diffuser 222. The diffuser 222 is provided to increase a flow rate of the air flowing by means of the impeller 230. The diffuser 222 is provided to be disposed outside in a radial direction of the impeller 230.

The diffuser 222 may be provided in a radial direction with respect to the impeller 230. The diffuser 222 may be made up of a plurality of ribs 223 and 224. The plurality of ribs 223 and 224 of the diffuser 222 may be formed in a direction in which they extend with respect to the plurality of blades 232 of the impeller 230 such that an interval between the neighboring ribs becomes gradually increased. The plurality of ribs 223 and 224 are formed to increase the flow rate of the air while guiding the air flowing by way of the impeller 230. For example, in an embodiment, the diffuser 222 and the shroud 212 formed at the first housing 210 define a diffuser flow path 225 so as to increase the flow rate of the air while guiding the air flowing by way of the impeller 230.

The plurality of ribs 223 and 224 may include first ribs 223 and second ribs 224. The first ribs 223 are provided on the same plane as a downstream end of the air flow caused by the impeller 230, and the second ribs 224 are formed to have a predetermined inclination in a direction of the rotor axis 272a such that the air guided by the first ribs 223 is introduced into the housing 202 in an illustrated upward/downward axial direction of the rotor axis 272a.

The motor module 240 may be provided in the housing 202. The motor module 240 is provided such that the motor 270 is fixed in the housing 202 as one module.

The motor module 240 may include the motor 270 and the motor housing 242.

The motor housing 242 may include a front motor housing 250 and a rear motor housing 260 that is provided to be coupled with the front motor housing 250 across the motor 270.

The front motor housing 250 is provided to be able to be fixed to the housing 202. In detail, a seating hole 226 is formed in the center of the second housing 220 such that the front motor housing 250 is coupled, and thus the front motor housing 250 can be coupled to the seating hole 226. For example, the front motor housing 250 may be fitted into the seating hole 226. The coupling method is not restricted.

The front motor housing 250 may include a front motor housing body 251, an impeller seat 253, and a front seat 254. The front motor housing body 251 may be formed in an approximate disc shape, and include a body coupler 252 corresponding to a shape of the seating hole 226 so as to be coupled to the seating hole 226 of the second housing 220 as described above.

The impeller seat 253 is provided on a front surface of the front motor housing body 251 such that the impeller 230 is seated thereon. A front surface of the impeller seat 253 is provided to correspond to a shape of a rear surface of the impeller 230 in order to avoid interfering with rotation of the impeller 230 coupled to the rotor shaft 272b.

The front seat 254 is provided on a rear surface of the front motor housing body 251 such that the motor 270 is seated thereon. The front seat 254 is provided to seat and fix a stator 280 such that the center of the rotor 272b provided rotatably is disposed to be aligned with or identical to the rotational center of the impeller 230.

The shape of the front seat 254 is not restricted. In an embodiment, the front seat 254 is formed to protrude from the front motor housing body 251 such that the motor 270 can be seated at a predetermined distance from the front motor housing body 251.

The arrangement of the front seat 254 is not restricted. In an embodiment, four front seats 254 may be disposed to correspond to respective ends of the stator 280 because the stator 280 is formed to have a length longer in a first direction w1 than a length in a second direction w2.

The rear motor housing 260 is provided to be able to be coupled with the front motor housing 250. The motor 270 may be disposed between the front motor housing 250 and the rear motor housing 260.

The rear motor housing 260 may include a rear motor housing body 261 and a rear seat 264. The rear motor housing body 261 may be formed long in the first direction w1 that is a lengthwise direction of the stator 280 so as to correspond to a shape of the stator 280.

The front and rear motor housings 250 and 260 may be respectively provided with screw holes 251b and 261b such that they can be coupled to each other by screws 248.

A structure in which the motor 270 is fixed in the front and rear motor housings 250 and 260 will be described below in detail.

Figure 22A:
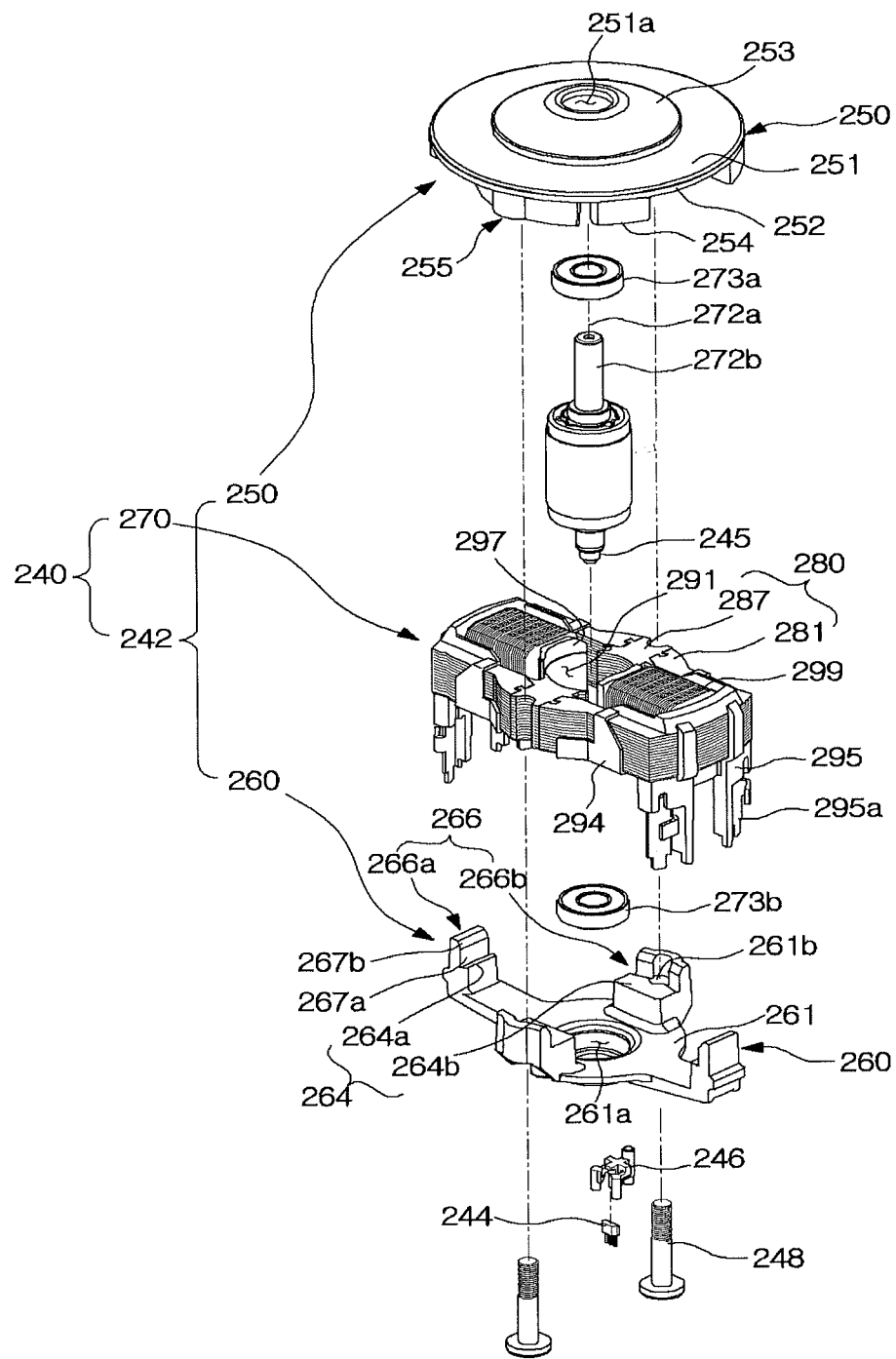
FIGS. 22A and 22B are exploded perspective views of a motor module, according to one or more embodiments.
Figure 22B:
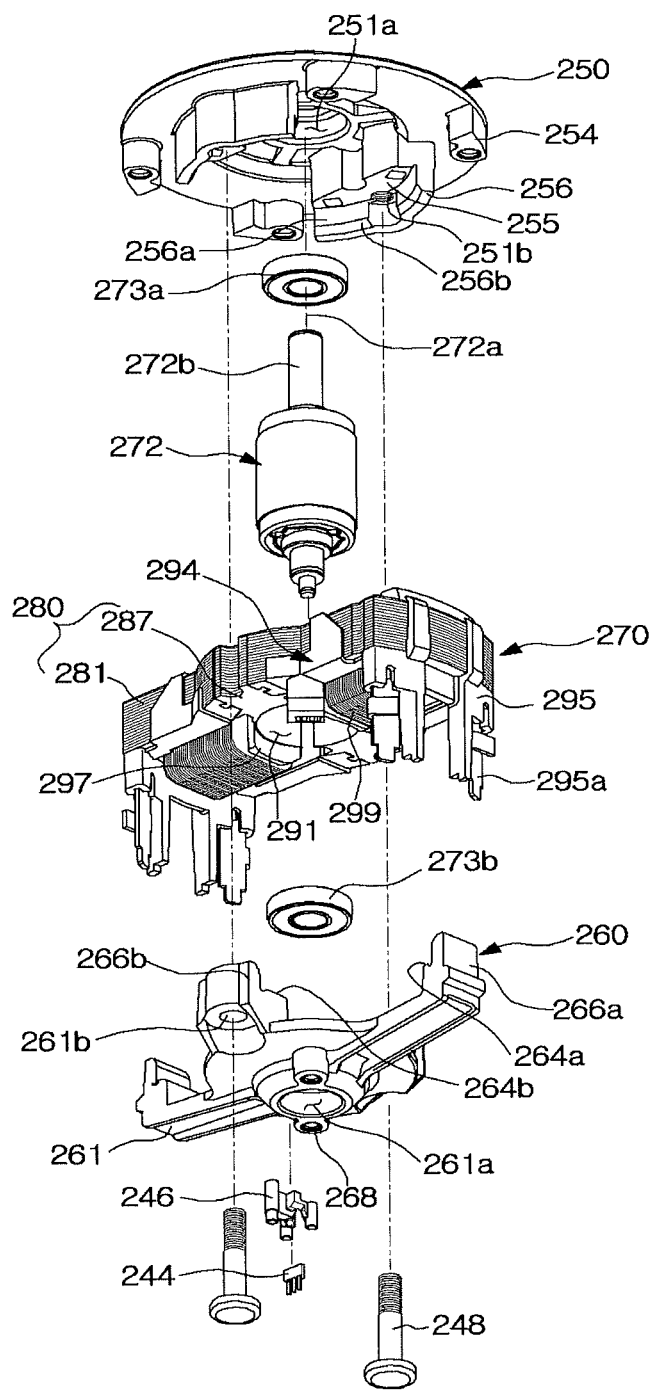

FIGS. 22A and 22B are exploded perspective views of a motor module, according to one or more embodiments.

The centers of the front and rear motor housings 250 and 260 are respectively provided with front and rear through-holes 251a and 261a through which the rotor shaft 272b can pass. Front and rear bearings 273a and 273b may be disposed in the respective front and rear through-holes 251a and 261a for the rotation of the rotor shaft 272b.

The front motor housing 250 may include front auxiliary seats 255 in addition to the front motor housing body 251 and the front seats 254.

The front motor housing body 251 is formed in an approximately circular shape.

The front seats 254 are provided inside the front motor housing body 251 such that one side of the motor 270 is seated thereon. That is, the front seats 254 may be provided on the rear surface of the front motor housing body 251. The front through-hole 251a may be formed in the center of the plurality of front seats 254 such that the centers of the rotor 272, the impeller 230, and the diffuser 222 are aligned with or identical to each other in a state in which the stator 280 is seated on or fixed to the front seats 254.

The front auxiliary seats 255 are provided inside the front motor housing 250. Further to an embodiment illustrated in FIG. 7, for example, the motor 270 may include at least one auxiliary stator 287. The front auxiliary seats 255 may be provided such that the auxiliary stator 287 can be seated and such that the middle of the motor 270 along the lengthwise direction can be stably supported.

The front auxiliary seats 255 are formed to protrude from the front motor housing body 251. Since a pair of auxiliary stators 287 are provided, the front auxiliary seats 255 are also provided as a pair in correspondence with the pair of auxiliary stators 287.

Each front auxiliary seat 255 is provided with a front seating protrusion 256. The front seating protrusions 256 are formed to surround at least part of an outer surface of the stator 280, and prevent the motor 270 from deflecting in a direction perpendicular to the rotor axis 272a when the motor assembly 200 is operated.

The front seating protrusions 256 are formed to further protrude from the front motor housing body 251 than the front auxiliary seats 255 such that inner surfaces thereof can surround the auxiliary stators 287. The front seating protrusions 256 may be provided to correspond to the auxiliary stators 287 along with the front auxiliary seats 255, and particularly to be able to surround outer surfaces of the auxiliary stators 287. That is, the front surface of the motor 270 is seated on the front seats 254 and the front auxiliary seats 255, and lateral surfaces of the motor 270 are seated on front protrusion seating faces 256a of the front seating protrusions 256. The front seating protrusions 256 may be formed with front guide faces 256b that guide the motor 270 to be easily seated on the front seats 254. The front guide faces 256b are provided with ends of the front seating protrusions 256 such that they can be formed inward so as to have a predetermined angle of inclination. The front guide faces 256b may be provided to be connected to the front protrusion seating faces 256a.

The rear motor housing 260 may include rear seating protrusions 266 in addition to the rear motor housing body 261 and the rear seats 264.

The rear motor housing body 261 may also be formed longer along the lengthwise direction of the stator 280 so as to correspond to the shape of the stator 280.

The rear seating protrusions 266 are formed to protrude forward from the rear motor housing body 261, and are provided to be able to support the lateral surfaces of the stator 280. The rear seating protrusions 266 may prevent the motor 270 from deflecting in a direction perpendicular to the rotor axis 272a when the motor assembly 200 is operated along with the front seating protrusions 256.

The rear seating protrusions 266 may include first rear seating protrusions 266a and second rear seating protrusions 266b.

The first rear seating protrusions 266a are provided to fix ends of the stator 280 along the first direction w1 that is the lengthwise direction of the stator 280, and the second rear seating protrusions 266*b* are provided to fix ends of the stator 280 along the second direction w2 perpendicular to the first direction w1. That is, the ends of the main stators 281 are fixed to the first rear seating protrusions 266*a*, and the auxiliary stators 287 are fixed to the second rear seating protrusions 266*b*.

The rear seats 264 may be provided inside the first and second rear seating protrusions 266*a* and 266*b* such that the other side of the motor 270 is seated and supported thereon. In detail, each of the rear seats 264 may include a first rear seat 264*a* provided inside each of the first rear seating protrusions 266*a*, and a second rear seat 264*b* provided inside each of the second rear seating protrusions 266*b*.

The rear seating protrusions 266 may include rear guide faces 267*b* that guide the motor 270 to be easily seated on the first rear seats 264*a* and the second rear seats 264*b* and may be formed inward to be inclined at a predetermined angle. In detail, the rear surface of the motor 270 is seated on the rear seats 264, and the lateral surfaces of the motor 270 are seated on rear protrusion seating faces 267*a* of the rear seating protrusions 266. The rear seating protrusions 266 may be formed with the rear guide faces 267*b* that guide the motor 270 to be easily seated on the rear seats 264. The rear guide faces 267*b* are provided with ends of the rear seating protrusions 266 such that they can be formed to have a predetermined angle of inclination. The rear guide faces 267*b* may be provided to be connected to the rear protrusion seating faces 267*a*.

The rear motor housing body 261 of the rear motor housing 260 may also be formed longer along the lengthwise direction of the stator 280 so as to correspond to the shape of the stator 280 to be described below. Four rear seating protrusions 266 may be provided to be disposed at positions that face the front seating protrusions 256 of the front motor housing 250. That is, the front seating protrusions 256 and the rear seating protrusions 266 may more firmly support the motor 270 disposed between them.

The rear motor housing 260 may be provided with a magnet sensor 244.

The magnet sensor 244 may be provided along the same line as a magnet 245 of the rotor 272, and can detect a position according to the rotation of the rotor 272. This information is transmitted to a position sensor of the circuit board 298. Thereby, it is possible to perform position control of the rotor 272.

The magnet sensor 244 may be disposed to be seated on a sensor bracket 246, and transmit the information to the circuit board 298. The sensor bracket 246 may be provided such that one end thereof is coupled to a sensor seat 268 provided on the rear surface of the rear motor housing 260 and the other end thereof is coupled to the circuit board 298. The position sensor may not be directly located at the rotor 272, but the magnet sensor 244 may be disposed near the rotor 272. Thereby, the position control of the rotor 272 can be realized by adding a simple structure.

The front and rear motor housings 250 and 260 may be provided with the respective screw holes 251*b* and 261*b* such that they can be coupled to each other by the screws 248. For example, in the present embodiment, the screw holes 251*b* are respectively formed in the two front auxiliary seat 255, and the screw holes 261*b* are respectively formed in the two second rear seats 264*b*. The screws 248 are provided to pass through the screw holes 261*b* of the second rear seats 264*b* and to be coupled to the corresponding screw holes 251*b* of the front auxiliary seat 255. That is, the front and rear motor housings 250 and 260 can be fixedly coupled by the two screws 248.

Figure 23:
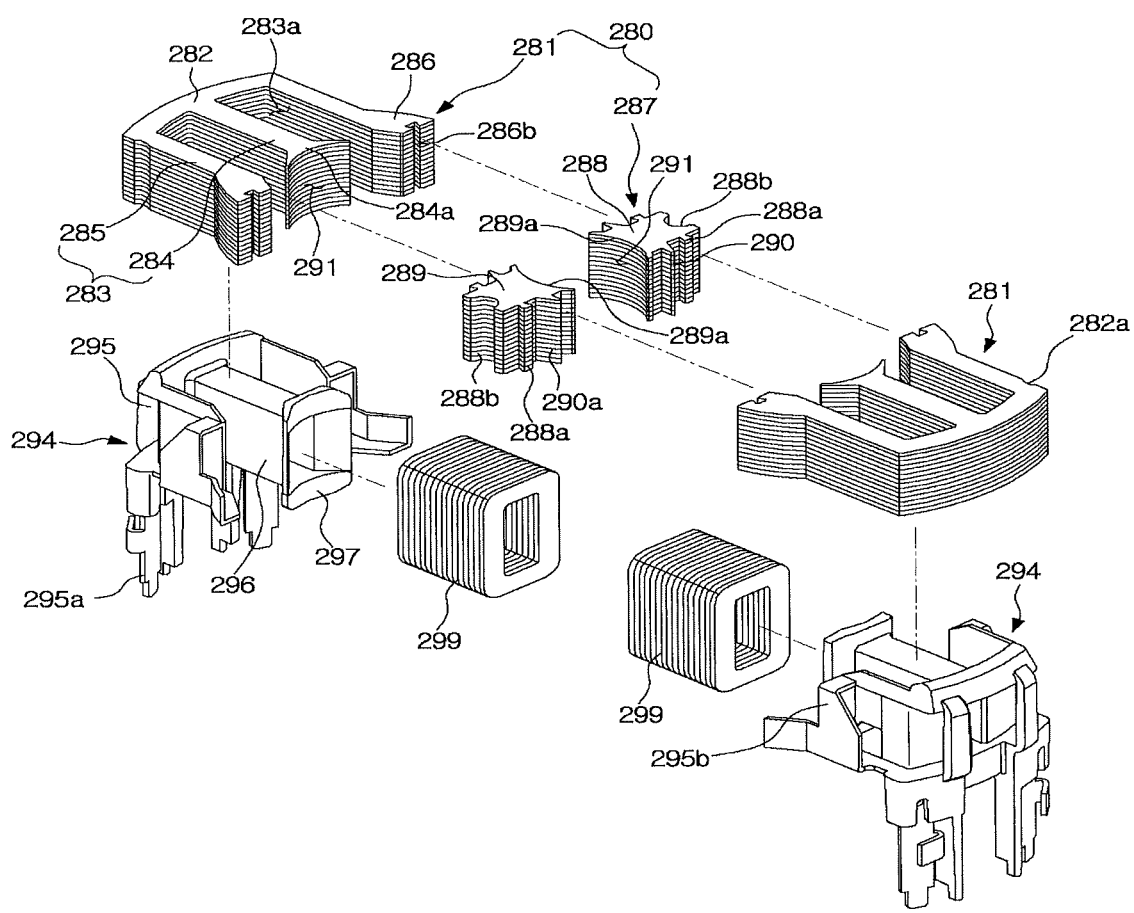
FIG. 23 is an exploded perspective view of a motor, according to one or more embodiments.

FIG. 23 is an exploded perspective view of a motor, according to one or more embodiments.

The motor 270 may include a rotor 272 and a stator 280.

The rotor 272 is rotatably provided in the center of the stator 280.

The stator 280 is provided to electromagnetically interact with the rotor 272.

The stator 280 may include main stators 281 and auxiliary stators 287.

Each main stator 281 may include a main stator body 282 and at least one main stator core 283 provided to extend from the main stator body 282.

The main stator body 282 is made up of a pair of main stator bodies 282 that are disposed across the rotor 272 in the first direction w1 so as to face each other. The pair of main stator bodies 282 may be provided to be coupled to each other in the first direction w1 that is the lengthwise direction of the stator 280. That is, the main stators 281 are not provided around the rotor 272 in a singular circular shape in a circumferential direction of the rotor 272, but the main stators 281 are provided to enclose the rotor 272. Here, a length L1 of the stator 280 in the first direction w1 may be longer than a length L2 of the stator 280 in the second direction w2 perpendicular to the first direction w1, such that, the stator 280 may be formed to meet a condition that L1 is greater than L2.

The main stator core 283 includes a center core 284 and side cores 285 provided at sides of the center core 284.

The center cores 284 are provided to face each other across the rotor 272. A rotor receptacle 291 is defined between the center cores 284 such that the rotor 272 is rotatable. A pair of side cores 285 are provided at both the sides of the center core 284 in parallel to the center core 284.

A stator slot 283*a* is formed between the center core 284 and the side core 285. As a coil 299 is wound around the center core 284, the coil 299 is housed in the stator slots 283*a*. An inner end of the center core 284 which is adjacent to the rotor 272 is provided with an expanded main core 284*a* in which a width of the center core 284 is partly increased. In detail, the expanded main core 284*a* is formed in such a way that the inner end of the center core 284 which is directed to the rotor 272 is increased in width to surround the circumference of the rotor 272. A gap 284*b* is formed for the rotation of the rotor 272 between an inner surface of the expanded main core 284*a* and an outer surface of the rotor 272.

The auxiliary stators 287 are provided to electromagnetically interact with the rotor 172 along with the main stators 281. The auxiliary stators 287 are provided to face each other across the rotor 272, and may be disposed in the second direction w2 perpendicular to the first direction w1. The auxiliary stators 287 may be provided as a pair, and be disposed between the pair of main stator bodies 282 so as to face each other across the rotor 272.

Each auxiliary stator 287 may include an auxiliary stator body 288 and at least one auxiliary core 289 provided to extend from the auxiliary stator body 288.

The auxiliary cores 289 are provided to face each other along the second direction w2 across the rotor 272, and may be formed to have respective lengths that are shorter than the length of the center core 284. The rotor receptacle 291 in which the rotor 272 is provided rotatably is defined between the auxiliary cores 289. That is, the rotor receptacle 291 may be formed between the pair of center core 284 and the pair of auxiliary core 289.

An inner end of the auxiliary core 289 which is adjacent to the rotor 272 is formed with an expanded auxiliary core 289a in which a width of the auxiliary core 289 is partly increased. In detail, the expanded auxiliary core 289a is formed in such a way that the inner end of the auxiliary core 289 which is directed to the rotor 272 is partly increased in width to surround the circumference of the rotor 272. The gap 284b is formed for the rotation of the rotor 272 between an inner surface of the expanded auxiliary core 289a and the outer surface of the rotor 272.

The main stators 281 and the auxiliary stators 287 may be formed by laminating pressed steel sheets.

Each main stator 281 may include main couplers 286 that are formed at ends of the side cores 285 so as to be bent outward.

The main couplers 286 are formed at the ends of the side cores 285 of each main stator 281 so as to be bent outward. The main couplers 286 are provided to increase coupling strength when coupled with the auxiliary stators 287 and to get the motor 270 stably supported on the motor housing 242. That is, the main couplers 286 are coupled with the auxiliary stators 287, thereby having a greater thickness than the neighboring main stators 281. With this configuration, the coupled regions between the main stators 281 and the auxiliary stators 287 can be increased in strength, and be stably supported on the front auxiliary seats 255 and the second rear seats 264b.

The main couplers 286 are formed with coupling sockets 286b such that they are coupled to the auxiliary stator 287, and the auxiliary stator 287 may be formed with coupling tails 288a. In detail, each auxiliary stator 287 may be disposed between the pair of main couplers 286 facing each other, and the main stators 281 and the auxiliary stators 287 may be coupled by interlocking between the coupling sockets 286b provided in each main coupler 286 and the coupling tails 288a provided at both the sides of each auxiliary stator 287.

Each auxiliary stator 287 may include contact flanges 290 and a fixing groove 288b.

The contact flanges 290 are formed to extend from the auxiliary stator body 288 toward the main stators 281 disposed at both the sides of the auxiliary stator 287 in the first direction w1, and may be provided to be disposed inside the main couplers 286. Each main coupler 286 includes a coupling face 286a that is provided on an inner surface thereof in a concave shape such that one of the contact flanges 290 is seated. Each contact flange 290 includes a flange seating face 290a provided to correspond to the coupling face 286a in a convex shape. The example in which the coupling face 286a and the flange seating face 290a are the concave face and the convex face is given. However, according to one or more embodiments, any shape is possible as long as the coupling face 286a and the flange seating face 290a can be in surface contact with each other. The coupling face 286a and the flange seating face 290a are provided to have a predetermined inclination with respect to the first direction w1 or second direction w2. Thereby, the auxiliary stators 287 may be arranged so as to not easily separate from the main stators 281.

The contact flanges 290 are seated on the inner surfaces of the main couplers 286, and thereby the auxiliary stators 287 are prevented from moving from the inside to the outside of the main couplers 286.

The fixing groove 288b is provided in an outward end of the auxiliary stator body 288 so as to be recessed inward from the auxiliary stator body 288. An outer surface of the screw 248 disposed when the front motor housing 250 and the rear motor housing 260 are coupled is located in the fixing groove 288b. The outer surface of the screw 248 is seated on the fixing groove 288b, and supports one side of the auxiliary stator 287.

An insulator 294 is formed of a material having an electrical insulating property. The insulator 294 is formed to surround a part of the stator 280, particularly the center core 284. The insulator 294 includes an insulator body 295 that is provided to correspond to the main stator bodies 282 of the stator 280, a center core support 296 that is provided to correspond to the center core 284 at the insulator body 295, and a coil guide 297 that protrudes from the center core support 296 in a radially outward direction.

The insulator 294 may include at least one body coupler 295a. The body coupler 295a is provided at one side of the insulator body 295 so as to guide the coil 299 wound around the motor 270 to the circuit board 298. Further, the body coupler 295a is provided to be inserted into and fixed to the circuit board 298 such that the motor 270 and the circuit board 298 can be coupled.

The coil 299 is wound around the center core 284 and the center core support 296 in a state in which the insulator 294 is coupled with the stator body 282 of the stator 280. The coil 299 may be wound around the side cores 285 and the insulator 294 surrounding the side cores 285. However, it is only described as an example embodiment that the coil 299 is wound around the center core 284 and the center core support 296.

The insulator 294 may include core reinforcements 295b. The core reinforcements 295b are provided outside the stator 280 so as to vertically support the stator 280. In an embodiment, the core reinforcements 295b are provided outside the side cores 285 so as to vertically support the side cores 285. For example, in an embodiment where the stator 280 is formed by laminating the pressed steel sheets, the core reinforcements 295b vertically support the stator 280, and thereby the durability of the stator 280 can be improved.

Here, the above descriptions of a flow path guide, e.g., with respect to FIGS. 4 and 5, are also applicable to embodiments represented by FIGS. 21 and 22, as only examples.

Figure 24:
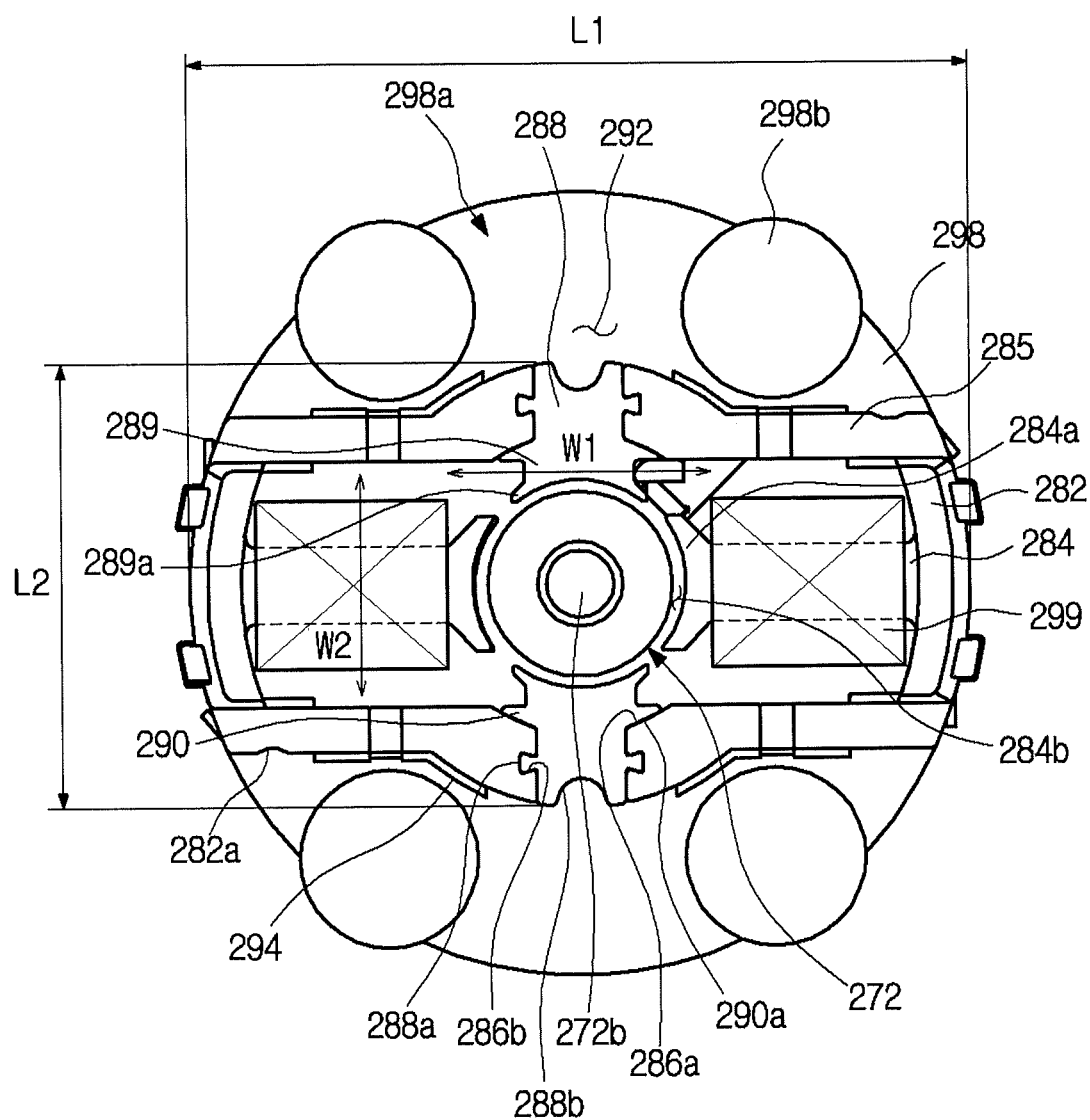
FIG. 24 is a view illustrating an arrangement relation between a circuit board and the motor, according to one or more embodiments.

In one or more embodiments, as the stator 280 is formed to be longer in the first direction w1, arrangement regions 292, e.g., shown in FIG. 24, may be provided around the rotor 272 in a circumferential direction of the stator 280. That is, the arrangement regions 292 may be provided at portions perpendicular to the lengthwise direction of the stator 280

The arrangement regions 292 may be regions provided on the same plane as the stator 280, and may be provided to improve practical use of the internal space 227 of the motor assembly 200. Each arrangement region 292 may formed in an approximately semi-circular shape, as only an example. Components of the motor assembly 200 may be disposed in the arrangement regions 292. For example, in an embodiment, at least one capacitor 298b may be disposed.

The arrangement regions 292 may be provided as a pair at both the sides of the stator 280, and the capacitors 298b may also be provided as a pair. In an embodiment, a total of four capacitors 298b may be disposed in the arrangement regions 292 two by two. Each capacitor 298b serves to smooth an electric current or to remove a ripple.

FIG. 24 is a view illustrating an arrangement relation between the circuit board and the motor, according to one or more embodiments.

The circuit board 298 may be provided below the motor 270 so as to transmit electric signals to the motor 270. A mounting region 298a in which circuit elements are disposed may be provided on one surface of the circuit board 298. The circuit elements including heat dissipating elements, capacitors 298b, etc. may be disposed in the mounting region 298a.

The electric signals should be transmitted from the circuit board 298 to the motor 270, and heat generated from the circuit board 298 can be removed through the air flow generated by the operation of the motor 270. Thus, the circuit board 298 can be disposed in the vicinity of the motor 270. However, typically, a space to avoid interference of the motor 270 with the circuit elements may be unnecessarily increased in actuality, and the motor assembly 200 may be increased in size. Rather, in an embodiment, the motor 270 may be provided to be formed longer in one direction, and the arrangement regions 292 may be provided on the same plane. That is, the arrangement regions 292 are extra spaces provided such that other components of the motor assembly 200 can be disposed, and may be provided at the opposite sides of the stator 280 which are formed in a lengthwise direction or in one direction. In an embodiment, the housing 202 may have an approximately cylindrical shape, and the impeller 230 provided in a circular shape. Thus, in such an example, each arrangement region 292 may be provided in a circular segment shape having a predetermined length of arc.

Electrical elements may be provided in the mounting region 298a of the circuit board 298. The electrical elements may be disposed to overlap the arrangement regions 292 of the motor 270 so as to avoid interfering with the motor 270.

Although an example in which the capacitors 298b are disposed is given, other electrical elements may be disposed in the arrangement regions 292.

With this configuration, the motor 270 and the circuit board 298 can be disposed to be closer to each other, and thus the practical use of the internal space of the housing 202 can be improved.

Figure 25:
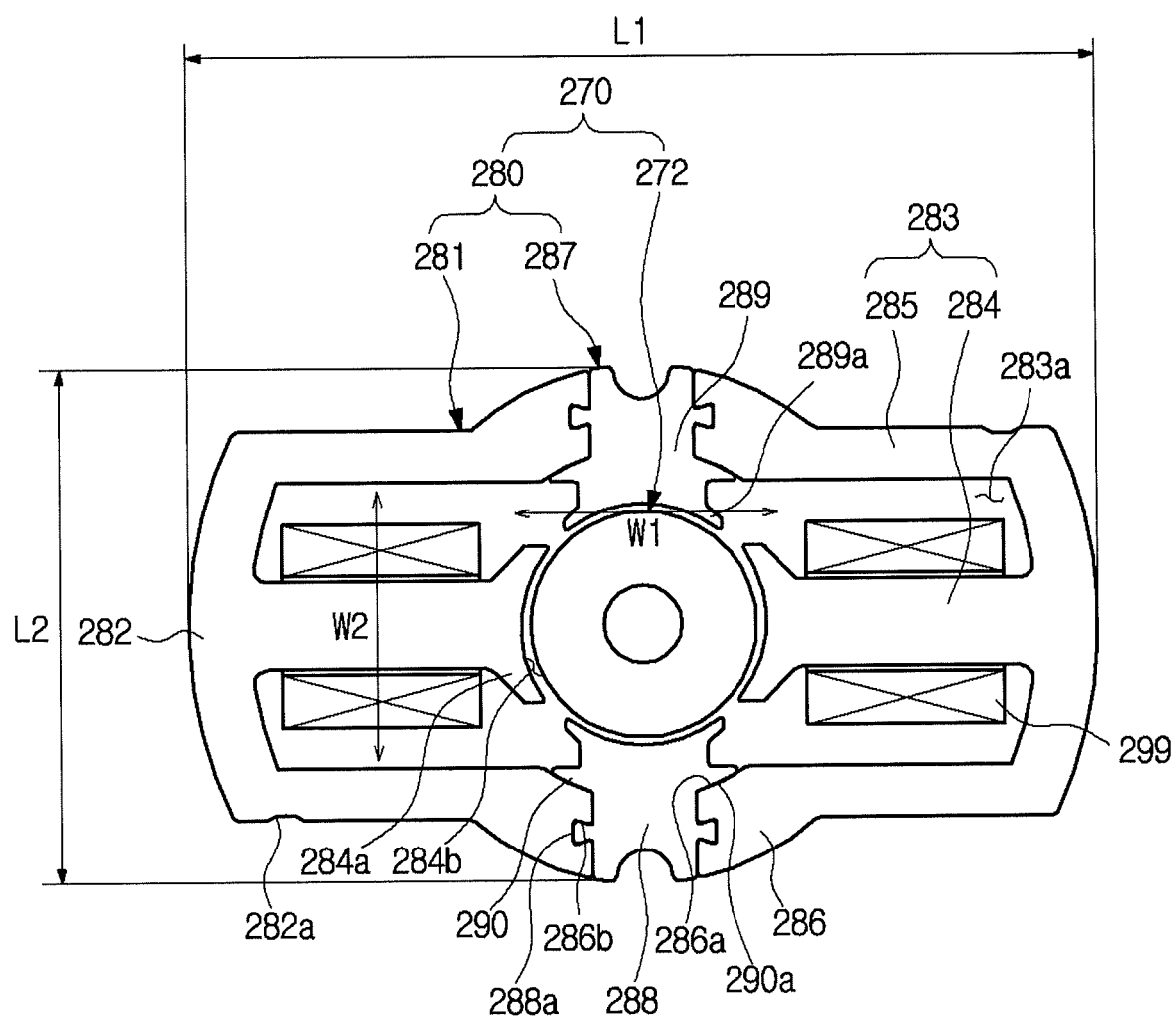
FIG. 25 is a front view of the motor, according to one or more embodiments.
Figure 26:
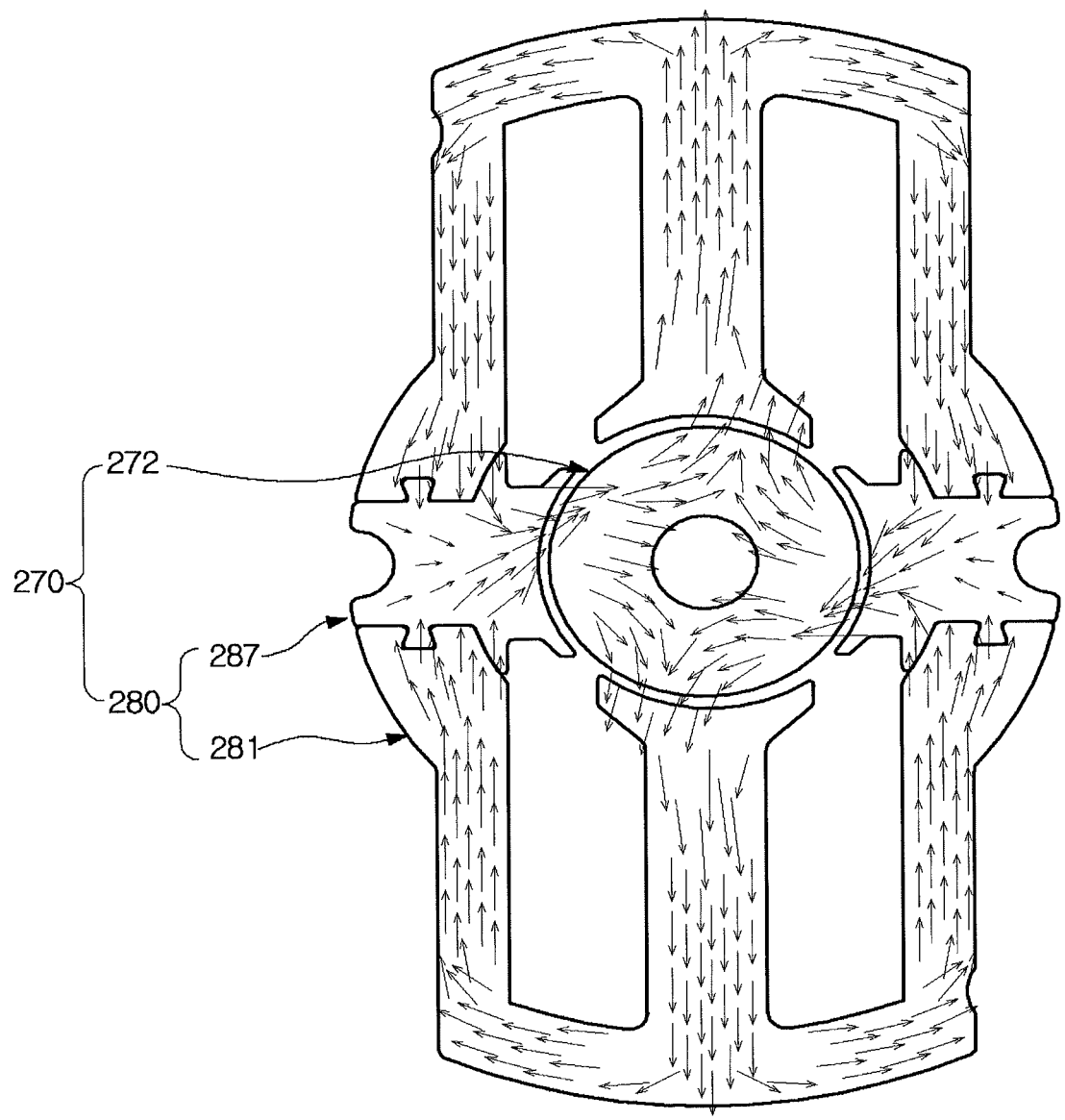
FIG. 26 is a view illustrating a flow of a magnetic field of the motor, according to one or more embodiments.

FIG. 25 is a front view of the motor, according to one or more embodiments. FIG. 26 is a view illustrating a flow of a magnetic field of the motor, according to one or more embodiments.

The main stators 281 of the stator 280 may be provided in symmetry with respect to the rotor 272.

The pair of expanded main cores 284a and the pair of expanded auxiliary cores 289a, which form the gap 284b with respect to the outer surface of the rotor 272 around the rotor 272, may be provided such that the centers of the curved inner surfaces thereof deviate from each other.

In detail, the pair of expanded main cores 284a and the pair of expanded auxiliary cores 289a are provided to enclose the outer surface of the rotor 272 such that the center of the inner surface of one of the expanded main cores 284a or one of the expanded auxiliary cores 289a deviates from the center of the inner surface of the other of the expanded main cores 284a or the other of the expanded auxiliary cores 289a.

With this configuration, the pair of expanded main cores 284a or the pair of expanded auxiliary cores 289a enclosing the rotor 272 are provided to have electromagnetic influences different in intensity and direction from each other such that the rotor 272 can be rotated in any one direction.

The stator bodies 282 or 288 may include direction recognition grooves 282a provided to be able to recognize a coupling direction of the stator. An example in which the direction recognition grooves 282a are applied to the main stator bodies 282 is given, however the position of the direction recognition groove 282a is not restricted. The direction recognition groove 282a may be provided only for any one of the main stator bodies 282 so as to be able to distinguish a leftward/rightward direction of the main stator body 282. As described above, the center of the inner surface of one of the expanded main cores 284a or one of the expanded auxiliary cores 289a is formed to be different from the center of the inner surface of the other of the expanded main cores 284a or the other of the expanded auxiliary cores 289a. That is, an end of one of the expanded main cores 284a or one of the expanded auxiliary cores 289a is formed to be closer to the rotor than an end of the other of the expanded main cores 284a or the other of the expanded auxiliary cores 289a.

When the pair of stator bodies 282 or 288 are coupled without distinguishing the leftward/rightward direction in such a way that ends of the expanded main or auxiliary cores 284a or 289a which are adjacent to the rotor are disposed in the same direction, start torque required for initial rotation of the rotor 272 is not generated. Therefore, the pair of stator bodies 282 or 288 are coupled such that the direction recognition grooves 282a provided for the stator bodies 282 or 288 are disposed in symmetry with respect to the rotor 272, and thereby making it easy to generate the start torque required to the initial rotation of the rotor. Although the direction recognition grooves 282a have been illustrated and described in the present embodiment, they may be applied to other embodiments described herein.

FIG. 26 is a view illustrating a magnetic field formed at the stator 280 and the rotor 272.

A magnetic field is formed at the stator 280 and the rotor 272 when electric current is supplied to the motor 270 and thus the stator 280 and the rotor 272 electromagnetically interact with each other. The magnetic field is formed at the stator 280 and the rotor 272 by a change in polarity caused by the rotation of the rotor 272.

Hereinafter, a process of assembling the motor assembly 200, according to one or more embodiments, will be described.

Referring to FIG. 23, the pair of main stator bodies 282 are coupled via the pair of auxiliary stator 287. That is, the auxiliary stators 287 are disposed between the side cores 285 of the pair of main stator bodies 282 that are opposite to each other, and are coupled with the pair of main stator bodies 282. Thereby, the stator 280 is formed.

At least part of the stator 280 is covered with the insulators 294 for the purpose of electrical insulation.

Referring to FIGS. 22A and 22B, the rotor 272 is inserted into the rotor receptacle 291 formed in the stator 280 coupled to the insulators 294 with the gap 284b formed between each expanded core and the rotor 272. The motor 270 made up of the rotor 272 and the stator 280 is fixed to the motor housing 242 as one module.

For example, respective surfaces of the motor 270 are seated on the front seat 254 and the front auxiliary seat 255 of the front motor housing 250 and the rear seat 264 of the rear motor housing 260, with lateral surfaces of the motor 270 being seated on the front and rear seating protrusions 256 and 266.

Further, the rotor shaft 272b passes through the through-holes of the motor housing 242 such that the rotor 272 and the stator 280 have the same center when the motor 270 is seated on and coupled to the motor housing 242.

The front motor housing 250 and the rear motor housing 260 may be coupled by the screws 248, and the coupling method is not limited thereto.

In this process, the motor 270 and the motor housing 242 may be provided as the motor module 240.

Referring to FIG. 21, the motor module 240 may be coupled to the seating hole 226 of the second housing 220. In detail, the body coupler 252 of the front motor housing 250 may be coupled to the seating hole 226 of the second housing 220.

The impeller 230 may be coupled to the rotor shaft 272b in the front of the motor module 240. In detail, the impeller 230 may be disposed on the impeller seat 253 of the front motor housing 250.

The first housing 210 may be coupled to the front of the second housing 220. The shroud 212 is provided on the inner surface of the first housing 210, thereby forming a flow path running into the housing 202 together with the impeller 230 and the diffuser.

The capacitors 298b are disposed in the arrangement regions 292 of the motor 270 in the rear of the motor module 240, and the circuit board 298 may be coupled to prevent the motor 270 from interfering with the other electric elements. In detail, the motor module 240 is provided such that it can be physically coupled with the circuit board 298 by circuit couplers coupled to the insulators 294 and that the coils 299 provided for the motor 270 can be electrically coupled with the circuit board 298.

As the motor module 240 is coupled with the housing 202 and the circuit board 298, the motor assembly 200 can be assembled.

Figure 27:
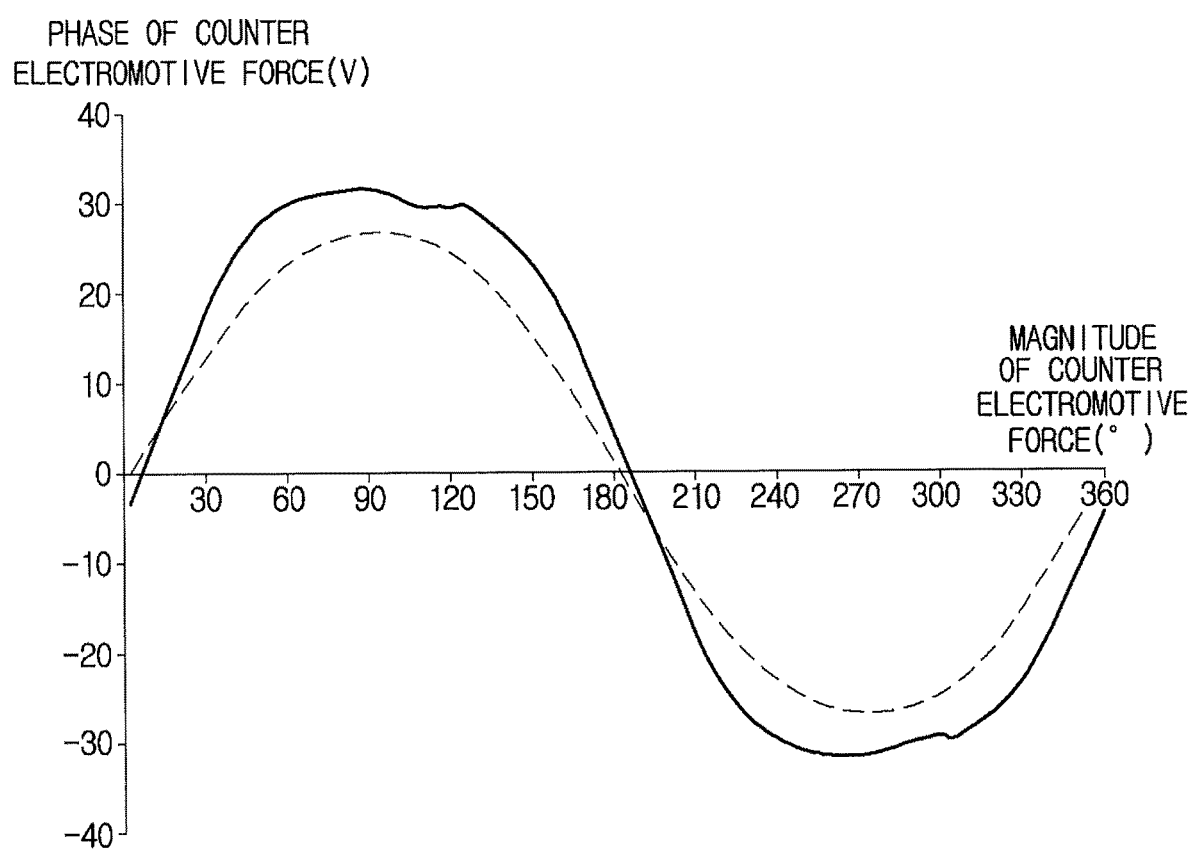
FIG. 27 is a graph showing respective performances of a motor of FIG. 7 and a motor of FIG. 23, as only examples, according to one or more embodiments.

FIG. 27 is a graph showing respective performances of a motor of FIG. 7 and a motor of FIG. 23, as only examples, according to one or more embodiments.

The horizontal axis indicates a phase of a counter electromotive force, and the vertical axis indicates magnitude of the counter electromotive force. A dashed line indicates a counter electromotive force of the motor 170 having the pair of stator bodies 182 formed in the first direction w1, and a solid line indicates a counter electromotive force of the motor 270 having the stator 280 made up of the main stators 281 and the auxiliary stators 287.

In the case of the motor 270 having the auxiliary stators 287, the counter electromotive force is increased unlike the motor 170, and thus capacity of the motor is easily increased. Therefore, it is possible to increase the capacity of the motor without increasing a lamination of the stator. That is, the capacity of the motor can be increased without increasing a size of the stator. As a result, the overall size of the motor 270 can be reduced without loss of capacity.

Hereinafter, according to one or more embodiments, a motor assembly and a vacuum cleaner having the same will be described.

A description of components overlapping the description of those in the aforementioned embodiments will be omitted.

Figure 28:
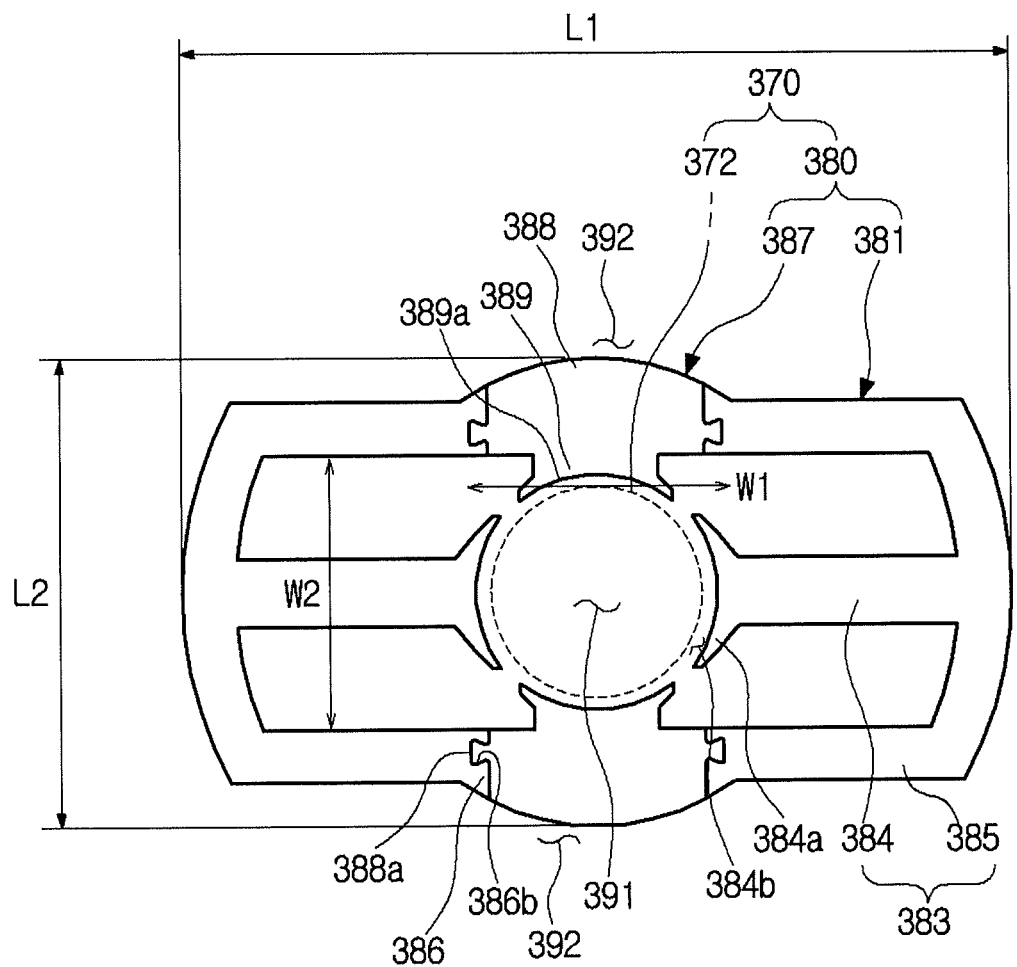
FIG. 28 is a view illustrating a stator, according to one or more embodiments.

FIG. 28 is a view illustrating a stator, according to one or more embodiments.

Here, a shape and coupling configuration of a stator 380 of FIG. 28 is different from a shape and coupling configuration of the stator 280 of FIG. 23.

A motor 370 may include main stators 381 and auxiliary stators 387.

Each auxiliary stator 387 may include an auxiliary stator body 388, and at least one auxiliary core 389 provided to extend from the auxiliary stator body 388.

The auxiliary stator body 388 may be formed to have a larger width than a side core 385 of the neighboring main stator 381 in order to reinforce strength of a coupled region. In detail, the auxiliary stator body 388 may be formed such that an outer surface thereof is swollen outward with respect to an inner surface thereof.

The auxiliary cores 389 may be provided to face each other across a rotor 372, be each formed to have shorter lengths than a center core 384, and be disposed in a second direction perpendicular to a first direction w1. A rotor receptacle 391 is formed between the auxiliary cores 389 such that the rotor 372 can be rotated. The rotor receptacle 391 may be formed between the pair of center cores 384 and the pair of auxiliary cores 389.

An expanded auxiliary core 389a in which a width of each auxiliary core 389 is partly increased is formed at an inner end of each auxiliary core 389 adjacent to the rotor 372. In detail, the expanded auxiliary core 389a in which the width of each auxiliary core 389 is partly increased is formed at the inner end of each auxiliary core 389 directed to the rotor 372 so as to surround a circumference of the rotor 372. A gap 384b for rotation of the rotor 372 is formed between an inner surface of the expanded auxiliary core 389a and an outer surface of the rotor 372.

Each auxiliary stator 387 may include an air barrier. The air barrier is provided to have high resistance to a flow of a magnetic field so as to be able to change the flow of the magnetic field. Thereby, the flow of the magnetic field can be made smoother. In the present embodiment, the air barrier may be provided in the auxiliary stator body 388 outside the auxiliary core 389 in a hole shape.

Each main stator 381 may be provided with coupling sockets 386b that are formed in ends of the side cores 385 and are coupled to the auxiliary stators 387, and each auxiliary stator 387 may be provided with coupling tails 388a. The main stators 381 and the auxiliary stators 387 may be coupled by fitting the coupling tails 388a into the coupling sockets 386b.

Description for main stator bodies 382, main stator cores 383, expanded main cores 384a, stator slots 383a, main couplers 386, and arrangement regions 392, all of which are not described in detail here, can be found above with regard to FIG. 23, for example.

Hereinafter, according to one or more embodiments, a motor assembly and a vacuum cleaner having the same will be described.

A description of components overlapping the description of those in the aforementioned embodiments will be omitted.

Figure 29:
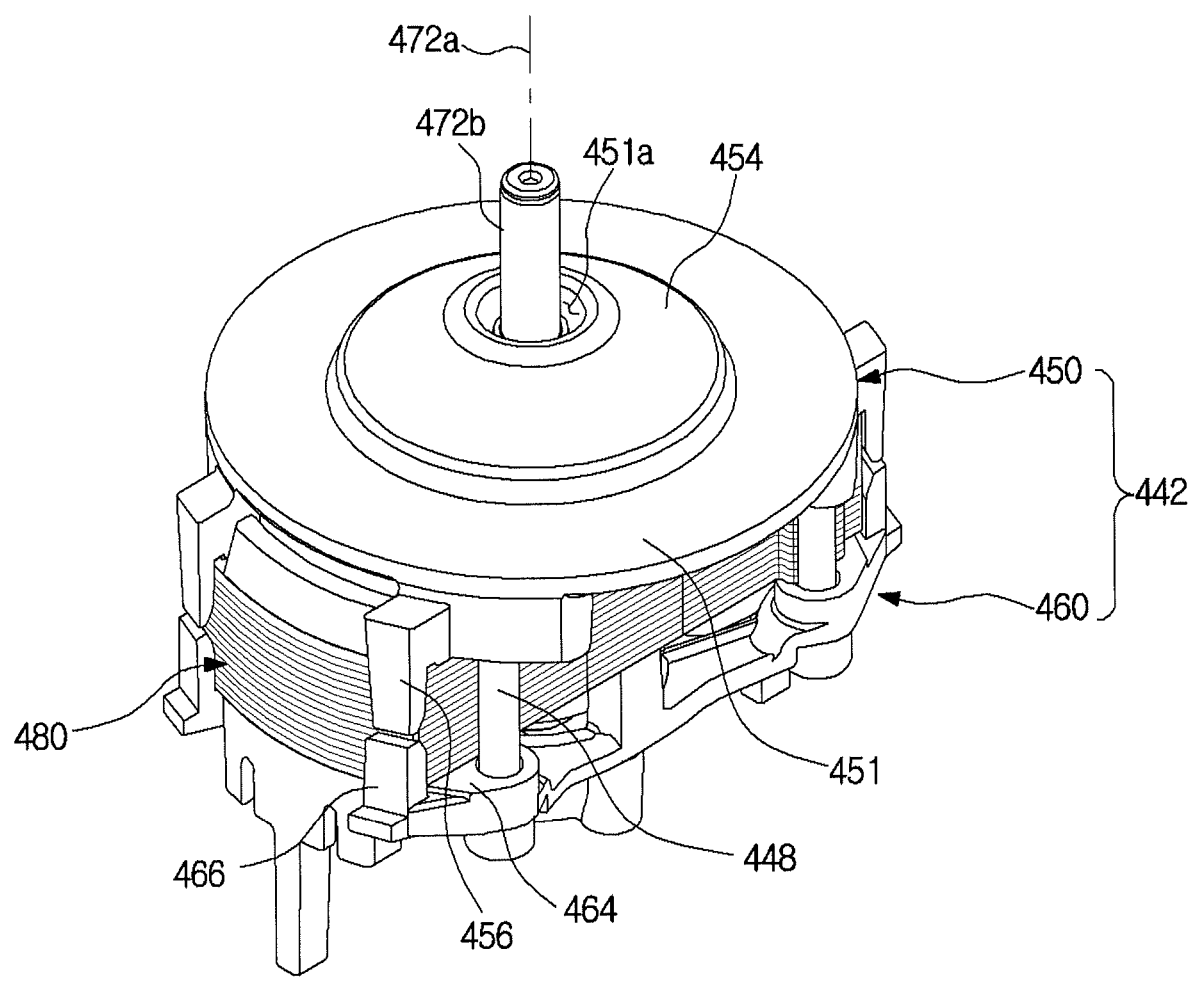
FIGS. 29 and 30 are perspective views illustrating a motor module, according to one or more embodiments.
Figure 30:
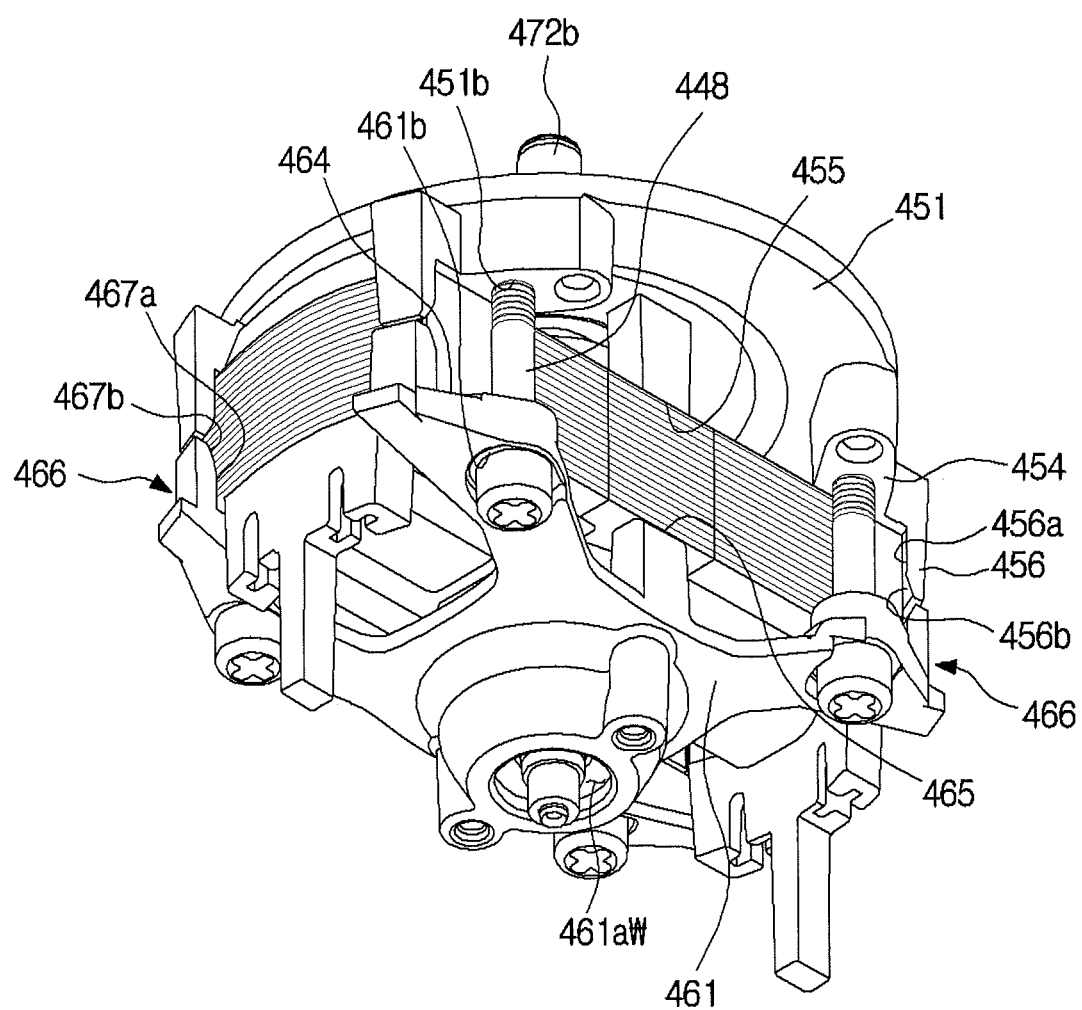
Figure 31:
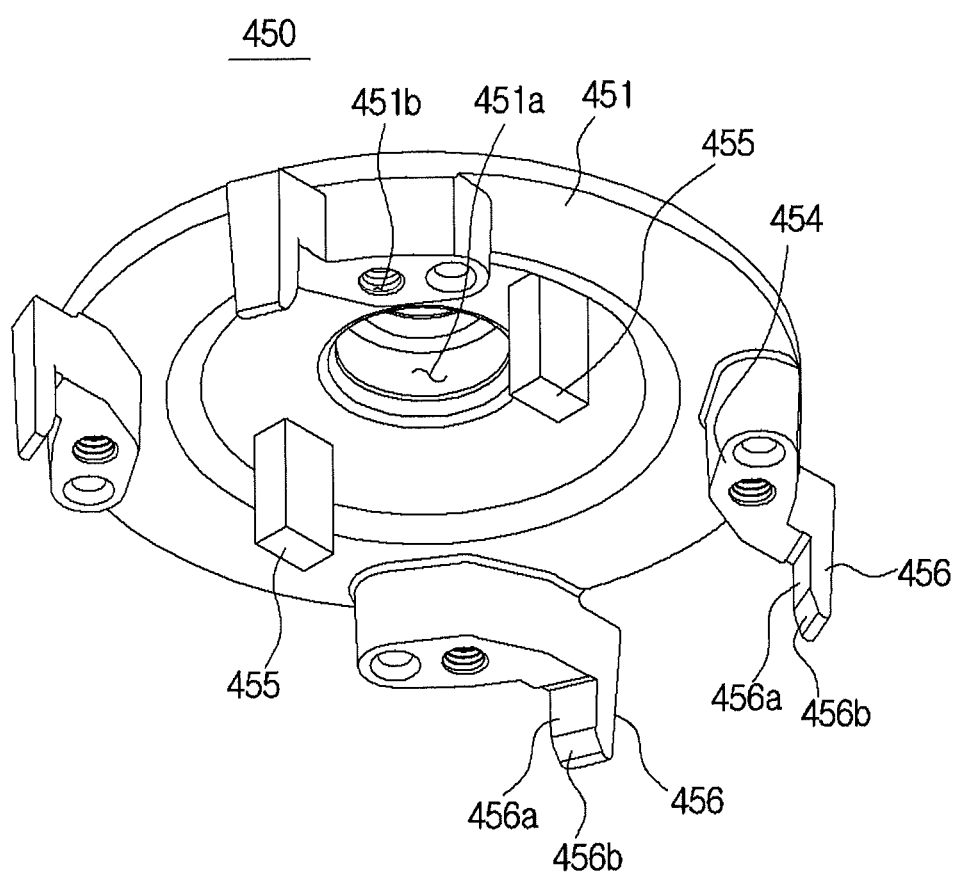
FIG. 31 is a perspective view illustrating a front motor housing, according to one or more embodiments.
Figure 32:
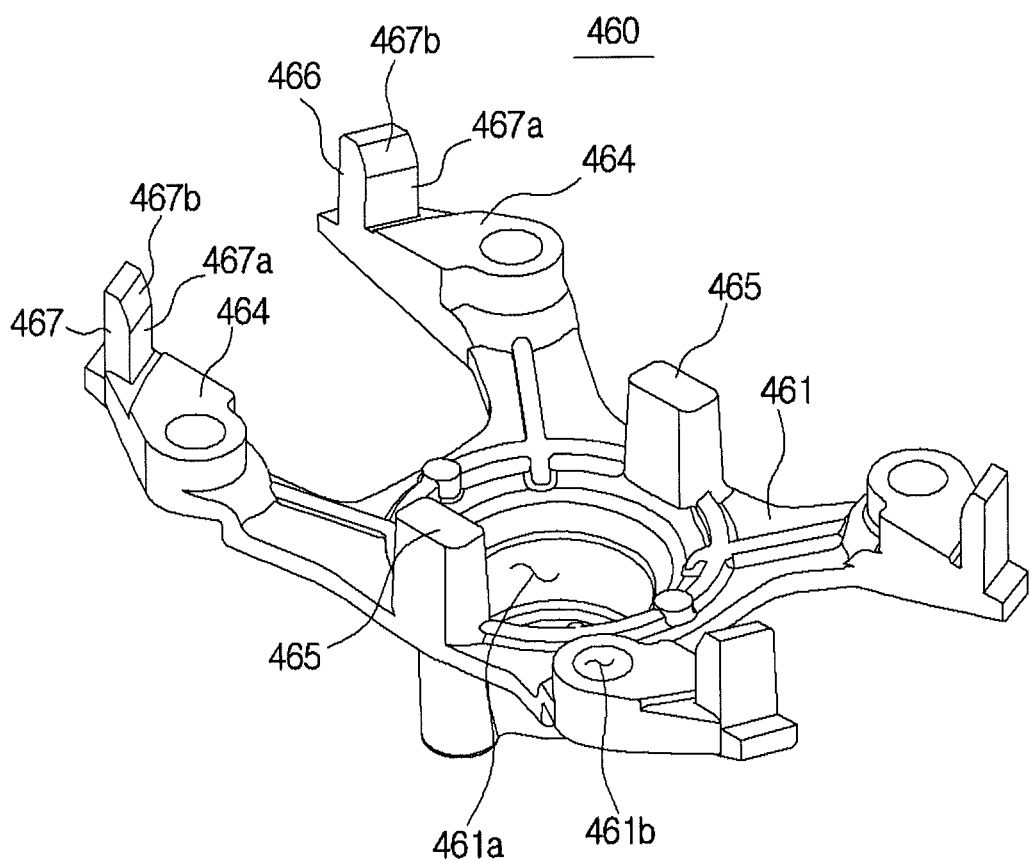
FIG. 32 is a perspective view illustrating a rear motor housing, according to one or more embodiments.
Figure 33:
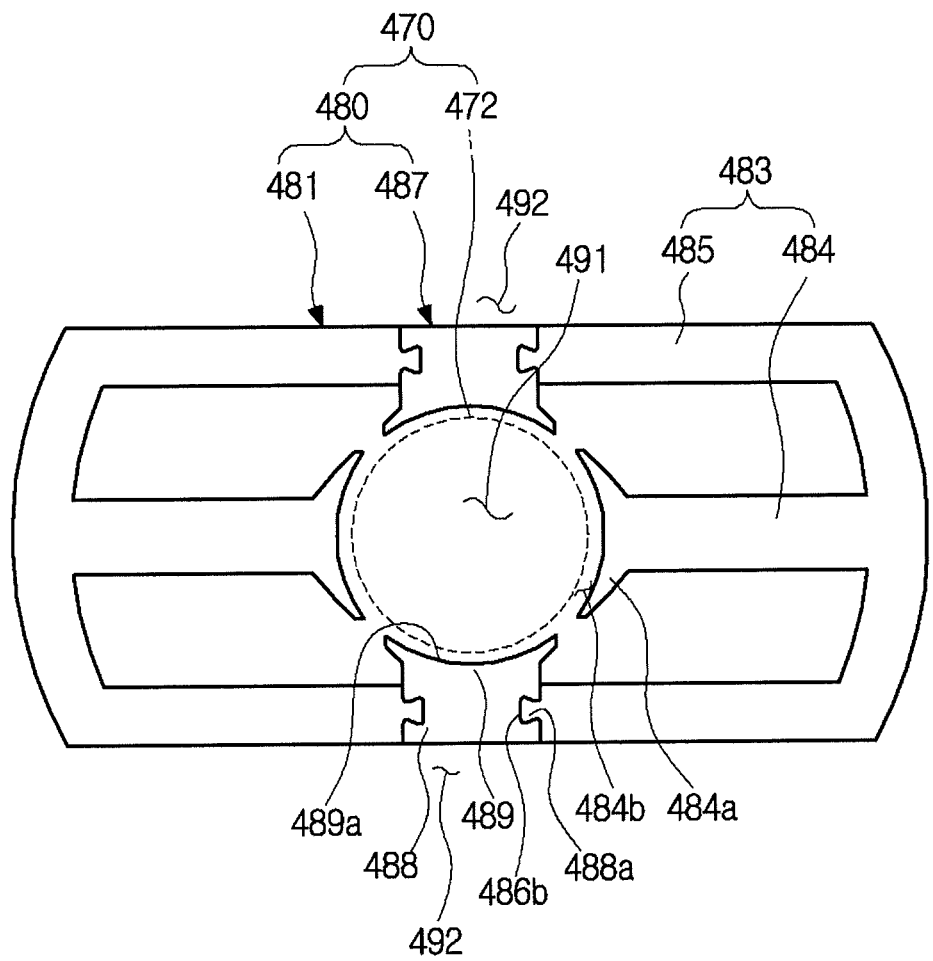
FIG. 33 is a view illustrating a motor, according to one or more embodiments.
Figure 34:
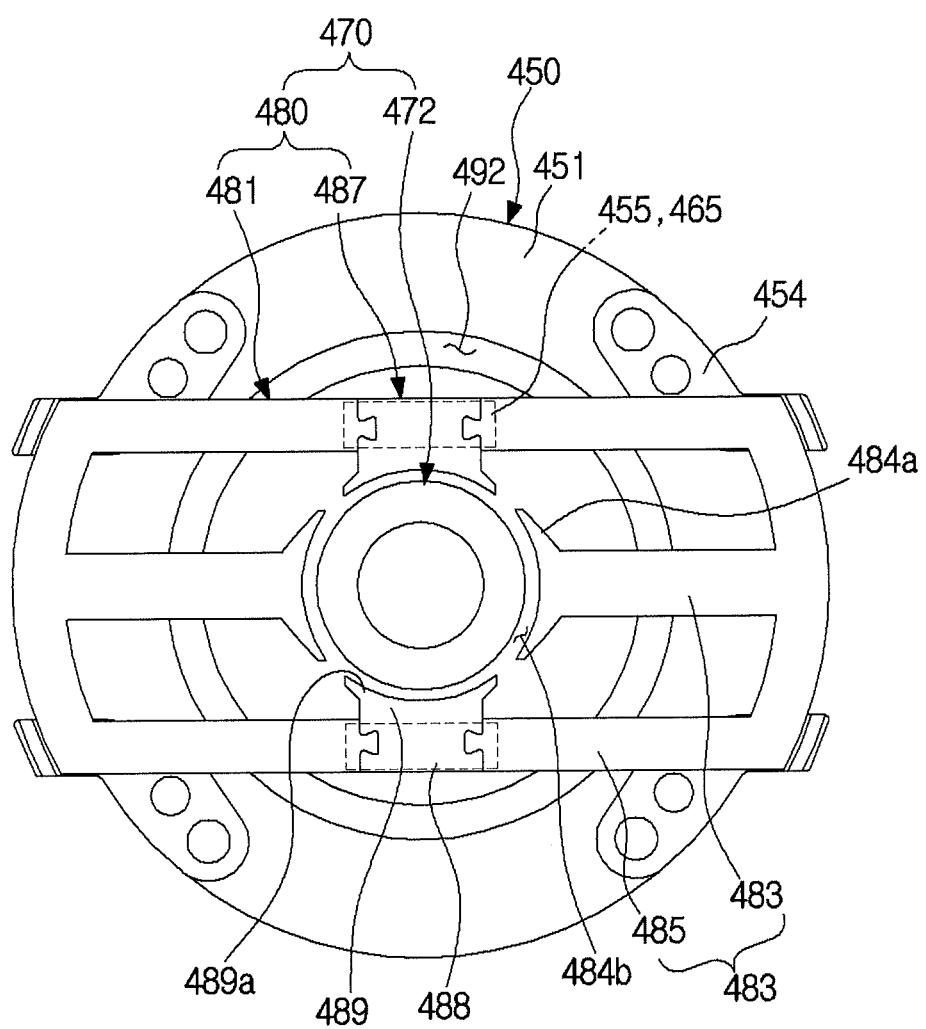
FIG. 34 is a view illustrating an arrangement of the motor and the motor housing, according to one or more embodiments.

FIGS. 29 and 30 are perspective views illustrating a motor module, according to one or more embodiments. FIG. 31 is a perspective view illustrating a front motor housing, according to one or more embodiments. FIG. 32 is a perspective view illustrating a rear motor housing, according to one or more embodiments. FIG. 33 is a view illustrating a motor, according to one or more embodiments. FIG. 34 is a view illustrating arrangement of the motor and the motor housing, according to one or more embodiments.

The shape of a stator 480 and corresponding coupling configuration of a motor housing 442 are different from the stator 380 and corresponding coupling configuration.

Each auxiliary stator 487 may include an auxiliary stator body 488, and at least one auxiliary core 489 provided to extend from the auxiliary stator body 488.

The auxiliary stator body 488 may be formed to have the same width as a side core 485 of each main stator 481. For example, an outer lateral surface of the side core 485 and an outer lateral surface of the auxiliary stator body 488 may be disposed to be flush with each other.

Differing from stator 280 and stator 380, without protruding beyond lateral surfaces of the stator 480, arrangement regions 492 may be formed in a same housing so as to be larger than stator 280 and stator 380.

The auxiliary cores 489 may be provided to face each other across a rotor 472, be each formed to be shorter in length than a center core 484, and be disposed in a second direction perpendicular to a first direction. A rotor receptacle 491 is formed between the auxiliary cores 489 such that the rotor 472 can be rotated. The rotor receptacle 491 may be formed between the pair of center cores 484 and the pair of auxiliary cores 489.

An expanded auxiliary core 489*a* in which a width of each auxiliary core 489 is partly increased is formed at an inner end of each auxiliary core 489 adjacent to the rotor 472. In detail, the expanded auxiliary core 489*a* in which the width of each auxiliary core 489 is partly increased is formed at the inner end of each auxiliary core 489 directed to the rotor 472 so as to surround a circumference of the rotor 472. A gap 484*b* for rotation of the rotor 472 is formed between an inner surface of the expanded auxiliary core 489*a* and an outer surface of the rotor 472.

Each main stator 481 may be provided with coupling tails that are formed in ends of the side cores 485 and are coupled to the auxiliary stators 487, and each auxiliary stator 487 may be provided with coupling sockets 488*a*. The main stators 481 and the auxiliary stators 487 may be coupled by fitting the coupling tails into the coupling sockets 488*a*.

The stator 480 may be fixed by the motor housing 442.

A front motor housing 450 may include a front motor housing body 451, at least one front seat 454, and at least one front auxiliary seat 455. The front motor housing body 451 may be formed in an approximate disc shape.

The front seat 454 is provided on a rear surface of the front motor housing body 451 such that a motor 470 is seated thereon. The front seat 454 is provided to seat and fix the stator 480 such that the center of the rotor 472 provided rotatably is disposed to be aligned with or identical to the rotational center of an impeller. The front seat 454 is provided inside the front motor housing body 451 such that one side of the motor 470 is seated thereon. That is, the front seat 454 may be provided on a rear surface of the front motor housing body 451.

The shape of the front seat 454 is not restricted. In an embodiment, the front seat 454 is formed to protrude from the front motor housing body 451 such that the motor 470 can be seated at a predetermined distance from the front motor housing body 451.

The arrangement of the front seat 454 is not restricted. In an embodiment, four front seats 454 may be disposed to correspond to respective ends of the stator 480 because the stator 480 is formed long in a lengthwise direction.

The front auxiliary seats 455 are provided inside the front motor housing 450. The front auxiliary seats 455 are provided to allow the auxiliary stators 487 to be seated thereon such that a middle portion of the motor 470 formed long in the lengthwise direction can be stably supported.

The front auxiliary seats 455 are formed to protrude from the front motor housing body 451. Since the auxiliary stators 487 are provided as a pair, the front auxiliary seats 455 are also provided as a pair.

The front motor housing 450 may include front seating protrusions 456. The front seating protrusions 456 are formed to surround at least part of the outer surface of the stator 480 and to prevent the stator 480 from moving in an illustrated leftward/rightward direction, for example, to be deflected when the motor assembly is operated.

The front seating protrusions 456 are formed to further protrude from the front motor housing body 451 beyond the front seat 454 such that the main stators 481 can be surround with inner surfaces thereof. The front seating protrusions 456 may be provided to correspond to the main stators 481 along with the front auxiliary seat 455, and particularly to surround outer surfaces of the main stators 481.

Each front seating protrusion 456 may include a front protrusion seating face 456*a* on which the lateral surface of the motor 470 is seated, and a front guide face 456*b* that extends from the front protrusion seating face 456*a* and is formed inward so as to have a predetermined angle of inclination such that the motor 470 is easily seated.

A rear motor housing 460 is provided to be coupled with the front motor housing 450. The motor 470 can be disposed between the front motor housing 450 and the rear motor housing 460.

The rear motor housing 460 may include a rear motor housing body 461, rear seats 464, and rear seating protrusions 466. The rear motor housing body 461 may be formed long in the lengthwise direction of the stator 480 so as to correspond to a shape of the stator 480.

Each rear seat 464 is provided on a front surface of the rear motor housing body 461 such that the motor 470 is seated thereon. The rear seats 464 are provided to seat and fix the stator 480 such that the center of the rotor 472 provided rotatably is disposed to be aligned with or identical to the rotational center of the impeller.

The shape of the front seat 154 is not restricted. In an embodiment, the front seat 154 is formed to protrude from the front motor housing body 151 such that the motor 170 can be seated at a predetermined distance from the front motor housing body 151. The rear seats 464 are provided inside the rear motor housing body 461 such that the other side of the motor 470 is seated thereon.

The shape of each rear seat 464 is not restricted. In an embodiment, the rear seats 464 are formed to protrude from the rear motor housing body 461 such that the motor 470 can be seated at a predetermined distance from the rear motor housing body 461.

The arrangement of the rear seats 464 is not restricted. In an embodiment, four rear seats 464 may be disposed to correspond to respective ends of the stator 480 because the stator 480 is formed long in the lengthwise direction.

Rear auxiliary seats 465 are provided inside the rear motor housing 460. The rear auxiliary seats 465 are provided to allow the auxiliary stators 487 to be seated thereon such that the middle portion of the motor 470 formed long in the lengthwise direction can be stably supported.

The rear auxiliary seats 465 are formed to protrude from the rear motor housing body 461. Since the auxiliary stators 487 are provided as a pair, the rear auxiliary seats 465 are also provided as a pair.

The rear seating protrusions 466 are formed to protrude from a body of the rear motor housing 460 along a circumference of the rear motor housing 460 such that the motor 470 is surrounded with inner surfaces thereof. Each rear seating protrusion 466 may be provided with a rear guide face 467*b* that is formed inward so as to have a predetermined angle of inclination such that the motor 470 is easily seated on the rear seats 464 when the motor 470 and the rear seating protrusions 466 are coupled. In detail, the rear surface of the motor 470 is seated on the rear seats 464, and the lateral surfaces of the motor 470 are seated on rear protrusion seating faces 467*a* of the rear seating protrusions 466. The rear guide faces 467*b* of the rear seating protrusions 466 guide the motor 470 to be easily seated on the rear seats 464. The rear guide faces 467*b* may be formed on ends of the rear seating protrusions 466 so as to have a predetermined angle of inclination and to be connected to the rear protrusion seating faces 467*a*.

The front and rear motor housings 450 and 460 may have screw holes 451b and 461b, and may be provided to be able to be coupled by screws 448.

A front through-hole 451a and a rear through-hole 461a are provided in the centers of the front motor housing 450 and the rear motor housing 460 such that the rotor shaft 472b can pass therethrough.

Descriptions above regarding main stator bodies, main stator cores, and expanded main cores are also applicable to main stator bodies 482, main stator cores 483, and expanded main cores 484a.

Hereinafter, according to one or more embodiments, a motor assembly and a vacuum cleaner having the same will be described.

A description of components overlapping the description of those in the aforementioned embodiments will be omitted.

Figure 35:
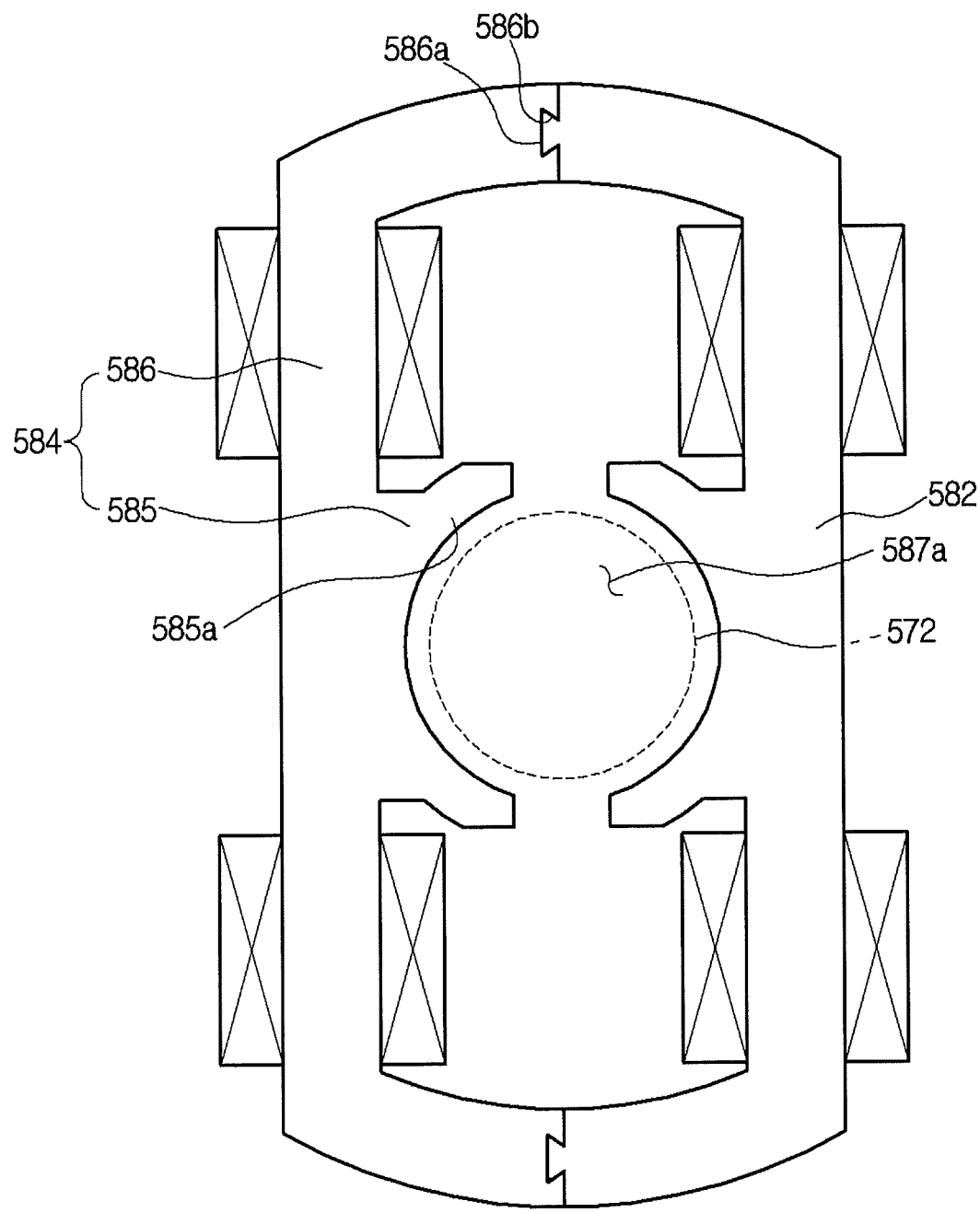
FIG. 35 is a view illustrating a motor, according to one or more embodiments.

FIG. 35 is a view illustrating a motor, according to one or more embodiments.

A stator 580 has a different shape than the stator 180 of FIG. 7, for example. For example, a pair of stators 580 may not be coupled with each other in the above referenced lengthwise direction, but rather, in another direction. In detail, though the pair of stators 580 are disposed to be formed in the referenced lengthwise direction with respect to the rotor 572, the pair of stators 580 are coupled with each other along a direction different from the lengthwise direction.

The stator 580 may include a stator body 582, a stator core 584 and an expanded core 585a.

The stator body 582 is formed long in one direction, and provided as a pair of the stator bodies 582 that are coupled with each other at both ends thereof. To this end, an end of one of the stator bodies 582 may be provided with a coupling socket 586b, and an end of the other one of the stator bodies 582 may be provided with a coupling tail 586a. As the pair of stator bodies 582 are coupled with each other, a rotor receptacle 587a for holding the rotor 572 may be formed in the middle between the pair of stator bodies 582.

Each stator core 584 includes center cores 585 and side cores 586.

The center cores 585 are disposed in the middle of the stator body 582, and extend from the stator body 582. Although the center cores illustrate in FIG. 7 are formed longer in a direction corresponding to the referenced lengthwise direction of the stator, the center cores 585 of the stator body 582 according to the present embodiment may be formed longer in another direction. The center cores 585 are provided to face each other across the rotor 572. The rotor receptacle 587a is defined between the center cores 585 such that the rotor 572 is rotatable.

An inner end of the center core 585 which is adjacent to the rotor 572 is provided with the expanded core 585a in which a width of the center core 585 is partly increased. In detail, the expanded core 585a is formed in such a way that an inner end of the center core 585 which is directed to the rotor 572 is increased in width to surround a circumference of the rotor 572. A gap for the rotation of the rotor 572 is formed between an inner surface of the expanded core 585a and an outer surface of the rotor 572.

The side cores 586 are disposed in the one direction with respect to the stator body 582, and are provided at both sides of the center body 582. With this configuration, when the pair of stator bodies 582 are coupled with each other, the plurality of side cores 586 face each other.

Hereinafter, according to one or more embodiments, a motor assembly and a vacuum cleaner having the same will be described.

A description of components overlapping the description of those in the aforementioned embodiment will be omitted.

Figure 36:
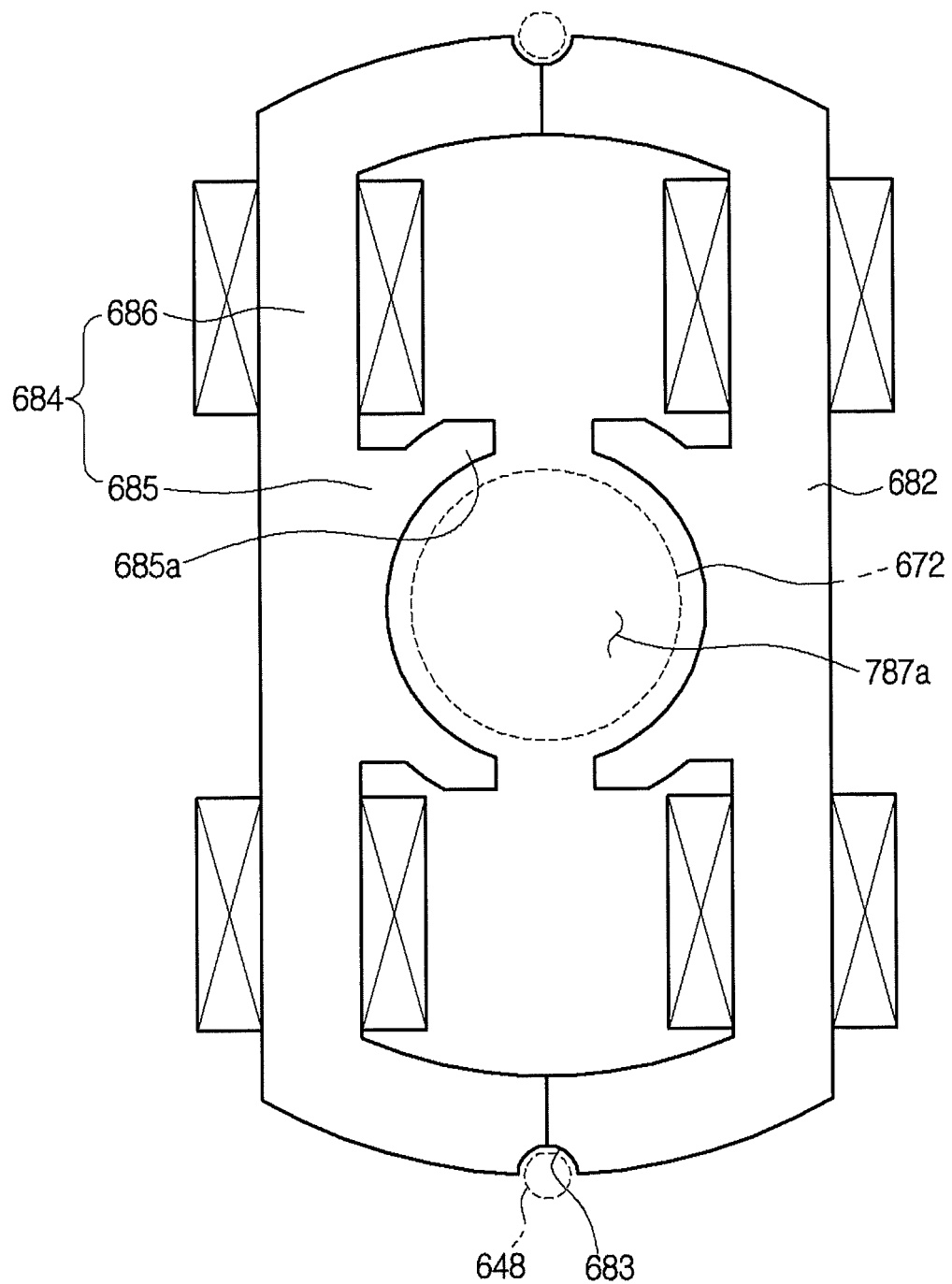
FIG. 36 is a view illustrating a motor, according to one or more embodiments.

FIG. 36 is a view illustrating a motor, according to one or more embodiments.

A coupling method of a stator 680, while having a same shape as the stator 580, is different from a coupling method used for the stator 580.

While the stator body 582 is provided with the coupling socket 586b and the coupling tail 586a so that one pair of stators 580 are coupled with each other, the stators 680 may include fixing surfaces 683 such that one pair of stators are coupled with each other.

The fixing surface 683 is formed to be recessed at an end of the stator body 682, and has a section in an approximately arc shape, for example. In this example, each fixing surface 683 is formed to have an extension portion beyond a contact portion between a pair of stators 680 contacting with each other while facing each other, so that the fixing surface 683 has a section in an approximately semi-circular shape.

A fixing protrusion is located on the fixing surface 683 formed after the pair of stators 680 contact with each other for coupling, to prevent the stator 680 from moving in one direction. The fixing protrusion may be formed to extend from motor housing according to the present embodiment. A lateral side of a screw 648 for coupling the motor housing may serve as a fixing protrusion.

Although not described in detail, a movement of the stator 680 in another direction may be fixed by the motor housing according to the present embodiment.

Hereinafter, according to one or more embodiments, a motor assembly and a vacuum cleaner having the same will be described.

A magnet cover 776 has a different configuration from the magnet cover 176 of FIG. 11, for example.

Figure 37:
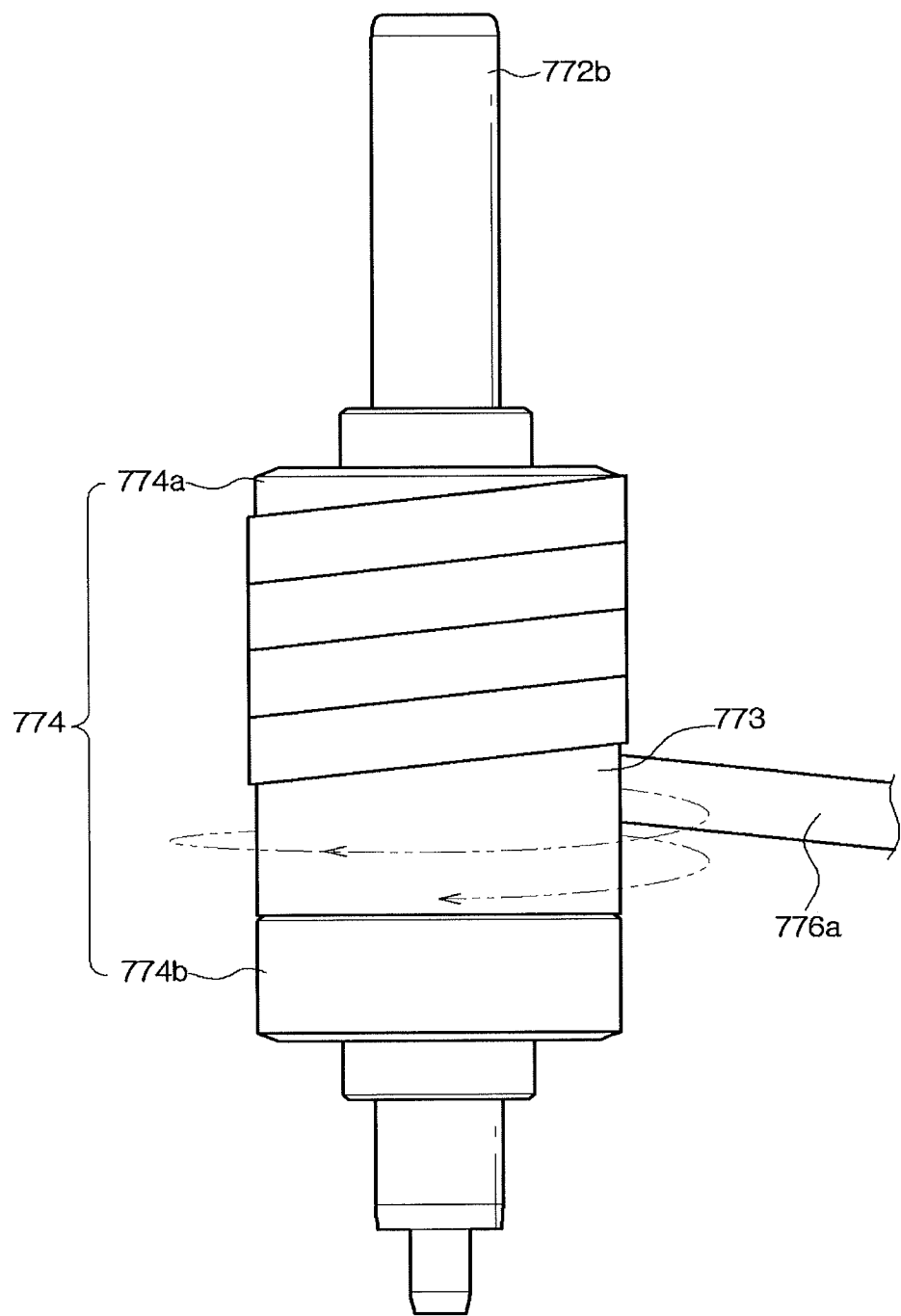
FIG. 37 is a view illustrating a method for producing a rotor, according to one or more embodiments.

FIG. 37 is a view illustrating a method for producing a rotor, according to one or more embodiments.

In the description with regard to FIG. 11, the magnet cover 176 is provided to enclose the outer circumferential surface of the magnet 173 by the winding process and then a hardening process.

In the present embodiment, a magnet cover 776 may include a ribbon-shaped cover body 776a.

The cover body may be provided to be wound on an outer circumferential surface of the magnet 773 in a spiral shape. The cover body of the magnet cover 776 encloses the outer circumferential surface of the magnet 773 while being wound in the spiral shape. The cover body may be wound to correspond to a length of the magnet 773, and thus be variously applied according to the length of the magnet 773.

The cover body may be provided to be directly wound on the outer circumferential surface of the magnet 773. The magnet cover 776 may be formed by winding and hardening the cover body around a jig shaped of a round rod, and be put on the outer circumferential surface of the magnet 773. The magnet cover 776 may be more firmly fixed to the magnet 773 by an adhesive applied between the magnet cover 776 and the magnet 773.

Hereinafter, according to one or more embodiments, a motor assembly and a vacuum cleaner having the same will be described.

A repeated description of the same components as in the aforementioned embodiments will be omitted.

Figure 38:
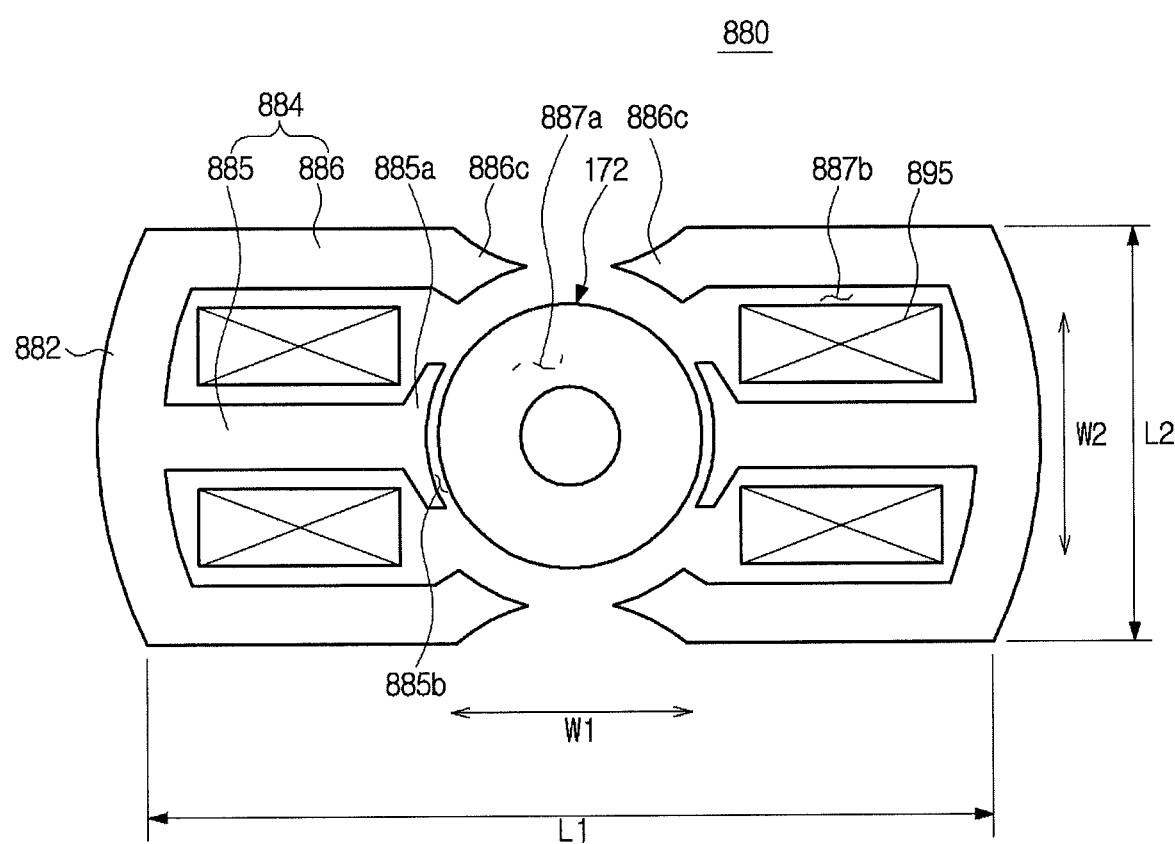
FIG. 38 is a front view of a stator, according to one or more embodiments.
Figure 39:
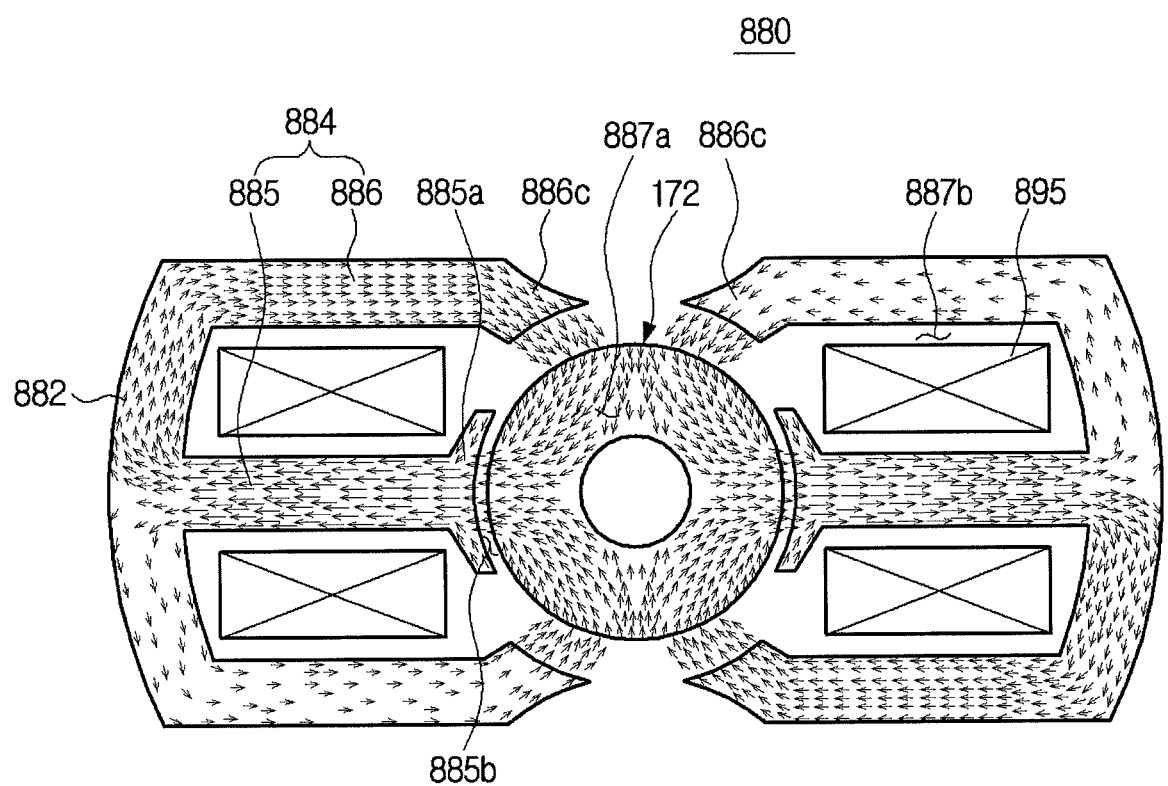
FIG. 39 is a view illustrating a flow of a magnetic field of a stator, according to one or more embodiments.

FIG. 38 is a front view of a stator, according to one or more embodiments, and FIG. 39 is a view illustrating a flow of a magnetic field of a stator, according to one or more embodiments. A stator 880 is configured to electromagnetically interact with a rotor 172.

The stator body 882 is made up of a pair of stator bodies 882 that are disposed across the rotor 172 in the first direction w1 so as to face each other. That is, the stator bodies 882 may be disposed long so as to face each other. The stator 880 is not provided around the rotor 172 in a singular circular shape in a circumferential direction of the rotor 172, but the stator 880 is provided to enclose the rotor 172. Here, a length L1 of the stator 880 in the first direction w1 may be longer than the length L2 of the stator 880 in a second direction w2 perpendicular to the first direction w1, so that the stator 880 may be formed to meet a condition that L1 is greater than L2.

The stator body 882 may include at least one stator core 884. Each stator core 884 includes center cores 885 and side cores 886 provided at sides of the center core 885.

The center cores 885 are provided to face each other across the rotor 172. A rotor receptacle 887*a* is defined between the center cores 885 such that the rotor 172 is rotatable. A pair of side cores 886 are provided at both the sides of the center core 885 in parallel to the center core 885.

A stator slot 887*b* is formed between the stator cores 884. As a coil 895 is wound around the stator core 884, the coil 895 is housed in the stator slots 887*b*. An inner end of the stator core 884 which is adjacent to the rotor 172 is provided with an expanded core 885*a* in which a width of the stator core 884 is partly increased. In detail, the expanded core 885*a* is formed in such a way that an inner end of the center core 885 which is directed to the rotor 172 is increased in width to surround a circumference of the rotor 172. A gap 885*b* is formed for the rotation of the rotor 172 between an inner surface of the expanded core 885*a* and an outer surface of the rotor 172.

The stator 880 may be provided such that the pair of stator bodies 882 symmetrically face each other.

The pair of expanded cores 885*a* provided at the ends of the pair of center cores 885 and around the rotor 172 may be provided such that the centers of curved inner surfaces thereof deviate from each other. In detail, the pair of expanded cores 885*a* are provided to enclose the outer surface of the rotor 172 such that the center of the inner surface of one of the expanded cores 885*a* deviates from the center of the inner surface of the other of the expanded cores 885*a*. With this configuration, the pair of expanded cores 885*a* enclosing the rotor 172 are provided to have electromagnetic influences different in intensity and direction from each other such that the rotor 172 can be rotated in any one direction.

The side core 886 of one of the pair of stator bodies 882 is spaced apart from the side core 886 of the other one of the pair of stator bodies 882. That is, one pair of stator bodies 882 are provided around the rotor 172 so as to face each other without being coupled.

The side core 886 may include a core bent 886*c*. The core bent 886*c* is formed at an end of the side core 886 so as to be bent toward the rotor 172. The core bent 886*c* is provided to come into close contact with the rotor 172 such that a gap between the side core 886 and the rotor 172 is reduced. An end of the core bent 886*c* is formed to surround a portion of the circumference of the rotor 172 such that a gap between the side core 886 and the rotor 172 is reduced. That is, an end of the core bent 886*c* is formed to have a curved surface corresponding to the outer surface of the rotor 172.

The center core 885 is formed to have a thickness greater than those of the side cores 886 provided at both sides of the center core 885 in consideration of the electromagnetic flow of the stator and the rotor 172.

The shape of the core bent 886*c* is not limited as long as it is formed to be bent from the side core 886 such that an end of the side core 886 is adjacent to the rotor 172.

FIG. 39 is a view illustrating a flow of a magnetic field of a stator, according to one or more embodiments. A magnetic field is formed at the stator 880 and the rotor 172 when electric current is supplied and thus the stator 880 and the rotor 172 electromagnetically interact with each other. The magnetic field is formed at the stator 880 and the rotor 172 by a change in polarity caused by the rotation of the rotor 172.

Hereinafter, according to one or more embodiments, a motor assembly and a vacuum cleaner having the same will be described.

A repeated description of the same components as in aforementioned embodiments will be omitted.

Figure 40:
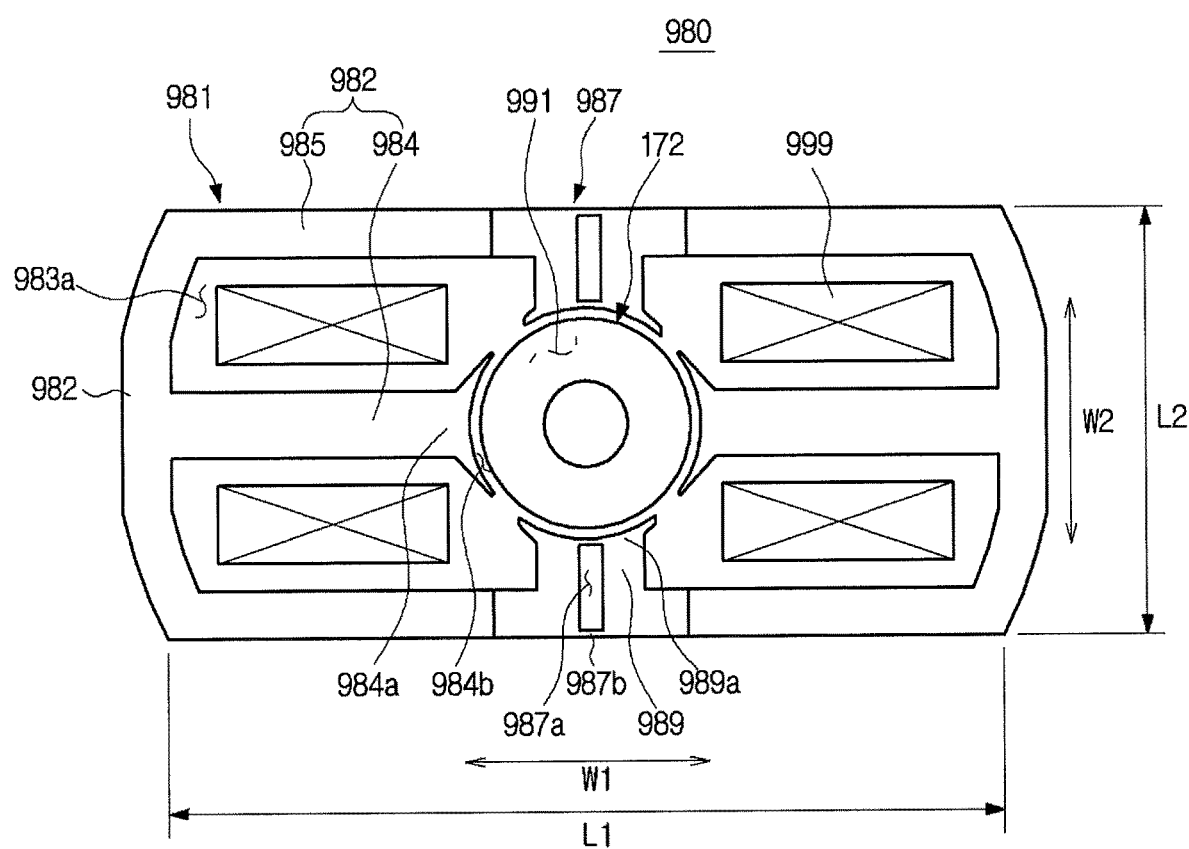
FIG. 40 is a front view illustrating a stator, according to one or more embodiments.

FIG. 40 is a front view illustrating a stator, according to one or more embodiments.

A stator 980 may include a main stator 981 and an auxiliary stator 987.

The main stator 981 may include a main stator body 982 and at least one main stator core 983 extending from the main stator body 982.

The main stator body 982 is made up of a pair of main stator bodies 982 that are disposed across the rotor 172 in the first direction w1 so as to face each other. That is, the main stator bodies 982 may be disposed long so as to face each other. The main stator 981 is not provided around the rotor 172 in a singular circular shape in a circumferential direction of the rotor 172, but the main stator 981 is provided to enclose the rotor 172. Here, a length L1 of the stator 980 in the first direction w1 may be longer than the length L2 of the stator 980 in a second direction w2 perpendicular to the first direction w1, such that the main stator 981 may be formed to meet a condition that L1 is greater than L2.

The main stator core 983 includes center cores 984 and side cores 985 provided at sides of the center core 984.

The center cores 984 are provided to face each other across the rotor 172. A rotor receptacle 991 is defined between the center cores 984 such that the rotor 172 is rotatable. A pair of side cores 985 are provided at both the sides of the center core 984 in parallel to the center core 984.

A stator slot 983*a* is formed between the center core 984 and the side core 985. As a coil 999 is wound around the center core 984, the coil 999 is housed in the stator slots 983*a*. An inner end of the stator core 984 which is adjacent to the rotor 172 is provided with an expanded core 984*a* in which a width of the center core 984 is partly increased. In detail, the expanded core 984*a* is formed in such a way that an inner end of the center core 984 which is directed to the rotor 172 is increased in width to surround a circumference of the rotor 172. A gap 984*b* is formed for the rotation of the rotor 172 between an inner surface of the expanded core 984*a* and an outer surface of the rotor 172.

The auxiliary stators 987 are provided to electromagnetically interact with the rotor 172 along with the main stators 981. The auxiliary stators 987 are provided to face each other across the rotor 272, and may be disposed in a direction perpendicular to the one direction. The auxiliary stators 987 may be provided as a pair, and be disposed between the pair of main stator bodies 982 so as to face each other across the rotor 272.

Each auxiliary stator 987 may include an auxiliary stator body 988 and at least one auxiliary core 989 provided to extend from the auxiliary stator body 988.

The auxiliary stator body 988 is provided to have the same width as that of the side core 985 of the main stator 981. In detail, an outer surface of the side core 985 is disposed on the same plane as an outer surface of the auxiliary stator body 988.

The auxiliary cores 989 are provided to face each other across the rotor 172, are formed to be shorter than the center core 984, and may be disposed in a direction perpendicular to the one direction. The rotor receptacle 991 in which the rotor 172 is provided rotatably is defined between the auxiliary cores 989. That is, the rotor receptacle 991 may be formed between the pair of center core 984 and the pair of auxiliary core 989.

An inner end of the auxiliary core 989 which is adjacent to the rotor 172 is provided with an auxiliary expanded core 989*a* in which a width of the auxiliary core 989 is partly increased. In detail, the auxiliary expanded core 989*a* is formed in such a way that an inner end of the auxiliary core 989 which is directed to the rotor 172 is increased in width to surround a circumference of the rotor 172. A gap 984*b* is formed for the rotation of the rotor 172 between an inner surface of the auxiliary expanded core 989*a* and an outer surface of the rotor 172.

Each auxiliary stator 987 may include an air barrier 987*a* provided in the auxiliary stator body 988 in the form of a hole, and a bridge 987*b*.

When a magnetic flux passing through the auxiliary stator 987 is formed due to an electromagnetic interaction between the stator 980 and the rotor 172. However, a leakage magnetic flux, which is not effective, may be generated from among the magnetic flux passing from one end of the auxiliary stator 987 to the other end of the auxiliary stator 987.

Accordingly, the air barrier 987*a* is disposed on the auxiliary stator body 988, and the bridge 987*b* having a thickness thinner than that of the auxiliary stator body 988 that is outwardly adjacent to the air barrier 987*a*, thereby minimizing the leakage magnetic flux. The air barrier 987*a* is provided in a hole shape in the auxiliary stator body 988.

Depending on embodiment, a bracket perpendicular to the stator 980 may be provided through the air barrier 987*a*, so that the durability of the stator 980 is increased or the stator 980 is firmly fixed.

Although the air barrier 987*a* and the bridge 987*b* are each provided in a single unit thereof, the numbers of the air barrier 987*a* and the bridge 987*b* are not limited.

Hereinafter, according to one or more embodiments, a motor assembly and a vacuum cleaner having the same will be described.

A repeated description of the same components as in the aforementioned embodiments will be omitted.

Figure 41:
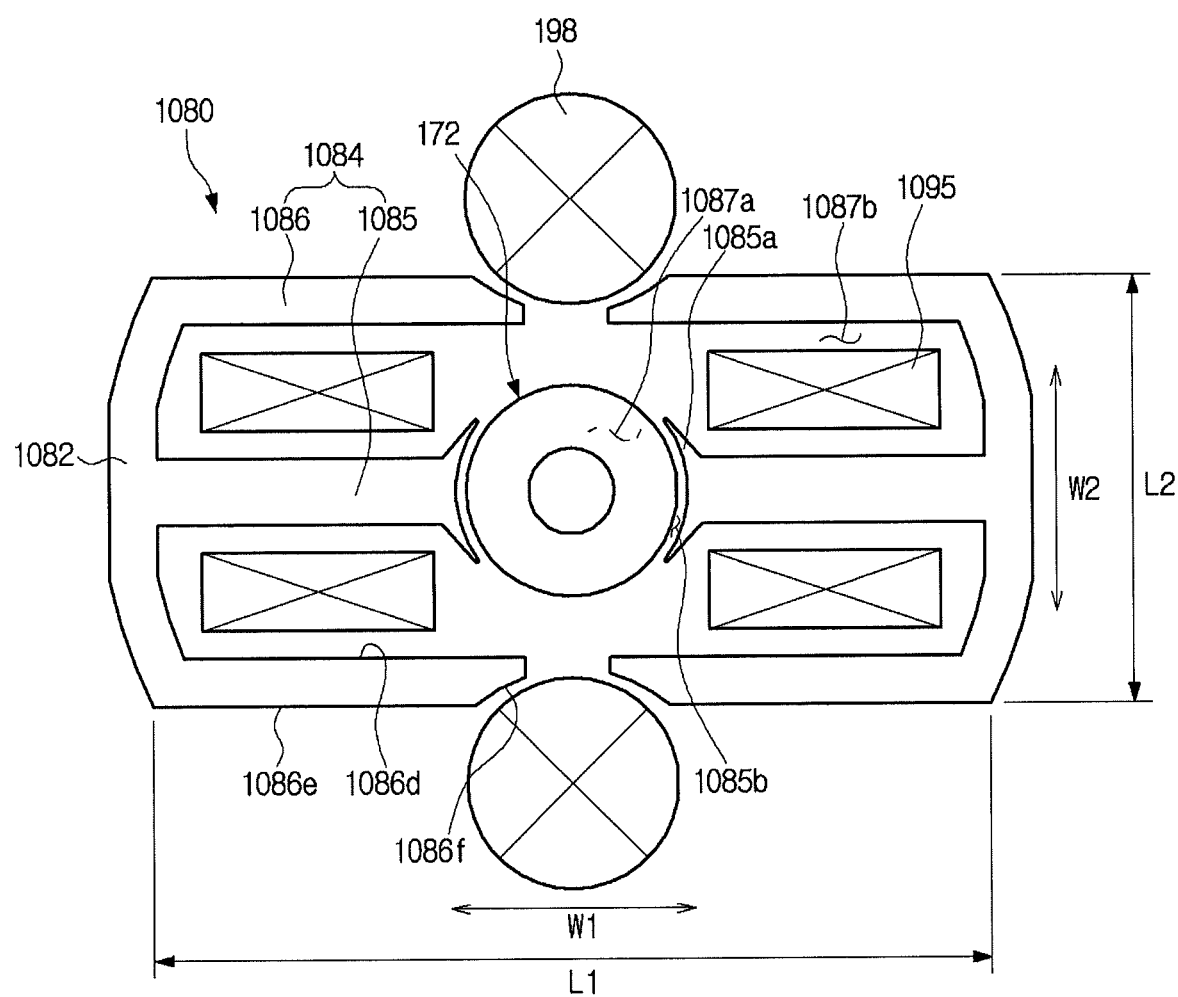
FIG. 41 is a front view illustrating a stator, according to one or more embodiments.

FIG. 41 is a front view illustrating a stator, according to one or more embodiments.

A stator 1080 has a different side core shape from the stator 880, for example.

The stator 1080 is configured to electromagnetically interact with a rotor 172.

The stator body 1082 is made up of a pair of stator bodies 1082 that are disposed across the rotor 172 in the first direction w1 so as to face each other. That is, the stator bodies 882 may be disposed long so as to face each other. The stator 1080 is not provided around the rotor 172 in a singular circular shape in a circumferential direction of the rotor 172, but the stator 1080 is provided to enclose the rotor 172. Here, a length L1 of the stator 1080 in the first direction w1 may be longer than a length L2 of the stator 1080 in a second direction w2 perpendicular to the first direction w1, such that the stator 1080 may be formed to meet a condition that L1 is greater than L2.

The stator body 1082 may include at least one stator core 1084. Each stator core 1084 includes center cores 1085 and side cores 1086 provided at sides of the center core 1085.

The center cores 1085 are provided to face each other across the rotor 172. A rotor receptacle 1087*a* is defined between the center cores 1085 such that the rotor 172 is rotatable. A pair of side cores 1086 are provided at both the sides of the center core 1085 in parallel to the center core 1085.

A stator slot 1087*b* is formed between the stator cores 1084. As a coil 1095 is wound around the stator core 1084, the coil 1095 is housed in the stator slots 1087*b*. An inner end of the stator core 1084 which is adjacent to the rotor 172 is provided with an expanded core 1085*a* in which a width of the stator core 1084 is partly increased. In detail, the expanded core 1085*a* is formed in such a way that an inner end of the center core 1085 which is directed to the rotor 172 is increased in width to surround a circumference of the rotor 172. A gap 1085*b* is formed for the rotation of the rotor 172 between an inner surface of the expanded core 1085*a* and an outer surface of the rotor 172.

The stator 1080 may be provided such that the pair of stator bodies 1082 symmetrically face each other.

The pair of expanded cores 1085*a* provided at the ends of the pair of center cores 1085 and around the rotor 172 may be provided such that the centers of curved inner surfaces thereof deviate from each other. In detail, the pair of expanded cores 1085*a* are provided to enclose the outer surface of the rotor 172 such that the center of the inner surface of one of the expanded cores 1085*a* deviates from the center of the inner surface of the other of the expanded cores 1085*a*. With this configuration, the pair of expanded cores 1085*a* enclosing the rotor 172 are provided to have electromagnetic influences different in intensity and direction from each other such that the rotor 172 can be rotated in any one direction.

The side core 1086 of one of the pair of stator bodies 1082 is spaced apart from the side core 1086 of the other one of the pair of stator bodies 1082. That is, one pair of stator bodies 1082 are provided around the rotor 172 so as to face each other without being coupled.

An end of the side core 1086 is formed to have a thickness thinner than that of a nearby side core 1086. Assuming that a surface of the side core 1086 which is directed to the center core 1085 is an inner surface 1086*d*, and the other surface opposite to the inner surface is an outer surface 1086*e*, the end of the side core 1086 is formed such that the outer surface 1086*e* is recessed toward the inner surface 1086*d*. That is, the side core 1086 includes a core recessed surface 1086*f* recessed lower than the outer surface 1086*e* of the nearby side core 1086.

The capacitor 198 is disposed outside the side core 1086, and when the capacitor 198 having a larger capacity is disposed, a space for an arrangement region 188 may be needed. In this regard, the core recessed surface 1086*f* is formed so as to increase the space for the arrangement of the capacitor 198.

The shape of the core recessed surface 1086*f* is not limited, and the core recessed surface 1086*f* may be provided in a curved surface in consideration of the contour of the capacitor 198. Although the core recessed surface 1086*f* is illustrated as being formed at an end of the side core 1086, the position of the core recessed surface 1086f is not limited as long as it is formed on at least a portion of the outer surface 1086e.

As the center core 1085 and the side cores 1086 are disposed in parallel to each other in the same direction, the coil can be easily wound when wound around the stator 1080.

Hereinafter, according to one or more embodiments, a motor assembly and a vacuum cleaner having the same will be described.

A repeated description of the same components as in the aforementioned embodiments will be omitted.

Figure 42:
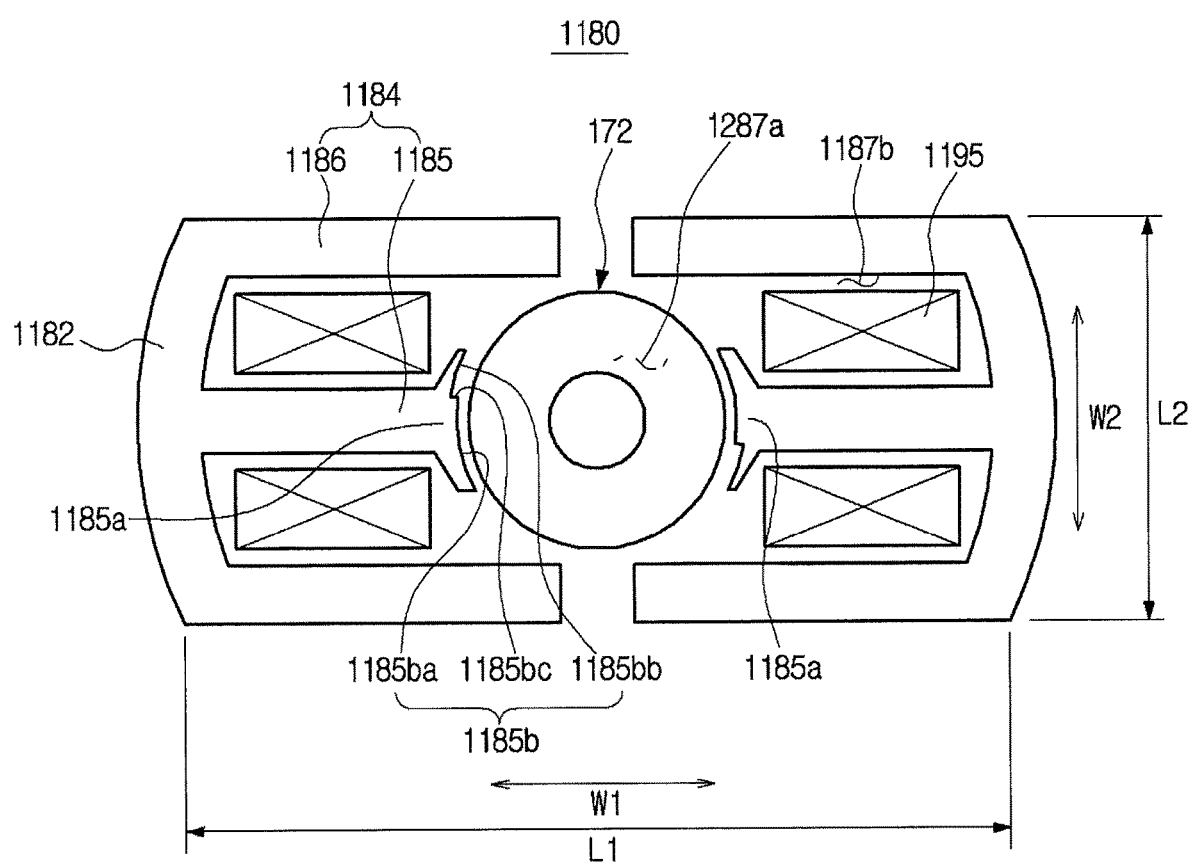
FIG. 42 is a front view illustrating a stator, according to one or more embodiments.

FIG. 42 is a front view illustrating a stator, according to one or more embodiments.

A stator 1180 is configured to electromagnetically interact with a rotor 172.

The stator 1180 includes a stator body 1182, an insulator 1190, and a coil 1195.

The stator body 1182 is made up of a pair of stator bodies 1182 that are disposed across the rotor 172 in the first direction w1 so as to face each other. That is, the stator bodies 1182 may be disposed long so as to face each other. The stator 1180 is not provided around the rotor 172 in a singular circular shape in a circumferential direction of the rotor 172, but the stator 1180 is provided to enclose the rotor 172. Here, a length L1 of the stator 1180 determined in the first direction w1 may be longer than the length L2 of the stator 1180 in a second direction w2 perpendicular to the first direction w1, such that the stator 1180 may be formed to meet a condition that L1 is greater than L2.

The stator body 1182 may include at least one stator core 1184. Each stator core 1184 includes center cores 1185 and side cores 1186 provided at sides of the center core 1185.

The center cores 1185 are provided to face each other across the rotor 172. A rotor receptacle 1187a is defined between the center cores 1185 such that the rotor 172 is rotatable. A pair of side cores 1186 are provided at both the sides of the center core 1185 in parallel to the center core 1185.

A stator slot 1187b is formed between the stator cores 1184. As a coil 1195 is wound around the stator core 1184, the coil 1195 is housed in the stator slots 1187b. An inner end of the stator core 1184 which is adjacent to the rotor 172 is provided with an expanded core 1185a in which a width of the stator core 1184 is partly increased. In detail, the expanded core 1185a is formed in such a way that an inner end of the center core 1185 which is directed to the rotor 172 is increased in width to surround a circumference of the rotor 172. A gap 1185b is formed for the rotation of the rotor 172 between an inner surface of the expanded core 1185a and an outer surface of the rotor 172.

The stator 1180 may be provided such that the pair of stator bodies 1182 symmetrically face each other.

The one pair of the extended cores 1185a provided at ends of the one pair of center cores 1185 around the rotor 172 are provided such that inner surfaces 1185b thereof are stepped. In detail, the extended core 1185a includes an inner surface 1185b including a first surface 1185ba facing the rotor 172 and a second surface 1185bb stepped with respect to the first surface 1185ba and distant from the rotor 172 when compared to the first surface 1185ba. An inner surface step 1185bc is provided between the first surface 1185ba and the second surface 1185bb such that the first surface 1185ba and the second surface 1185bb are differently spaced apart from the rotor 172. For rotation of the rotor, one portion of the extended core 1085a is adjacent to the rotor when compared to the nearby portion of the extended core 1085a, so that a starting torque is generated to rotate the rotor in any direction when the stator and the rotor electromagnetically interacts with each other. The first surface 1185ba and the second surface 1185bb are formed to be stepped with each other, so that the generation of the starting torque is ensured.

The widths of the first surface 1185ba and the second surface 1185bb and the depth of the step between the first surface 1185ba and the second surface 1185bb are not limited as long as the first surface 1185ba and the second surface 1185bb are spaced apart by different distances from the rotor 172.

As is apparent from the above, through differing embodiments, a structure of a motor and a vacuum cleaner having the same may be improved such that components are concentrically disposed.

In addition, the radiation efficiency may be enhanced.

In addition, a motor assembly may be stably fixed inside the vacuum cleaner.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A motor assembly comprising:
an impeller provided inside a motor assembly housing, the impeller configured to generate a suction force at an air inlet port of the motor assembly housing;
a motor including:
a rotor including a rotor shaft rotatable with the impeller, and
a pair of stators disposed facing each other across the rotor while electromagnetically interacting with the rotor to rotate the rotor shaft;
a motor housing provided inside the motor assembly housing that fixes the pair of stators relative to the rotor, the motor housing including:
a front motor housing member disposed on a front side of the motor, and
a rear motor housing member disposed on a rear side of the motor and coupled to the front motor housing member such that the motor is fixed between the front motor housing member coupled to the rear motor housing member,
wherein the front motor housing member includes:
a front motor housing body,
a front seat provided on a rear surface of the front motor housing body to seat an axial end of the pair of stators thereon such that a center of the rotor provided between the pair of stators is aligned with a rotation center of the impeller, and
a plurality of front seating protrusions formed to protrude rearward from the front motor housing body outside the front seat to guide an outer circumferential surface of the pair of stators along an inner circumferential surface of the plurality of front seating protrusions so that the axial end of the pair of stators is guided to the front seat;
a circuit board provided on a rear surface of the rear motor housing member to transmit electric signals to the motor; and
an insulator coupled to the circuit board with the rear motor housing member therebetween for electrical insulation.

2. The motor assembly of claim 1, wherein the motor housing has a through-hole through which the rotor shaft of the rotor passes to drive with the impeller.

3. The motor assembly of claim 1, wherein the motor assembly housing has an air outlet port arranged to outlet air flow, generated by the impeller, after transiting past the motor in the motor housing.

4. The motor assembly of claim 1, wherein the motor assembly further comprises a motor module that includes the motor housing and the motor, with the motor module being provided at a rear surface of the impeller.

5. The motor assembly of claim 1, wherein the pair of stators are arranged to face each other so that each stator of the pair of stators includes a core that covers different circumferential portions of the rotor.

6. The motor assembly of claim 5, wherein the motor further comprises a pair of ancillary stators that are arranged to face each other, along a direction different from a direction the pair of stators face each other, so that each ancillary stator includes a core that covers different circumferential portions of the rotor,
wherein the respective cores of the pair of stators and pair of ancillary stators cover different circumferential portions of the rotor.

7. The motor assembly of claim 5, wherein, when arranged to face each other, the pair of stators have a collective oblong rectangular configuration that provides component and/or air flow space in the motor housing, in a same plane as a direction of at least one of the cores of the pair of stators toward the rotor, at least partially within a greatest radii between the pair of stators and the rotor.

8. The motor assembly of claim 1, wherein a complete length of the rear motor housing member in a first direction is longer than a complete length of the rear motor housing member in a second direction perpendicular to the first direction.

9. The motor assembly of claim 1, wherein the front motor housing member further includes:
an impeller seat provided on a front surface of the front motor housing body so as to seat the impeller thereon.

10. The motor assembly of claim 1, further comprising a diffuser disposed in a radial direction with respect to the impeller such that air suctioned by the impeller is guided into the motor assembly housing through the air inlet of the motor assembly housing along one or more defined air paths, wherein a center of the diffuser is provided to be aligned with a center of the impeller.

11. The motor assembly of claim 10, wherein centers of the impeller, the diffuser, and the rotor are provided to be aligned with one another.

12. The motor assembly of claim 1, further comprising the motor assembly housing, wherein the motor assembly housing includes:
a first housing portion that is provided with the air inlet port; and
a second housing portion that is provided with a diffuser disposed in a radial direction with respect to the impeller to guide air suctioned by the impeller into the motor assembly housing along one or more defined air paths, is provided with an air outlet port to outlet air from the motor assembly housing, and is coupled to a rear surface of the first housing portion,
wherein the front motor housing member, disposed on a front surface of the motor such that the motor is seated thereon, is coupled to the second housing portion such that the front motor housing member is centrally disposed relative to the diffuser at a rear surface of the impeller.

13. The motor assembly of claim 1, wherein the motor assembly is configured to generate an air flow path through which air is directed to flow from the air inlet port to an air outlet port of the motor assembly housing by the impeller, wherein the motor housing is disposed in the air flow path.

14. The motor assembly of claim 13, wherein the insulator is configured to cover at least a portion of an outer surface of the motor for electrical insulation, and includes a flow path guide surface provided at an end of the motor such that at least a portion of air flowing along the air flow path is guided to an interior of the motor.

15. The motor assembly of claim 14, wherein the motor assembly is configured to generate the air flow path to include:
a module flow path along which air introduced into the motor assembly housing passes the interior of the motor housing; and
a module external flow path along which air introduced into the motor assembly housing passes between an inner surface of the motor assembly housing and an exterior of the motor housing,
wherein the flow path guide surface separates the air flow path into at least the module flow path and the module external flow path.

16. The motor assembly of claim 1,
wherein the air inlet port, the impeller, the motor, and the circuit board are sequentially disposed inside the motor assembly housing.

17. The motor assembly of claim 1, further comprising:
the motor assembly housing, provided in a cylindrical shape; and
a motor module including the motor and motor housing, and further including:
arrangement regions that are provided along lateral sides of the pair of stators disposed in a lengthwise direction, and are provided on a same plane as the pair of stators; and
the circuit board that has a capacitor disposed in one of the arrangement regions, is configured to transmit electric signals to the motor, and is disposed perpendicular to an axial direction of the rotor inside the motor assembly housing.

18. The motor assembly of claim 17, wherein the motor module further comprises a magnet sensor disposed on the motor housing to detect a rotation position of the rotor.

19. A motor assembly comprising:
an impeller provided inside a motor assembly housing, the impeller configured to generate a suction force at an air inlet port of the motor assembly housing;
a motor including:
a rotor including a rotor shaft rotatable with the impeller, and
a pair of stators disposed facing each other across the rotor while electromagnetically interacting with the rotor to rotate the rotor shaft;
a motor housing provided inside the motor assembly housing that fixes the pair of stators relative to the rotor, the motor housing including:
a front motor housing member disposed on a front side of the motor, and
a rear motor housing member disposed on a rear side of the motor and coupled to the front motor housing member such that the motor is fixed between the front motor housing member coupled to the rear motor housing member, wherein the front motor housing member includes:
  a front motor housing body,
  a front seat provided on a rear surface of the front motor housing body to seat the pair of stators thereon such that a center of the rotor provided between the pair of stators is aligned with a rotation center of the impeller, and
  a plurality of front seating protrusions formed to protrude rearward from the front motor housing body outside the front seat and to guide an outer surface of the pair of stators to an inner side thereof,
    wherein the plurality of front seating protrusions include front guide faces that are formed with an inclination at respective inner sides of the plurality of front seating protrusions to respectively guide the pair of stators toward the front seat upon seating;

a circuit board provided on a rear surface of the rear motor housing member to transmit electric signals to the motor; and an insulator coupled to the circuit board with the rear motor housing member therebetween for electrical insulation.

20. A motor assembly comprising:

a motor assembly housing provided with an air inlet port arranged along a front portion of the motor assembly housing and an air outlet port arranged along a rear portion of the motor assembly housing;

an impeller configured to apply a suction force to the air inlet port;

a motor module provided at a rear surface of the impeller to transmit power to rotate the impeller, wherein the motor module comprises:

a motor including:
  a rotor rotatable together with the impeller, and
  a pair of stators disposed in a lengthwise direction facing each other across the rotor, and a motor housing that fixes the pair of stators disposed in the lengthwise direction and is coupled to an inside of the motor assembly housing, the motor housing including:
  a through-hole passing in an axial direction of the rotor such that the rotor has a center aligned with centers of the pair of stators,
  a front motor housing member disposed on a front side of the motor, and
  a rear motor housing member disposed on a rear side of the motor and coupled to the front motor housing member such that the motor is fixed between the front motor housing member coupled to the rear motor housing member, wherein the front motor housing member includes:
  a front motor housing body,
  a front seat provided on a rear surface of the front motor housing body to seat an axial end of the pair of stators thereon such that a center of the rotor provided between the pair of stators is aligned with a rotation center of the impeller, and
  a plurality of front seating protrusions formed to protrude rearward from the front motor housing body outside the front seat to guide an outer circumferential surface of the pair of stators along an inner circumferential surface of the plurality of front seating protrusions so that the axial end of the pair of stators is guided to the front seat;

a circuit board provided on a rear surface of the rear motor housing member to transmit electric signals to the motor; and an insulator coupled to the circuit board with the rear motor housing member therebetween for electrical insulation.

21. The motor assembly of claim 20, wherein:

the motor assembly housing is cylindrically shaped; and the motor module further comprises:
  arrangement regions that are provided along lateral sides of the pair of stators disposed in the lengthwise direction of the pair of stators and are provided in a same plane as the pair of stators, with the arrangement regions being disposed in a direction perpendicular to the lengthwise direction of the pair of stators; and
  the circuit board including a capacitor disposed in at least one of the arrangement regions, the circuit board configured to transmit electric signals to the motor, and is disposed perpendicular to the axial direction inside the motor assembly housing.

22. The motor assembly of claim 20, wherein the motor assembly is configured to generate an air flow path through which air is directed to flow from the air inlet port to the air outlet port by the impeller, wherein the motor module is disposed in the air flow path.

23. The motor assembly of claim 22, wherein the insulator is configured to cover at least a portion of an outer surface of the pair of stators for electrical insulation, and includes a flow path guide surface provided at a side of an end of the motor such that at least a portion of the air flow path is guided toward an interior of the motor by the flow path guide surface.

24. The motor assembly of claim 23, wherein the motor assembly is configured to generate the air flow path to include:

a module flow path along which air introduced into the motor assembly housing passes the interior of the motor module; and a module external flow path along which air introduced into the motor assembly housing passes between an inner surface of the housing and an exterior of the motor module, wherein the flow path guide surface separates the air flow path into at least the module flow path and the module external flow path.

* * * * *